(12) United States Patent
Leen et al.

(10) Patent No.: US 12,079,448 B2
(45) Date of Patent: Sep. 3, 2024

(54) USER INTERFACE MODULE FOR A BUILDING CONTROL SYSTEM

(71) Applicant: Honeywell International Inc., Charlotte, NC (US)

(72) Inventors: Cary Leen, Hammond, WI (US); FoongYeen Chan, Petaling Jaya (MY); Duo Zhang, Beijing (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/955,124

(22) Filed: Sep. 28, 2022

(65) Prior Publication Data
US 2023/0022954 A1  Jan. 26, 2023

Related U.S. Application Data

(63) Continuation of application No. 16/246,424, filed on Jan. 11, 2019, now abandoned.

(51) Int. Cl.
| | |
|---|---|
| *G05B 15/02* | (2006.01) |
| *G06F 3/04817* | (2022.01) |
| *G06F 3/0482* | (2013.01) |
| *G06F 3/0483* | (2013.01) |
| *G06F 3/04883* | (2022.01) |

(Continued)

(52) U.S. Cl.
CPC ........... *G06F 3/0482* (2013.01); *G05B 15/02* (2013.01); *G06F 3/04817* (2013.01); *G06F 3/0483* (2013.01); *G06F 3/04883* (2013.01); *G08B 21/182* (2013.01); *H04L 12/282* (2013.01); *H04L 67/125* (2013.01)

(58) Field of Classification Search
None
See application file for complete search history.

(56) References Cited

U.S. PATENT DOCUMENTS

| | | |
|---|---|---|
| 6,414,594 B1 | 7/2002 | Guerlain |
| 6,851,621 B1 | 2/2005 | Wacker et al. |

(Continued)

FOREIGN PATENT DOCUMENTS

| | | |
|---|---|---|
| WO | 2012068591 A2 | 5/2012 |

OTHER PUBLICATIONS

EP 20151074.0, Extended European Search Report, pp. 19, Jul. 9, 2020.

*Primary Examiner* — Henry Orr
(74) *Attorney, Agent, or Firm* — Seager, Tufte & Wickhem, LLP

(57) ABSTRACT

A building control system includes a building controller and a user interface device operatively coupled to the building controller. The building controller is wall mountable and includes a plurality of ports for controlling one or more points that are associated with one or more plants of a building. The building controller controls the one or more points in accordance with one or more programmable point control values that are associated with one or more points. The user interface device provides a user interface for operating the building controller and is configured to display a plurality of menu screens on a display that allow a user to view one or more of the points, change the programmable control value for one or more of the points, and view one or more alarms generated by the building controller for one or more of the points.

20 Claims, 41 Drawing Sheets

(51) Int. Cl.
*G08B 21/18* (2006.01)
*H04L 12/28* (2006.01)
*H04L 67/125* (2022.01)

(56) References Cited

U.S. PATENT DOCUMENTS

| | | | |
|---|---|---|---|
| 7,702,421 B2 | 4/2010 | Sullivan et al. | |
| 8,196,185 B2 | 6/2012 | Geadelmann et al. | |
| 9,043,709 B2 | 5/2015 | Chae et al. | |
| 9,765,983 B2 | 9/2017 | Schultz et al. | |
| 10,037,044 B2 | 7/2018 | Laberge et al. | |
| 10,067,482 B2 | 9/2018 | Hepperla et al. | |
| 10,095,393 B2 | 10/2018 | Mairs et al. | |
| 10,168,863 B2 | 1/2019 | Glidden et al. | |
| 10,317,100 B2 | 6/2019 | Tucker | |
| 2002/0152298 A1* | 10/2002 | Kikta | H04L 67/125 709/223 |
| 2006/0015195 A1* | 1/2006 | Lehman | G05B 19/4186 700/83 |
| 2007/0061046 A1 | 3/2007 | Mairs et al. | |
| 2007/0114291 A1 | 5/2007 | Pouchak | |
| 2007/0233323 A1* | 10/2007 | Wiemeyer | H04L 12/2827 700/275 |
| 2008/0284614 A1* | 11/2008 | Perez | G01R 22/065 340/870.02 |
| 2009/0057426 A1* | 3/2009 | Sullivan | F24F 11/30 236/51 |
| 2009/0140056 A1 | 6/2009 | Leen | |
| 2009/0149973 A1* | 6/2009 | Keller | H05B 47/16 700/90 |
| 2009/0315485 A1* | 12/2009 | Verfuerth | H05B 41/38 315/320 |
| 2010/0245259 A1 | 9/2010 | Bairagi et al. | |
| 2010/0251266 A1 | 9/2010 | Majewski et al. | |
| 2013/0087628 A1 | 4/2013 | Nelson et al. | |
| 2013/0181630 A1* | 7/2013 | Taipale | H05B 45/10 315/210 |
| 2013/0198670 A1 | 8/2013 | Pelletier et al. | |
| 2013/0265700 A1* | 10/2013 | Parker | H05B 47/18 361/679.01 |
| 2014/0018940 A1 | 1/2014 | Casilli | |
| 2015/0127174 A1 | 5/2015 | Quam et al. | |
| 2015/0369505 A1 | 12/2015 | Malve et al. | |
| 2016/0091903 A1 | 3/2016 | Patton et al. | |
| 2016/0323980 A1* | 11/2016 | Weber | H05B 47/175 |
| 2017/0076721 A1* | 3/2017 | Bargetzi | G10L 15/22 |
| 2017/0235470 A1* | 8/2017 | Baluja | G05B 19/0426 715/735 |
| 2017/0373875 A1* | 12/2017 | Kolasa | G06F 13/4221 |
| 2018/0164993 A1* | 6/2018 | Zummo | G06Q 10/00 |
| 2018/0225934 A1* | 8/2018 | Moulton | F24F 11/30 |
| 2020/0077527 A1* | 3/2020 | Leen | H05K 3/30 |

* cited by examiner

USER INTERFACE MODULE FOR A BUILDING CONTROL SYSTEM

This is a continuation of co-pending U.S. patent application Ser. No. 16/246,424, filed Jan. 11, 2019, and entitled "USER INTERFACE MODULE FOR A BUILDING CONTROL SYSTEM", which is incorporated herein by reference.

TECHNICAL FIELD

The present disclosure pertains to building control systems. More particularly, the present disclosure pertains to building control systems that include a building controller and a user interface device that provides a user interface for the building controller.

BACKGROUND

Building control systems are used to control systems of a building, and often include one or more building control devices that control one or more building control components. Such building control systems can include Heating, Ventilation and/or Air Conditioning (HVAC) systems, building security systems, building lighting control systems and/or any other suitable building control system. In many instances, a building control system includes a building controller that receives sensor and/or other data, and in response, provides control signals to control various building control components in the building in accordance with a control algorithm. In some cases, the building controller may be operatively coupled to one or more input/output modules, which may be wired or otherwise connected to the one or more building control components. In some cases, a user interface may be integrated into the building controller. In other cases, a separate user interface module may be provided for interfacing with the building controller. A need remains for improved the usability of such building control systems.

SUMMARY

The present disclosure relates to a building control system that includes a building controller and a user interface device that is operatively coupled to the building controller. In some cases, the building controller is configured to be wall mountable and includes a plurality of ports for controlling one or more points that are associated with one or more plants of a building. The building controller controls the one or more points in accordance with one or more programmable point control values that are associated with one or more points. The user interface device may be configured to provide a user interface for operating the building controller and may be configured to display a plurality of menu screens on a display that allow a user to view one or more of the points, change the programmable control value for one or more of the points, and/or view one or more alarms generated by the building controller for one or more of the points.

Another example of the present disclosure is a building control system that includes a building controller that is configured to be wall mountable and a user interface device that is separate from the building controller but is also configured to be wall mountable and operatively coupled to the building controller. The building controller includes a plurality of ports for controlling one or more points that are associated with one or more plants of a building. The building controller controls the one or more points in accordance with one or more programmable point control values that are associated with the one or more points. The user interface device is configured to provide a user interface for operating the building controller and is configured to display one or more screens on a display that displays information received from the building controller and/or solicits information for the building controller.

Another example of the present disclosure is a building control system that includes a building controller that is configured to be wall mountable and includes a plurality of ports for controlling one or more points associated with one or more plants of a building, the building controller controlling the one or more points in accordance with one or more programmable point control values that are associated with the one or more points. A user interface device is operatively coupled to the building controller and is configured to provide a user interface for operating the building controller. The user interface device is configured to display a plurality of menu screens on a display, including at least one screen that allows a user to select one or more points that are to be displayed on a home screen of the user interface device, wherein after selection, the user interface device displays current information regarding the selected one or more points on the home screen, wherein the home screen is displayed following a period of no user interaction with the user interface device.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
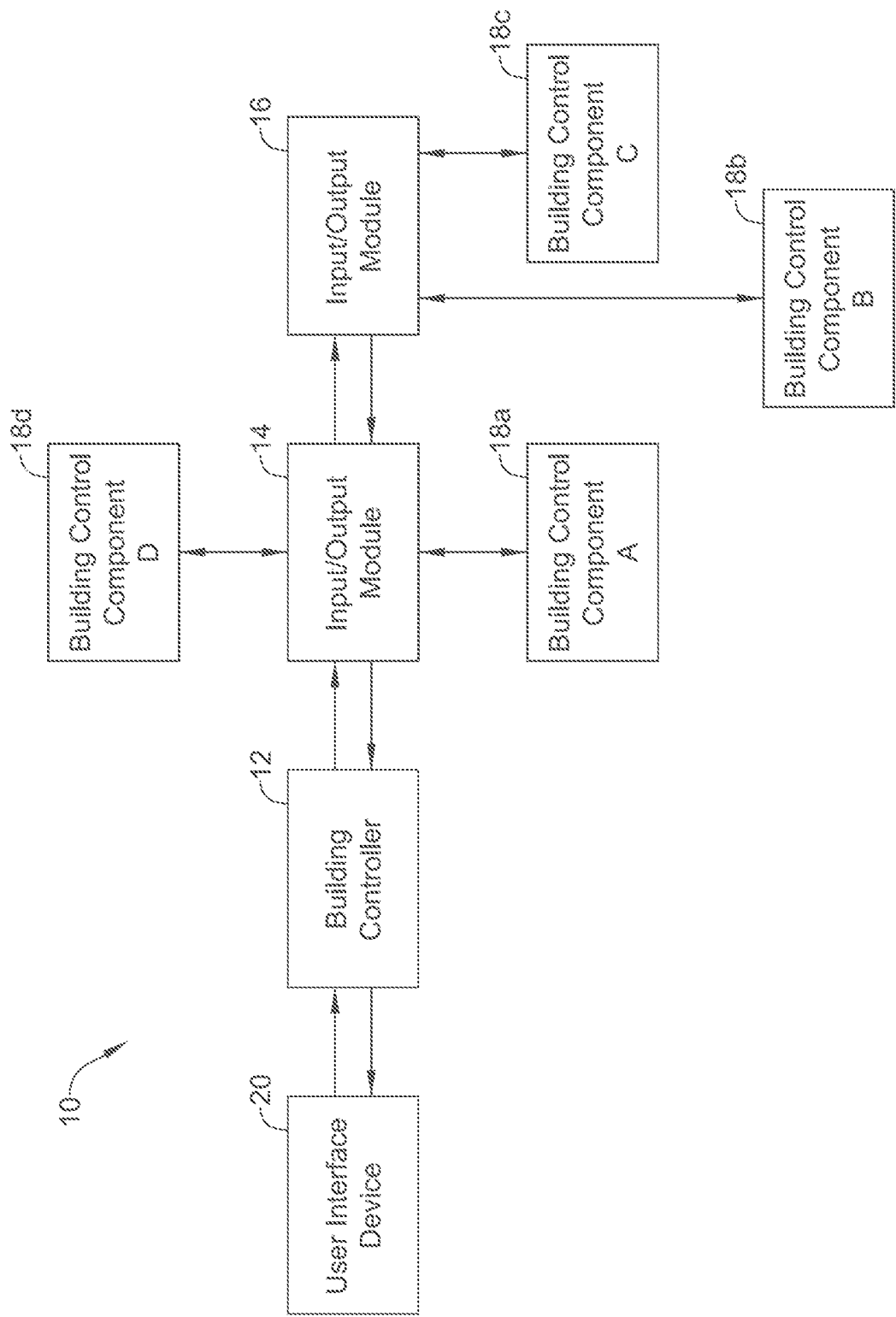
FIG. 1 is a schematic view of an illustrative building control system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic view of an illustrative building control system 10. It is contemplated that the building control system 10 may include an Heating, Ventilation and/or Air Conditioning (HVAC) system, a building security system, a building lighting control system and/or any other suitable building control system. In some cases, the building control system 10 may include one or more building control devices. The one or more building control devices may include, for example, a building controller 12, input/output modules 14 and 16, and/or any other suitable building control device. In the example shown, the building controller 12 is configured to receive sensor and/or other data, and in response, provide control signals in accordance with a control algorithm to control various building control components 18a-18d in the building. In some cases, the building controller 12 may receive the sensor and/or other data and provided control signals to building control components 18a-18d via one or more input/output modules 14 and 16. When so provided, the one or more input/output modules 14 and 16 may be operatively connected to the building controller 12 and wired or otherwise connected to the one or more building control components 18a-18d. It is contemplated that the one or more building control components 18a-18d may include, for example, fans, blowers, dampers, sensors and/or detectors, actuators and/or any other suitable building control components.

In some case, a user interface device 20 may be provided for interfacing with the building control devices. In the example shown, the user interface device 20 is operatively connected to the building controller 12. The user interface device 20 may include a housing that houses a display. The display may be a touch screen display. In some cases, the user interface device 20 may include one or more tactile buttons for use by the user in interacting with the user interface device 20.

It is contemplated that the user interface device 20 may provide a rich user interface for local access to the building controller 12, thereby providing a convenient way for a user to locally control/check the operation of the building control system 10. In some cases, a user may user the user interface module to view and command building control components 18a-18d (points), view and acknowledge alarms, view and program schedules/calendars, provide password protection, displaying/creating fast access lists, and/or perform any other desired task. These are just examples.

Figure 2:
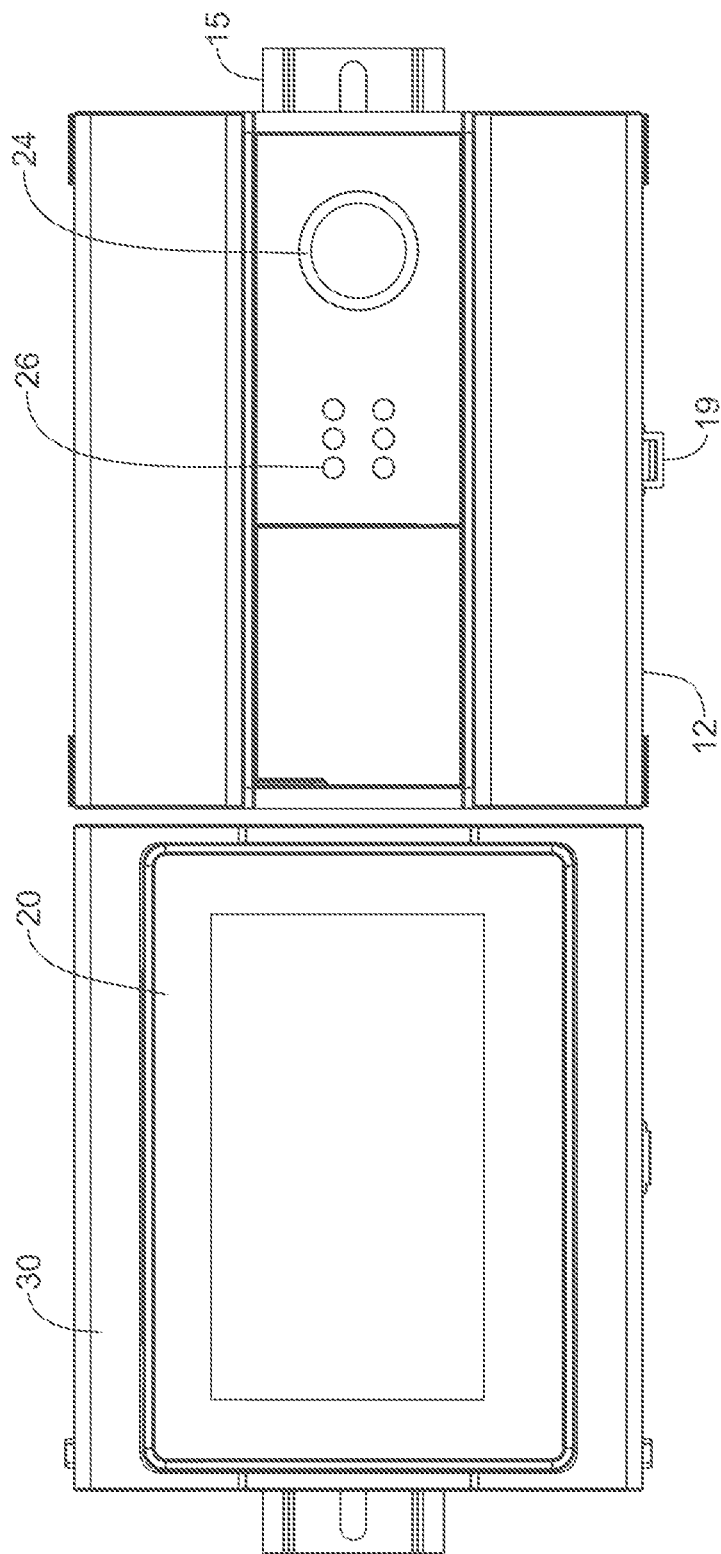
FIG. 2 is a schematic view of an illustrative building control system mounted on a DIN rail.

FIG. 2 is a schematic view of an illustrative building control system 10 mounted on a DIN rail 15. In the example shown, the building control system includes a building controller 12 and a user interface device 20. In the example shown, the building controller 12 does not include a dot matrix display. Instead, the building controller 12 includes a light ring 24 that, for example, can be animated and/or changes color to provide an operational status of the building controller 12. For example, the light ring 24 may be green to indicate that the building controller 12 is operating normally, yellow to indicate that the building controller 12 has one or more minor faults and red to indicate that the building controller 12 has one or more major faults that need a user's immediate attention. A set of LED lights 26 may also be used to indicate the connection status of each of a number of I/O pins. In some cases, the user interface device 20 may serve as a user interface for the building controller 12, thereby providing additional functionality. In some cases, the user interface device 20 may display a replica of the light ring 24.

Figure 3:
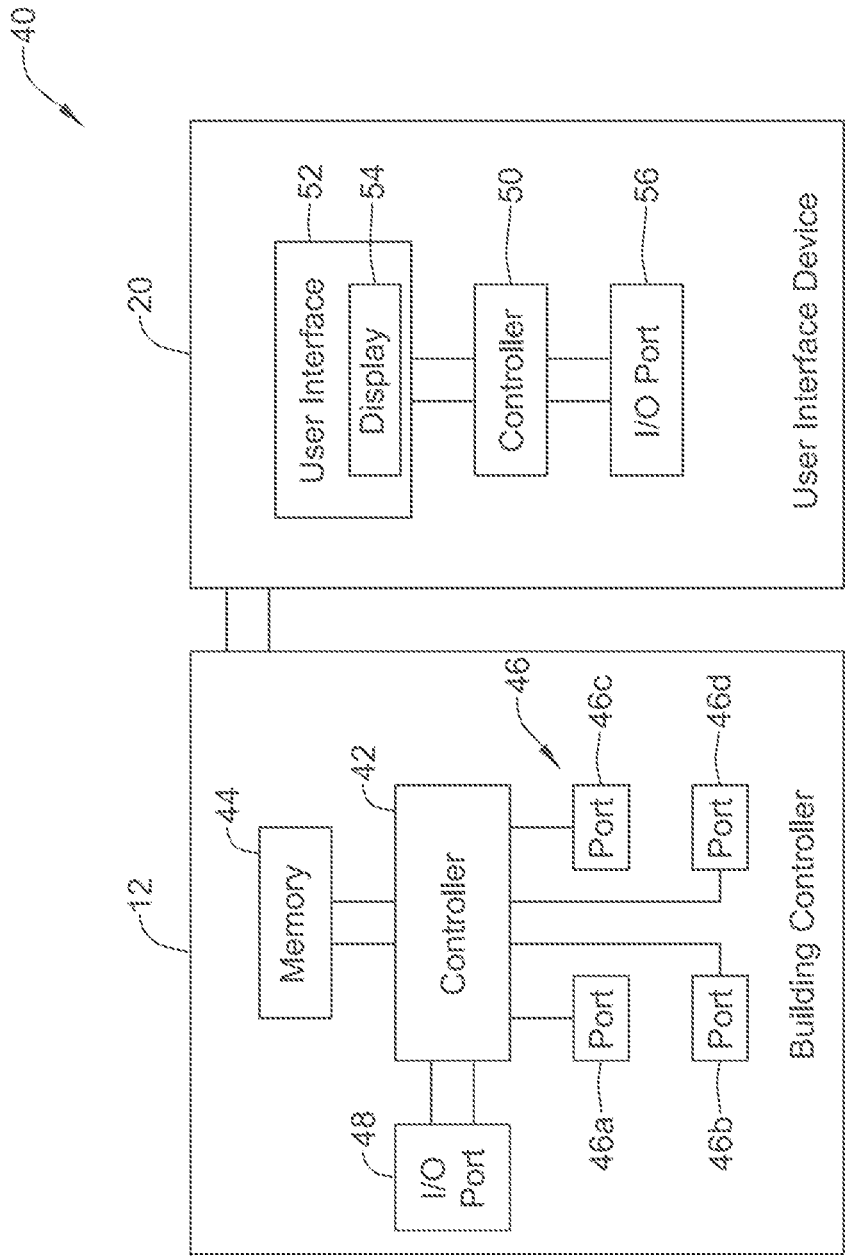
FIG. 3 is a schematic view of an illustrative building control system.

FIG. 3 is a schematic view of an illustrative building control system 40. The building control system 40 includes the building controller 12 and the user interface device 20 as previously shown in FIG. 1. The building controller 12 and the user interface device 20 may be operably coupled such that the user interface device 20 provides a user interface for the building controller 12, thereby providing additional communication functionality beyond the light ring 24 and the LED lights 26 (FIG. 2). In some cases, the user interface device 20 may be separate from the building controller 12 (yet still operably coupled thereto). In some cases, the building control system 40 may be considered as being part of the building control system 10. In some instances, the building control system 40 may be considered as being a stand-alone system.

In some cases, the building controller 12 may be configured to be wall-mountable. As illustrated, the building controller 12 includes a controller 42 that is operably coupled with a memory 44. The memory 44 may store information regarding one or more points that are associated with one or more plants that are being controlled by the building controller 12, including but not limited to programmable control values, alarm values and the like. The controller 42 is also operably coupled with a plurality of ports 46a, 46b, 46c and 46d. While a total of four ports 46 are shown, it will be appreciated that the controller 42 may be operably coupled with any number of ports 46. In some cases, the ports 46 may provide direct wired or wireless communication to the one or more points. In some instances, at least some of the ports 46 may instead be in communication with other intermediate devices such as but not limited to the Input/Output Modules 14 and 16 as shown in FIG. 1. An I/O port 48 permits communication with the user interface device 20.

The user interface device 20 includes a controller 50 that is operably coupled with a user interface 52. In some cases, the user interface 52 includes a display 54 and may include one or more buttons or other input devices (not illustrated). In some cases, the display 54 may be a capacitive touch screen display, which may provide both input and display capabilities. The controller 50 is also operably coupled with an I/O port 56. The I/O port 56 may, for example, permit the user interface device 20 to communicate with the building controller 12, such as via the I/O port 48 of the building controller 12. The user interface device 20 may be configured to display a plurality of menu screens on the display 54 that allow a user to view one or more of the points, change the programmable control value for one or more of the points, and view one or more alarms generated by the building controller 12 for one or more of the points.

In some cases, the user interface device 20 may be configured to display on the display 54 one or more screens that display a list of points that are currently in alarm. For example, the one or more screens that display a list of points that are currently in alarm may include one or more of a user-defined name for each of the points in alarm, a status indicator for each of the points in alarm and a current value and/or a setpoint for each of the points in alarm. The status indicator for each of the points in alarm may, for example, be one of a high priority alarm indicator, a mid or medium priority alarm indicator and a low priority alarm indicator. In some cases, the user interface device 20 may be configured to display one or more screens providing additional information regarding a particular point that is currently in alarm in response to a user selecting the particular point from the list of points that are currently in alarm. In some cases, the one or more screens providing additional information regarding the particular point that is currently in alarm may allow the user to manually change a setpoint for the particular point in alarm.

The user interface device 20 may be configured to display on the display one or more screens that display a list of points that are controlled by the building controller 12. In some cases, the user interface device 20 may be configured to display one or more screens providing additional information regarding a particular point in response to a user selecting the particular point from the list of points. The user interface device 20 may be configured to display one or more screens that permit the user to select a particular point and then manually adjust a programmable point control value of the particular point. The user interface device 20 may be configured to display one or more screens that provide a list of points that have been manually adjusted as well as to display one or more screens that permit the user to selectively choose points that have been manually adjusted to return to an auto mode.

The user interface device 20 may be configured to display one or more screens that permit the user to filter the one or more points by a user selected filter criteria. In some cases, each of the one or more points has a point type, and wherein the user selected filter criteria identifies those points of one or more selected point types. In some instances, each of the one or more points is associated one of the one or more plants, and wherein the user selected filter criteria identifies those points that are associated with one or more selected plants.

The user interface device 20 may be configured to display one or more screens that provide a Fast Access List that enables particular points to be accessed more easily. One or more points may be added to the Fast Access List in several different ways. For example, a point may be added to the Fast Access List by activating an add to Fast Access List button on a Fast Access List screen that displays a listing of points that are on the Fast Access List. A point may also be added to the Fast Access List by activating an add to Fast Access List button on an information screen for a particular point. In some cases, in response to activating the add to Fast Access List button on the Fast Access List screen that displays the listing of points that are on the Fast Access List, the user interface device 20 may be configured to display one or more screens that permit the user to filter the one or more points by a user selected filter criteria.

Figure 4:
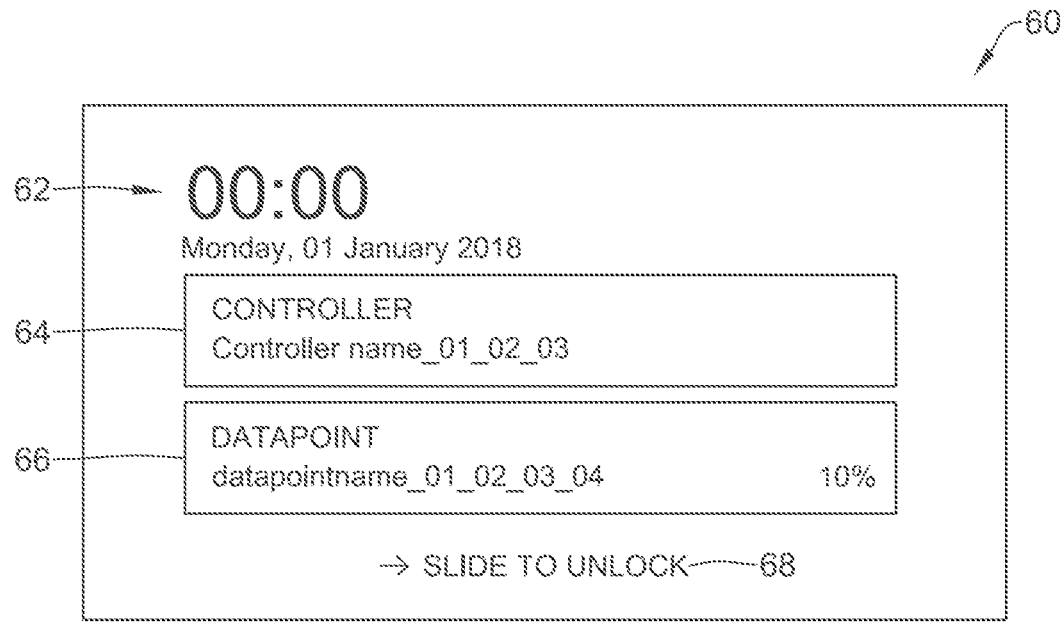
FIG. 4 is an illustrative screen shot of a locked screen.
Figure 79:
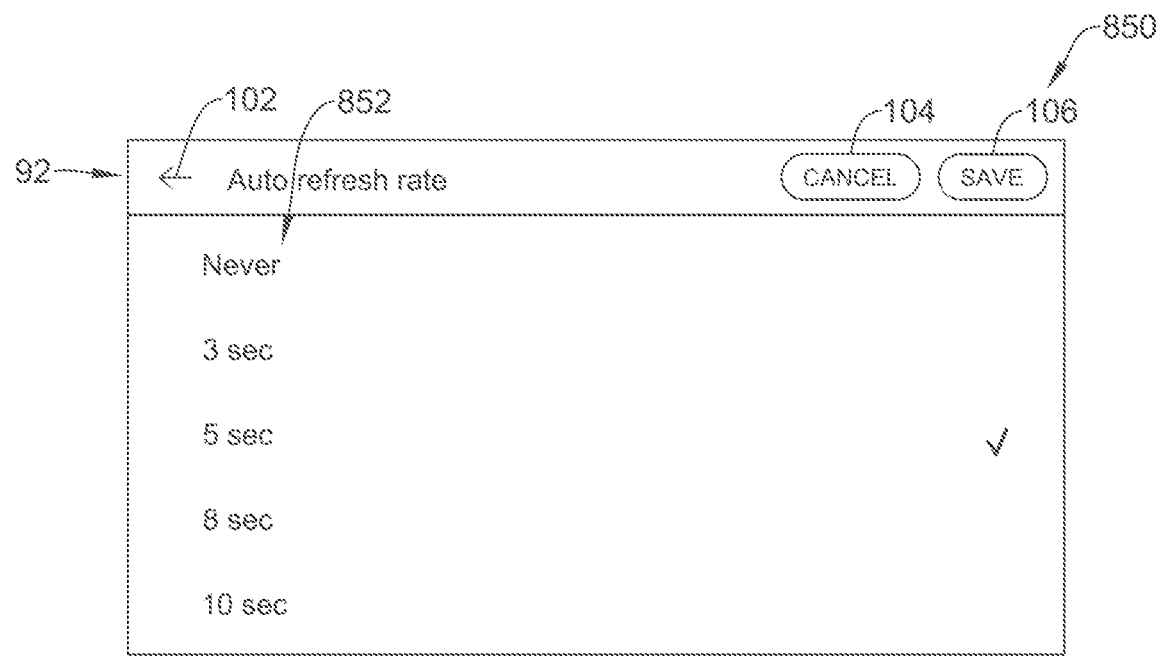

FIGS. 4 through 79 provide a number of illustrative screen shots that illustrate some of the functionality of the user interface device 20, and how the user interface device 20 may provide a desirable and useful user interface for the building controller 12. As will be shown in the illustrative screen shots, the user interface device 20 provides a way for the building controller 12 to communicate vast amounts of information to a user via a user-friendly, inexpensive device (the user interface device 20). The user interface device 20 also provides an effective way for a user to communicate information to the building controller 12 without having to connect up a computer or similar device.

FIG. 4 provides a screen 60 that may be displayed by the user interface device 20. The screen 60 may be considered as being a lock screen to which the user interface device 20 may return when there is no current interaction with a user, for example, and there has not been any interaction for a period of time. For security purposes, the user interface device 20 may display the screen 60 if there has been no interaction for a period of time such as 15 minutes. In some cases, this period of time may be user-adjustable. The screen 60 may include any desired information. As illustrated, the screen 60 includes a current DATE and TIME icon 62 and a CONTROLLER NAME icon 64. In some cases, and as will be discussed with respect to subsequent Figures, the user may have the ability to place one or more points directly on the screen 60. As a result, particular points may be immediately visible, even without having to unlock the screen. To illustrate this, the screen 60 includes a DATA POINT icon 66 that may include a name of the displayed point as well as a current setpoint or current value for the displayed point. While a single DATA POINT icon 66 is shown, it will be appreciated that the screen 60 may include none, or may include two, three or more distinct DATA POINT icons 66. In some instances, the particular information displayed on the DATA POINT icon 66 may be user-selectable.

To gain access, a user may slide an UNLOCK bar 68. In response, the user interface device 20 may display one or more screens (not illustrated) that enable a user to enter a username and/or a password, for example. The user interface device 20 may provide provisions for someone to enter additional usernames and passwords, and to optionally enter security levels for individuals. For example, some users may have more limited rights as to what they can see or alter while other users may have more extensive rights. Once the user has successfully logged in to the user interface device 20, the user interface device 20 may display a screen 70, as shown in FIG. 5.

Figure 5:
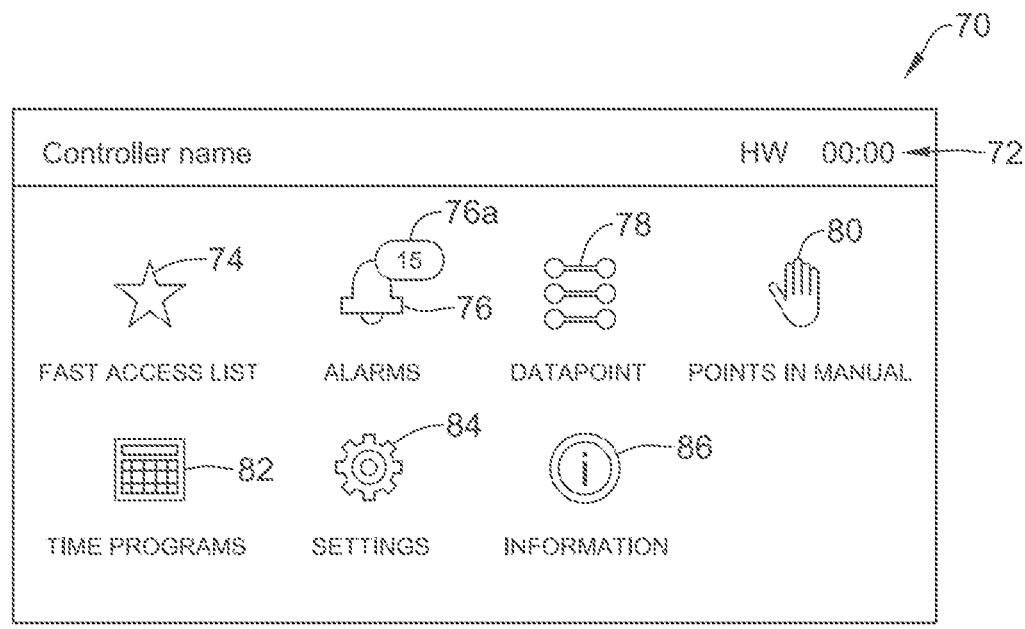
FIG. 5 is an illustrative screen shot of a main menu screen.

As seen in FIG. 5, the screen 70 may be considered as being a home screen, or perhaps a main menu screen. The screen 70 may include any number of different icons, depending on how the building controller 12 is configured, what sort of plants are being operated by the building controller 12, as well as any variety of user-defined settings or parameters. As illustrated, the screen 70 includes an ID bar 72 that may, for example, name the specific building controller 12, include the user's name, and the time. These are just examples, and are not intended as being limiting. The screen 70 includes a FAST ACCESS icon 74, an ALARMS icon 76, a DATA POINT icon 78, a POINTS IN MANUAL icon 80, a TIME PROGRAMS icons 82, a SETTINGS icon 84 and an INFORMATION icon 86. In some cases, the screen 70 may include descriptive text accompanying each icon 74, 76, 78, 80, 82, 84, 86. In some cases, as shown, the ALARMS icon 76 also includes an indication 76a that provides an indication of how many points are currently in alarm. It will be appreciated that in response to a user selecting any of these icons 74, 76, 78, 80, 82, 84, 86, or other icons not presently illustrated, that the user interface device 20 may display one or more screens that either provide the user with additional information or enable the user to enter information to be transmitted to the building controller 12.

The TIME PROGRAMS icon 82, if selected, will cause the user interface device 20 to display one or more screens pertaining to scheduling. The INFORMATION icon 86, if selected, will cause the user interface device 20 to display one or more screens that provide additional general information to the user. At least some aspects of each of the icons 74, 76, 78, 80 and 84 will be discussed, in turn. In particular, illustrative but non-limiting screen shots pertaining to the FAST ACCESS icon 74 may be found in FIGS. 6-24. Illustrative but non-limiting screen shots pertaining to the ALARMS icon 76 may be found in FIGS. 25-33. Illustrative but non-limiting screen shots pertaining to the DATA POINT icon 78 may be found in FIGS. 34-44. Illustrative but non-limiting screen shots pertaining to the POINTS IN MANUAL icon 80 may be found in FIGS. 45-54. Illustrative but non-limiting screen shots pertaining to the SETTINGS icon 84 may be found in FIGS. 69-79.

Figure 6:
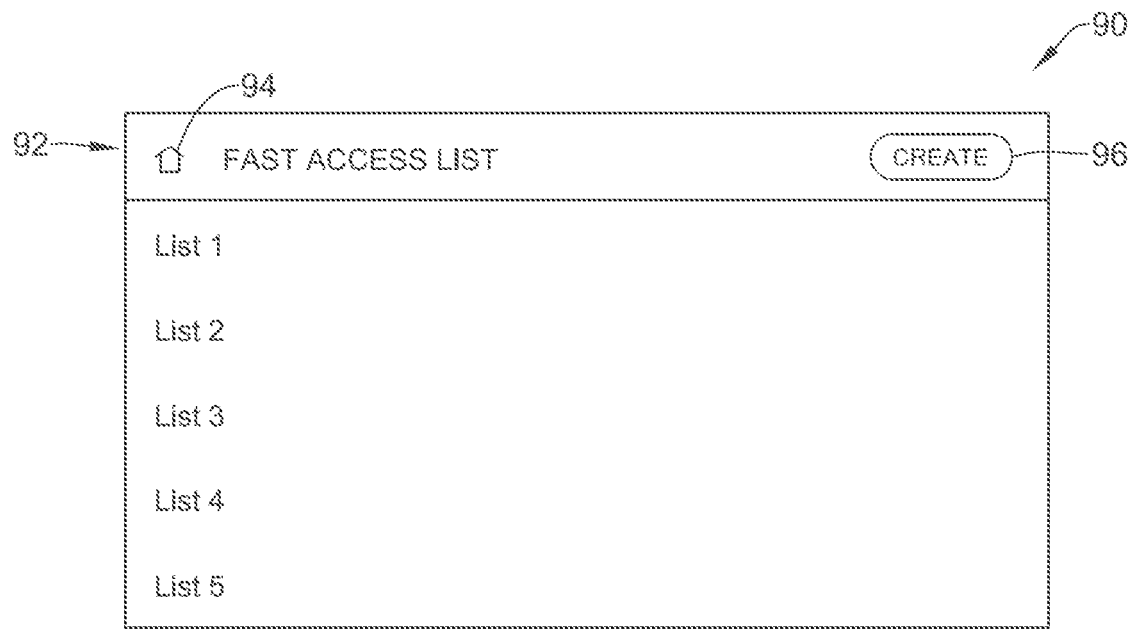
FIGS. 6 through 24 are screen shots of FAST ACCESS list screens.
Figure 7:
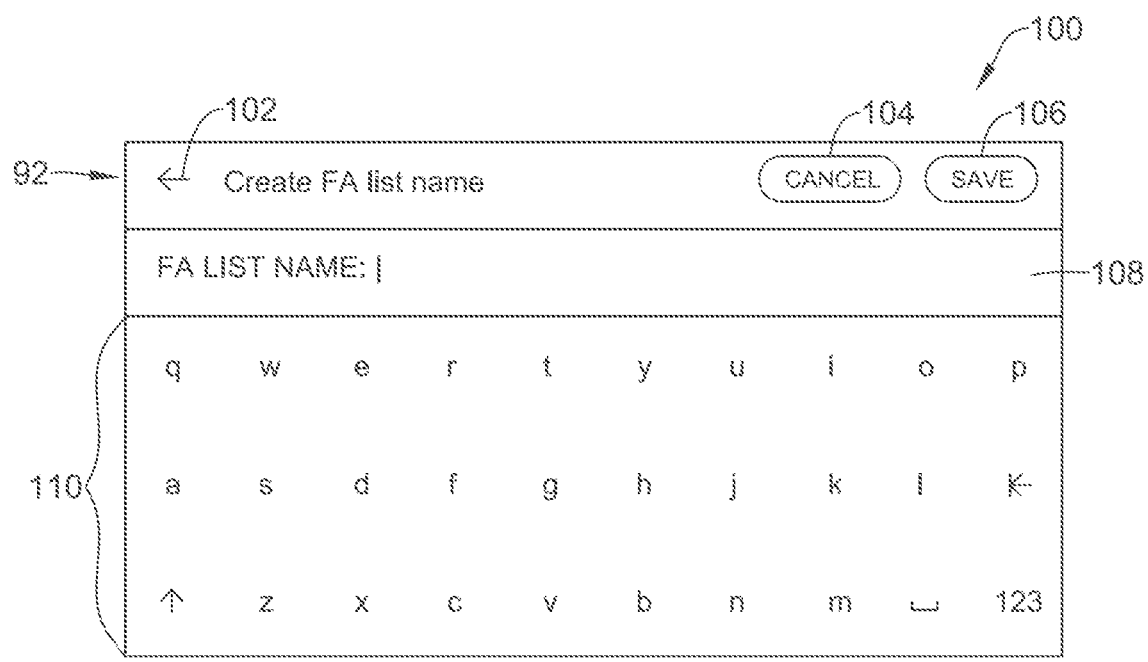
Figure 8:
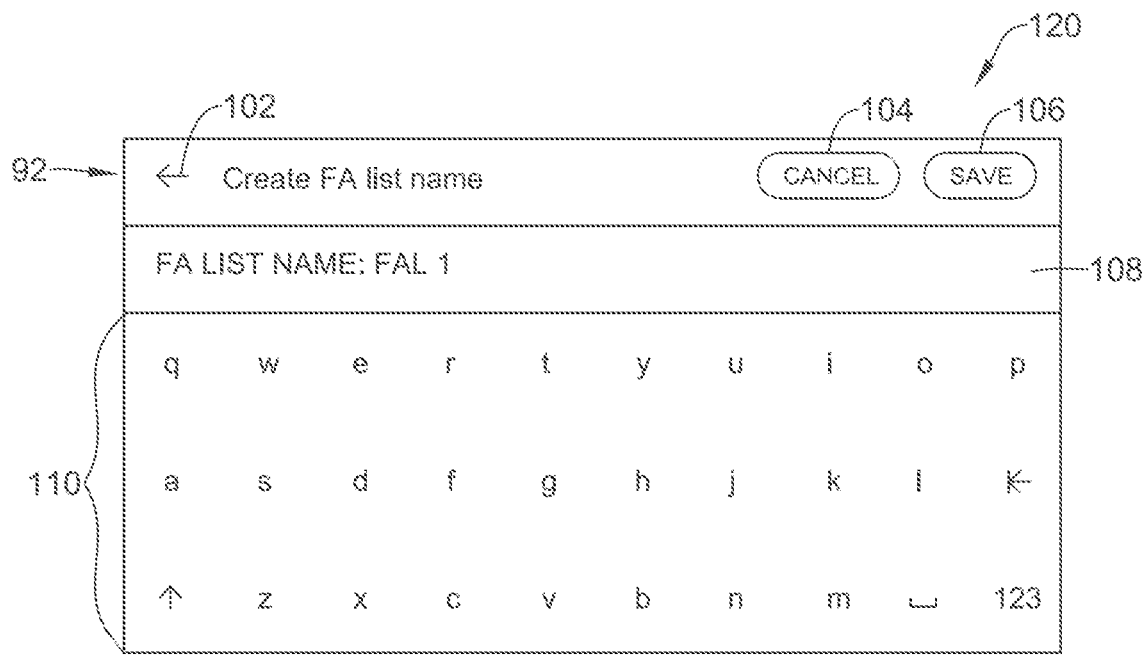

Selecting the FAST ACCESS icon 74 will cause the user interface device 20 to display a screen 90, as shown in FIG. 6. FIGS. 6 through 24 will show screens displayable by the user interface device 20 in working with FAST ACCESS lists. In FIG. 6, the screen 90 includes a COMMAND bar 92 that includes a HOME button 94 which, if selected, will cause the user interface device 20 to revert to the main menu page as shown in the screen 70 (FIG. 5). The COMMAND bar 92 includes text informing the user where they are in the menu, as well as a CREATE button 96. The screen 90 also includes a generic list including List 1, List 2, and so on, representing lists that can be named and populated if desired. To illustrate, selecting the CREATE button 96 will cause the user interface device 20 to display a screen 100, as shown in FIG. 7. As seen in FIG. 7, the COMMAND bar 92 now includes a BACK icon 102 which, if selected, will cause the user interface device 20 to revert to the previous screen 90 (FIG. 6), as well as text informing the user where they are in the menu. A CANCEL button 104 may be used to cancel what the user is doing while a SAVE button 106 may be used to save what the user is doing. The screen 100 includes an ACTION bar 108 that displays the name that the user is typing using the QWERTY keyboard 110.

Figure 9:
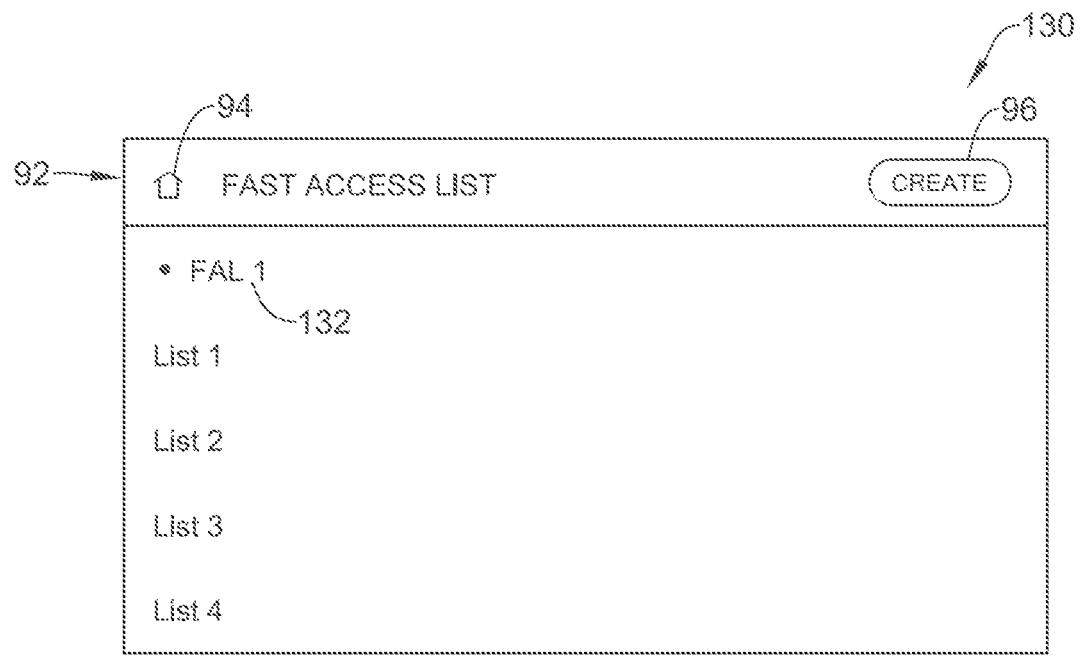
Figure 10:
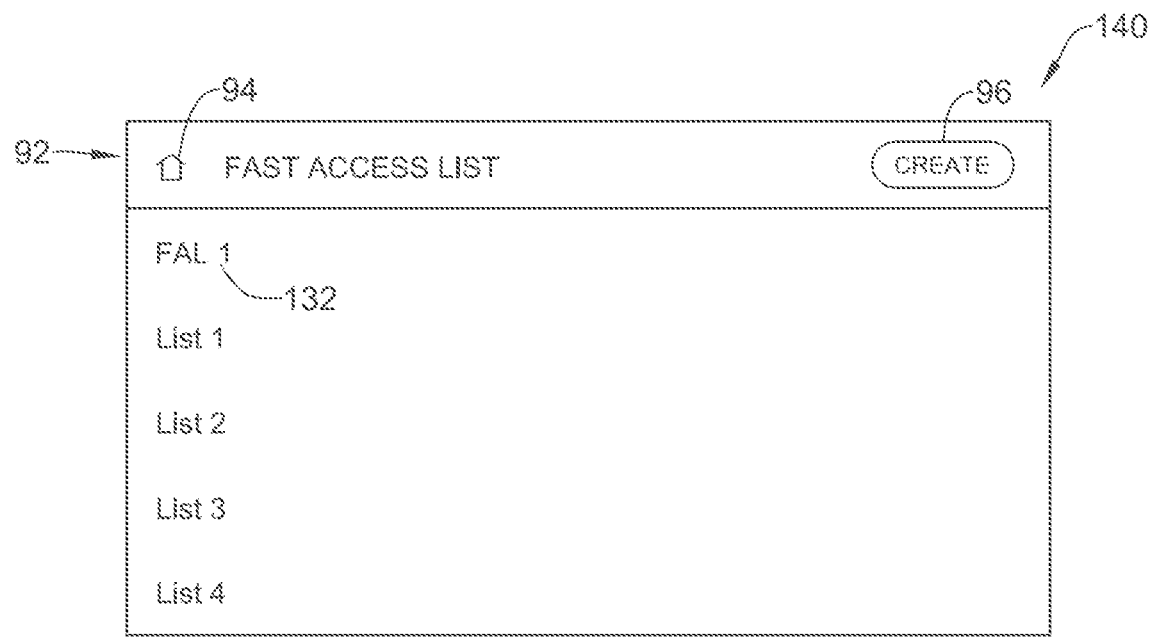

As seen in a screen 120 (FIG. 8), the ACTION bar 108 now reads that the FA LIST NAME is now FAL 1, as entered by the user. Assuming that the user is happy with this name, and did not make any typographical or spelling errors, the user may save the new name by selecting the SAVE button 106. In response to the user selecting the SAVE button 106, the user interface device 20 will display a screen 130 (FIG. 9). The screen 130 is identical to the screen 120 (FIG. 8), but includes the new name "FAL 1" displayed within the list. Once the list has been named, it can be accessed in order to, for example, at data points to that list. Selecting the FAL 1 icon 132 (FIG. 9) causes the user interface device 20 to display a screen 140 (FIG. 10).

Figure 11:
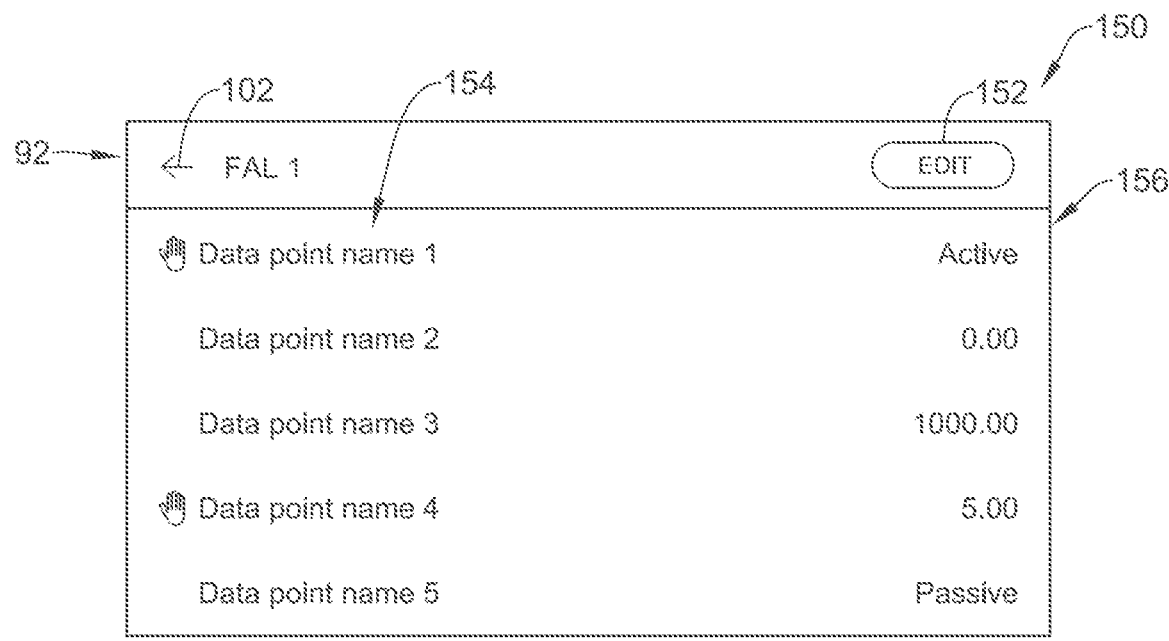

In the screen 140, the COMMAND bar 92 includes the HOME button 94, the CREATE button 96 as well as an indication of where the user is in the menu. The user may select an FA list, such as the FAL 1 list by selecting the FAL 1 icon 132. In response, the user interface device 20 will display a screen 150, as shown in FIG. 11. In the screen 150, the COMMAND bar 92 includes the BACK icon 102 and an EDIT button 152. The screen 150 includes a list 154 of data points as well as an accompanying list 156 of current values or current set points for the corresponding data points. The user may select the EDIT button 152 to cause the user interface device 20 to display a screen 160, as shown in FIG. 12.

Figure 12:
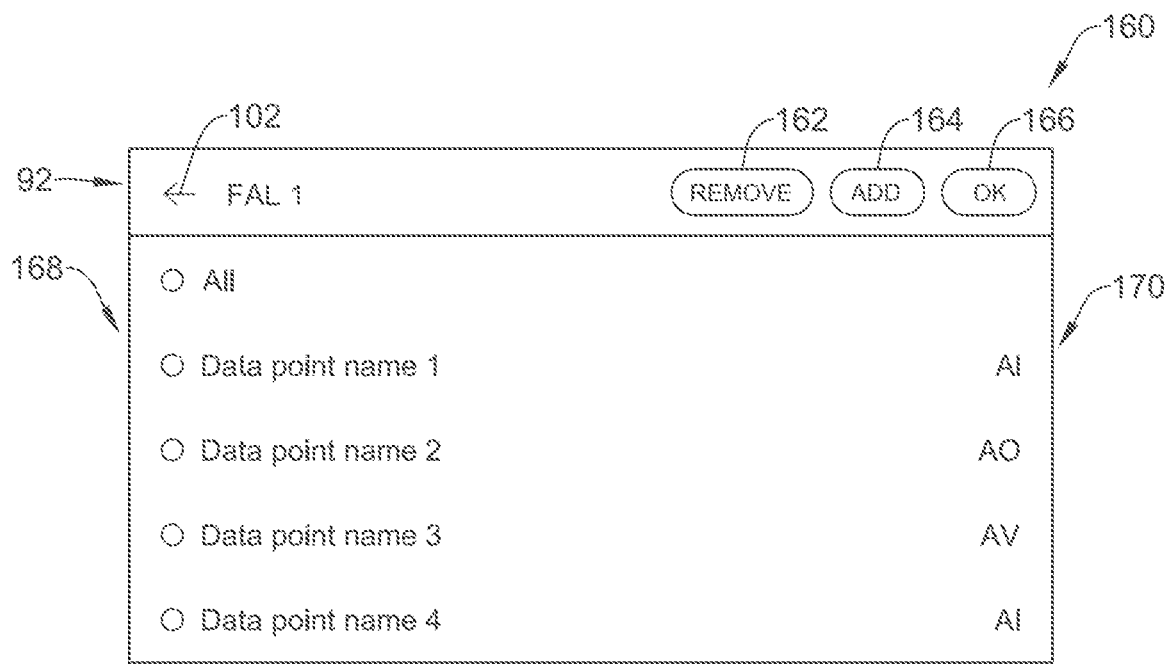
Figure 13:
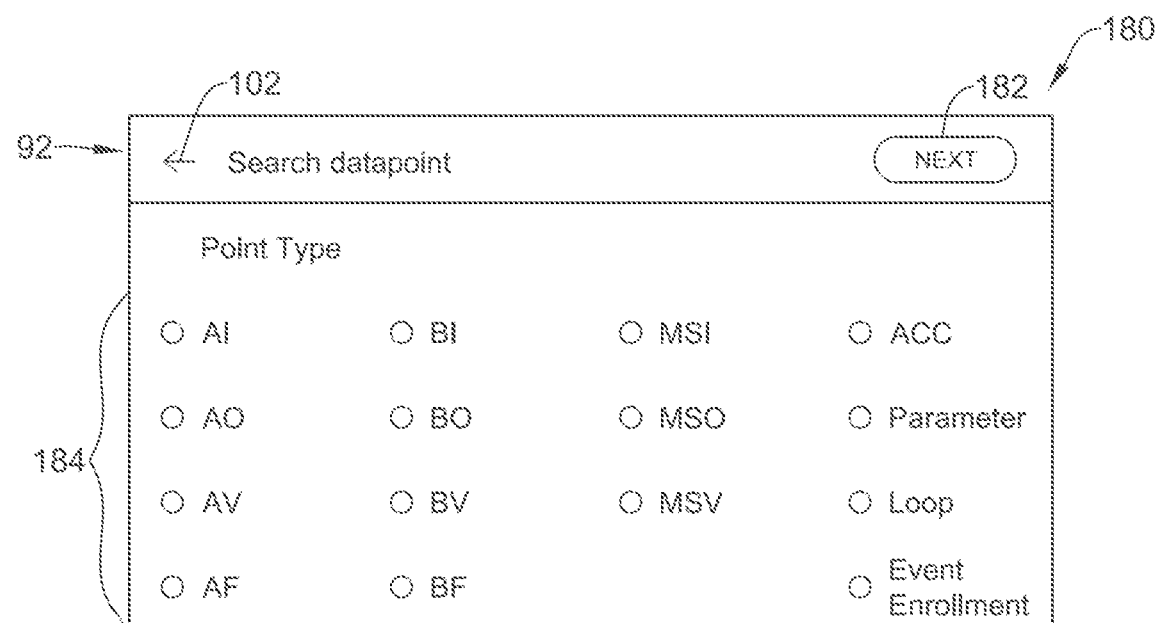

As shown in FIG. 12, the COMMAND bar 92 displayed in the screen 160 includes the BACK icon 102, a REMOVE button 162, an ADD button 164 and an OK button 166 as well as an indication of where the user is in the menu. The screen 160 includes a list 168 of data point names and an accompanying list 170 of corresponding values. Selecting the ADD button 164 will enable a user to add a new data point to the FAL 1 list, and will cause the user interface device 20 to display a screen 180 as seen in FIG. 13. In FIG. 13, the COMMAND bar 92 can be seen as including a NEXT button 182. The screen 180 includes a list 184 of point types along with radio buttons that can be used to select any or all of the point types.

Figure 14:
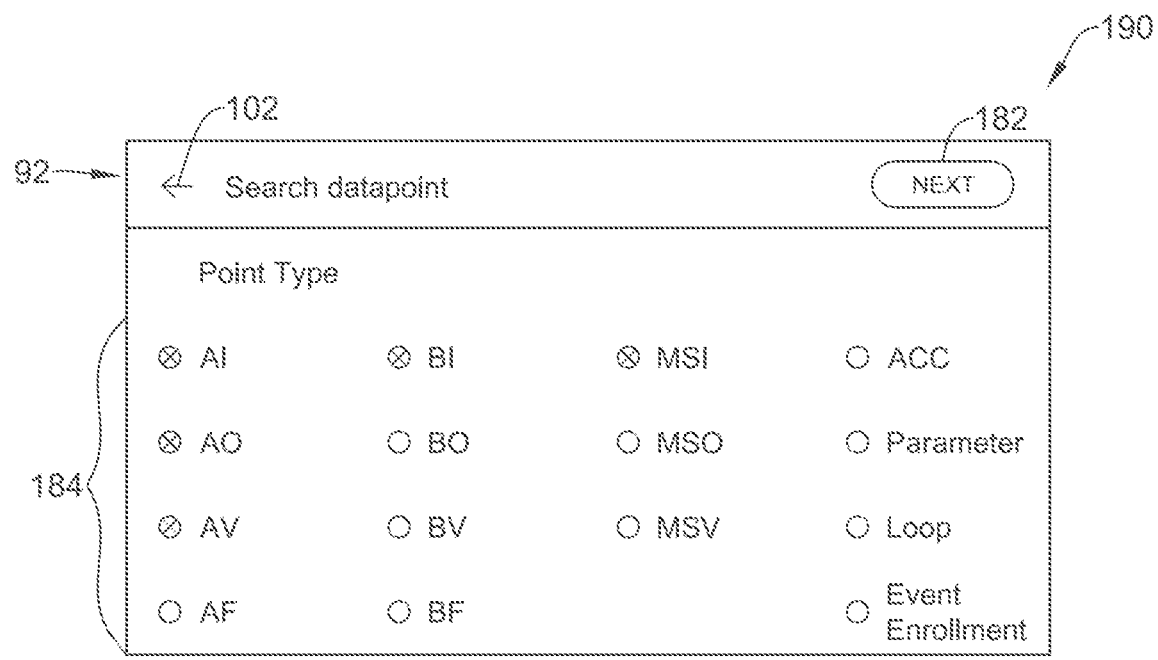
Figure 15:
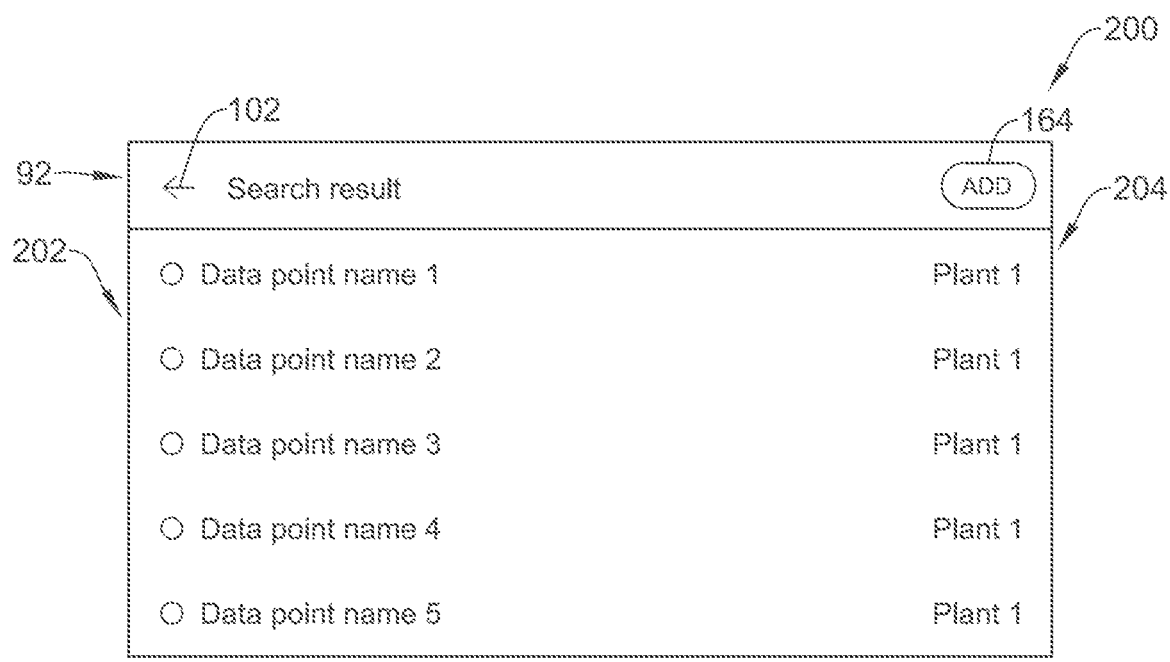
Figure 16:
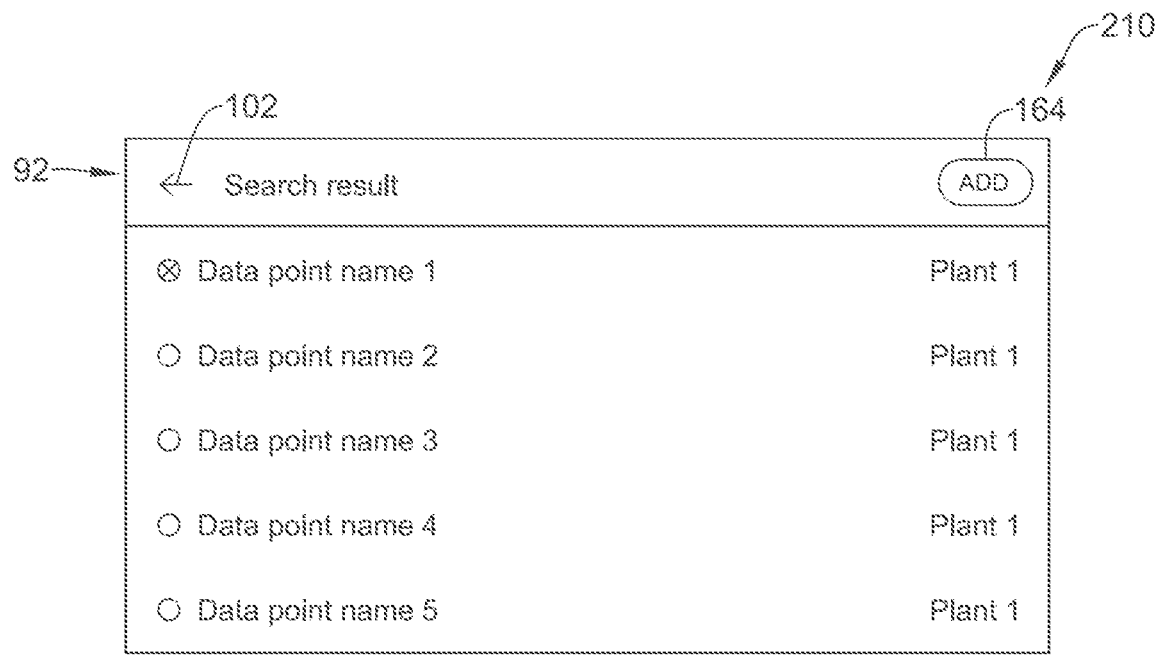

FIG. 14 shows a screen 190, which is the result of the user selecting particular point types, as indicated by the filled in radio buttons alongside some of the point types. At this point, the user can select the NEXT button 182 to move to a screen 200, as shown in FIG. 15. As seen in the screen 200, the COMMAND bar 92 includes the BACK icon 102 and the ADD button 164. The screen 200 includes a list 202 of data points as well as an accompanying list 204 of plants that correspond to the data points. In order to add the Data point name 1, for example, the user may select that data point as indicated by the filled in radio button shown in a screen 210 (FIG. 16). The user may then select the ADD button 164 to add the selected data point.

Figure 17:
Figure 18:
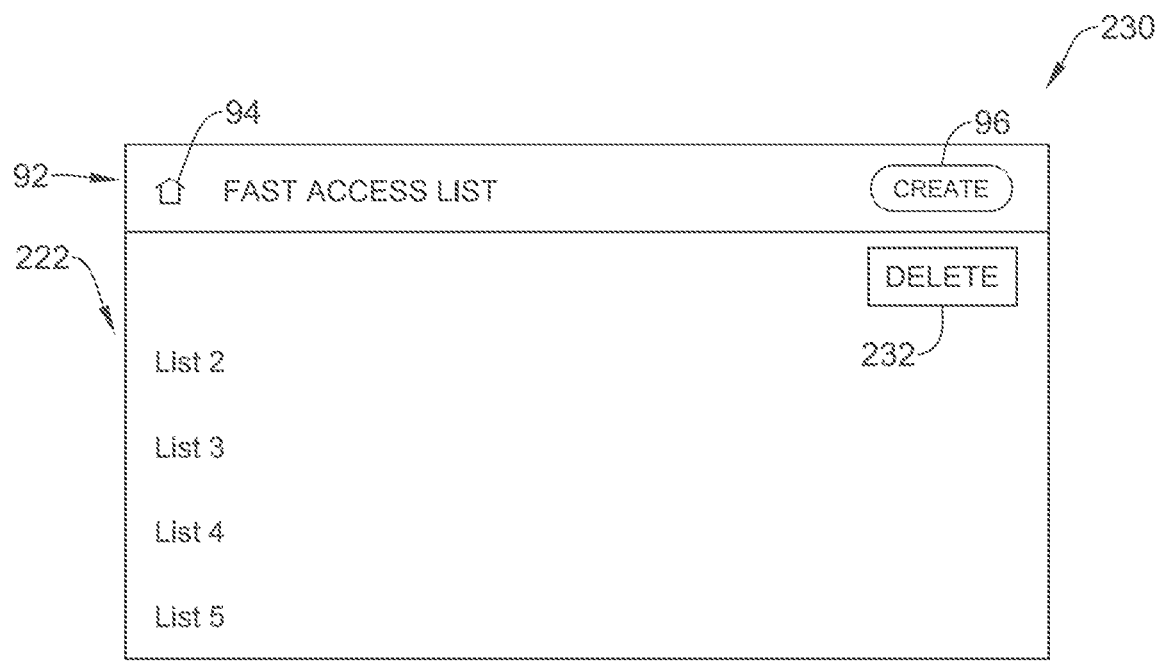
Figure 19:
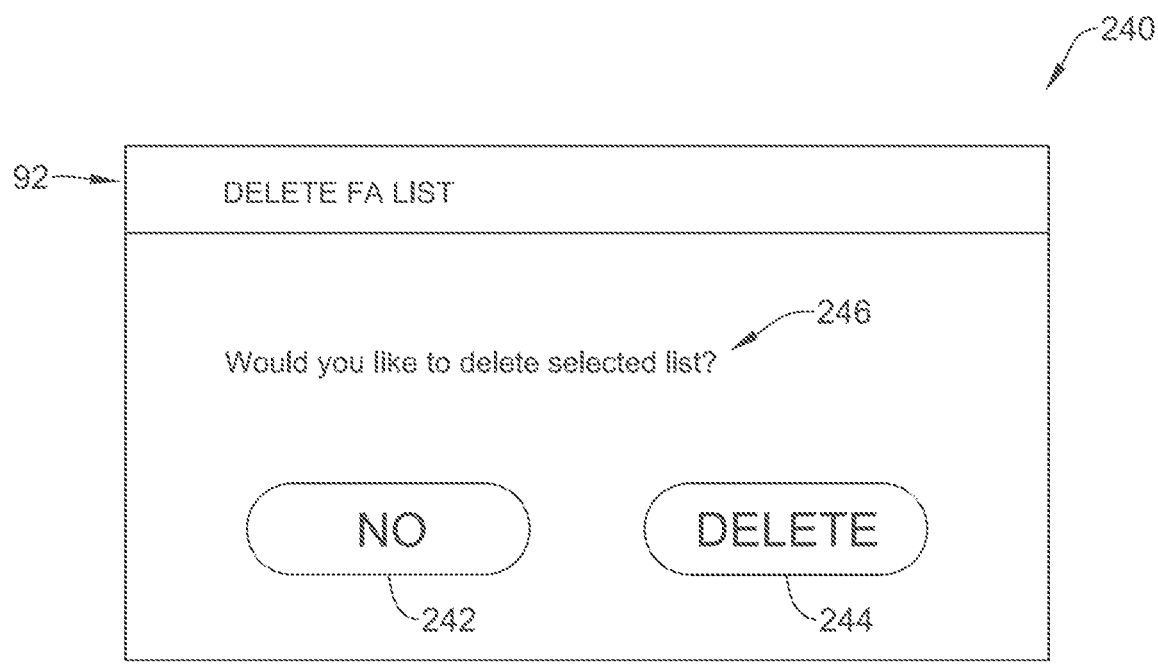

FIGS. 17-19 show illustrative screens that pertain to deleting a list. FIG. 17 shows a screen 220 in which the COMMAND bar 92 includes the HOME button 94 and the CREATE button 96 as well as an indication of where the user is in the menu. The screen 220 includes a list 222 of FA lists. The user may select the List 1 by sliding left near a LIST 1 icon 224, causing the user interface device 20 to display a screen 230 (FIG. 18). As can be seen, the list 222 no longer includes the LIST 1 icon 224. A DELETE button 232 may be selected in order to delete the LIST 1 from the list of FA lists. Pressing the DELETE button 232 causes the user interface device 20 to display a screen 240 (FIG. 19) that includes a NO icon 242 and a DELETE icon 244, along with an alphanumeric message 246 that asks the user to confirm whether they wish to proceed with the deletion. Pressing the DELETE icon 244 will cause the selected List 1 to be deleted.

Figure 20:
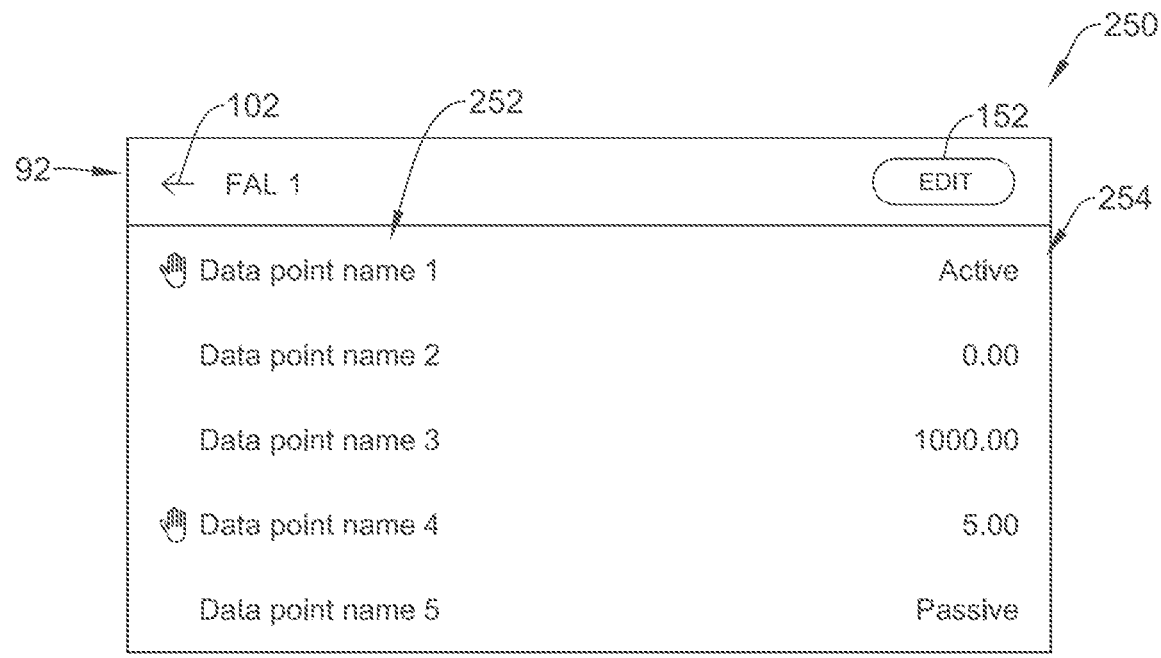
Figure 21:
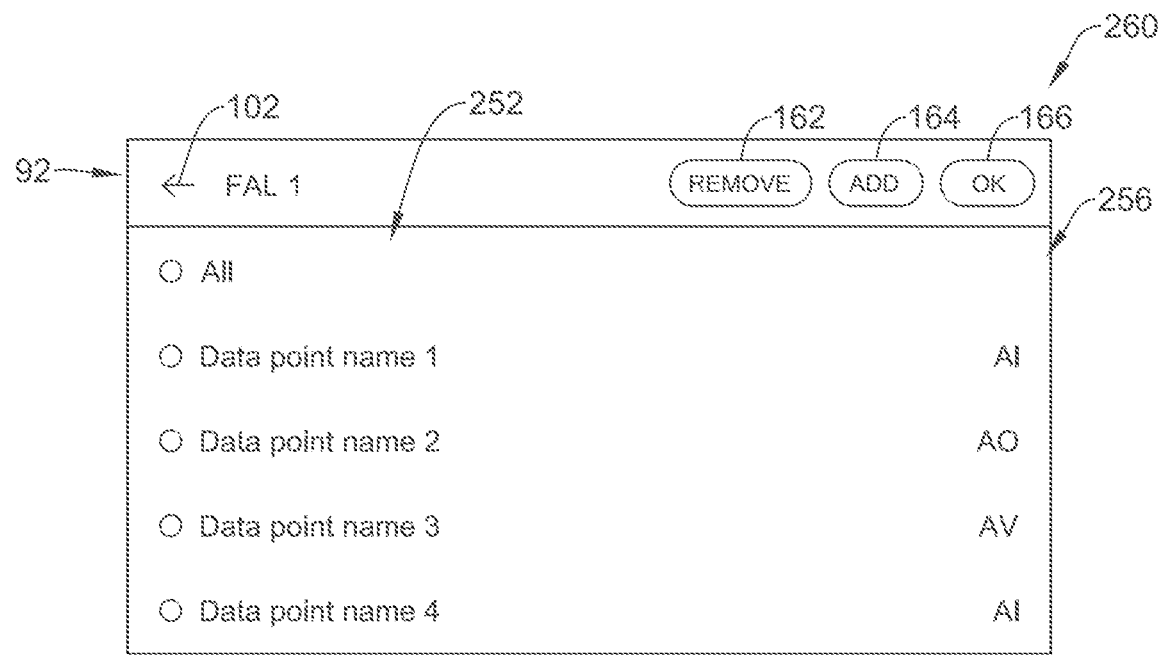
Figure 22:
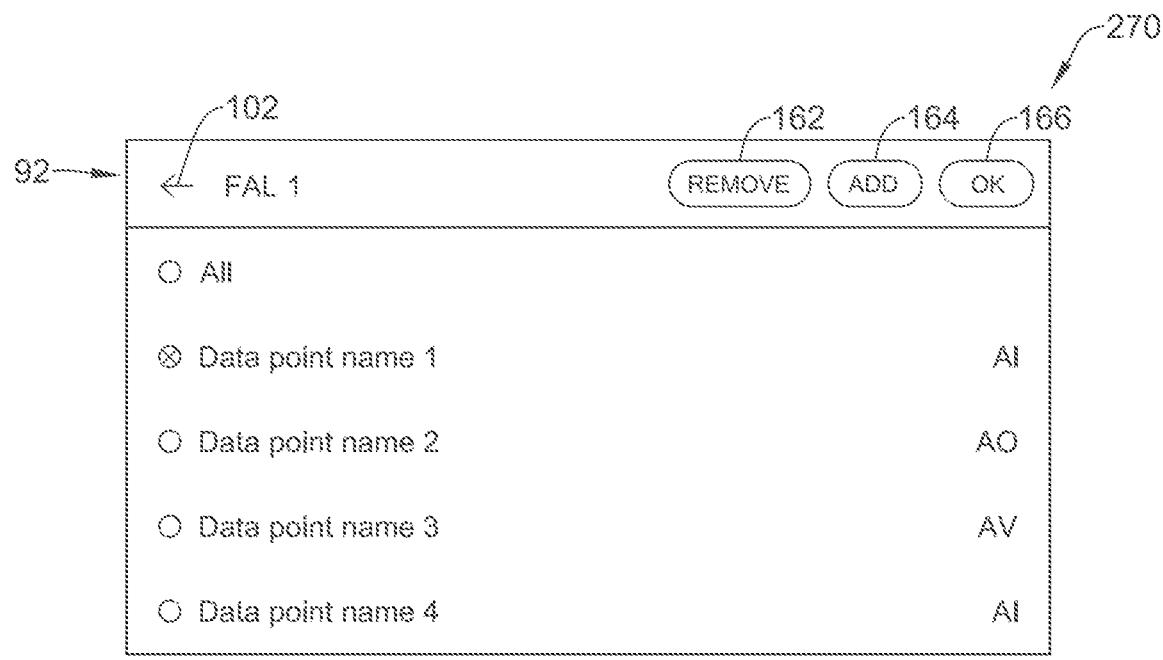

FIGS. 20-22 show illustrative screens that pertain to removing one or more points. FIG. 20 shows a screen 250 that includes a list 252 of data point names as well as an accompanying list 254 of corresponding values for the data points. Selecting the EDIT button 152 causes the user interface device 20 to display a screen 260 (FIG. 21) that includes the list 252 as well as a list 256 of plant types. The user may delete the data point name 1 by selecting a corresponding radio button. This can be seen in FIG. 22, which shows a screen 270 in which the radio button corresponding to the data point 1 has been selected. Pressing the REMOVE button 162 will delete the selected data point.

Figure 23:
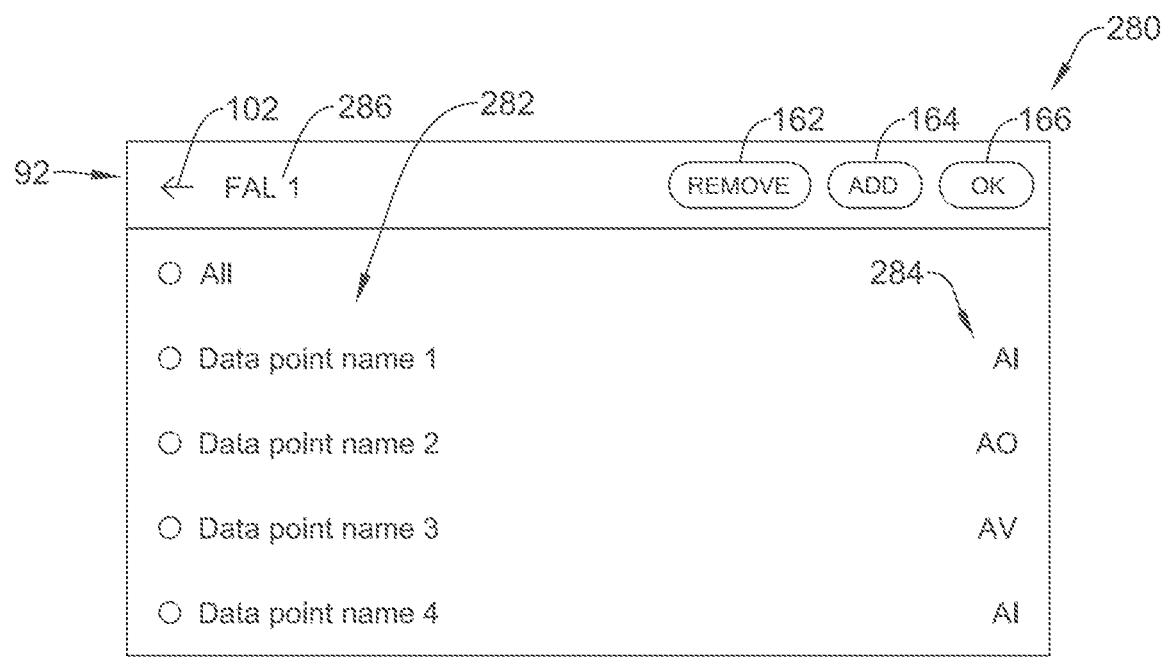
Figure 24:
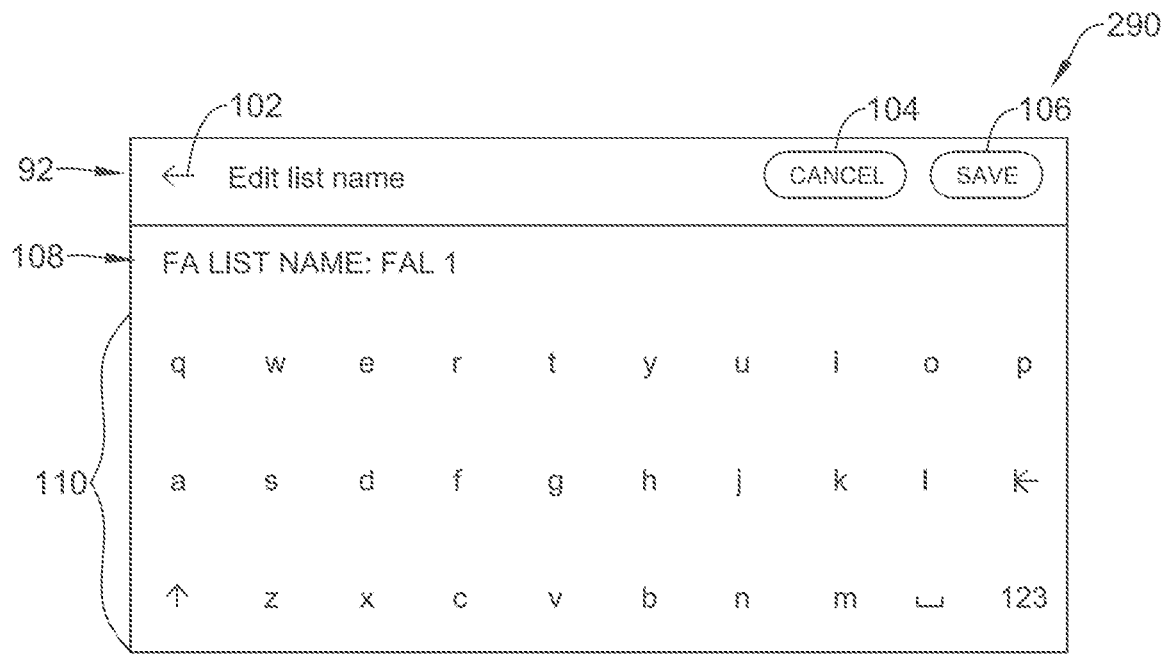

FIGS. 23 and 24 show illustrative screens that pertain to renaming a FA list. In FIG. 23, a screen 280 includes a list 282 of data points and a list 284 of corresponding plant types. The COMMAND bar 92 includes a FAL 1 icon 286. By selecting the FAL 1 icon 286, the user interface device 20 displays a screen 290 that enables the user to rename the selected FA list. The ACTION bar 108 includes an identification of which Fast Access list is being renamed, and the COMMAND bar 92 includes an indication that the user is to proceed with amending the name. They can use the QWERTY keyboard 110 to enter a new or revised name, and can then select the SAVE button 106 to save the new name.

Figure 25:
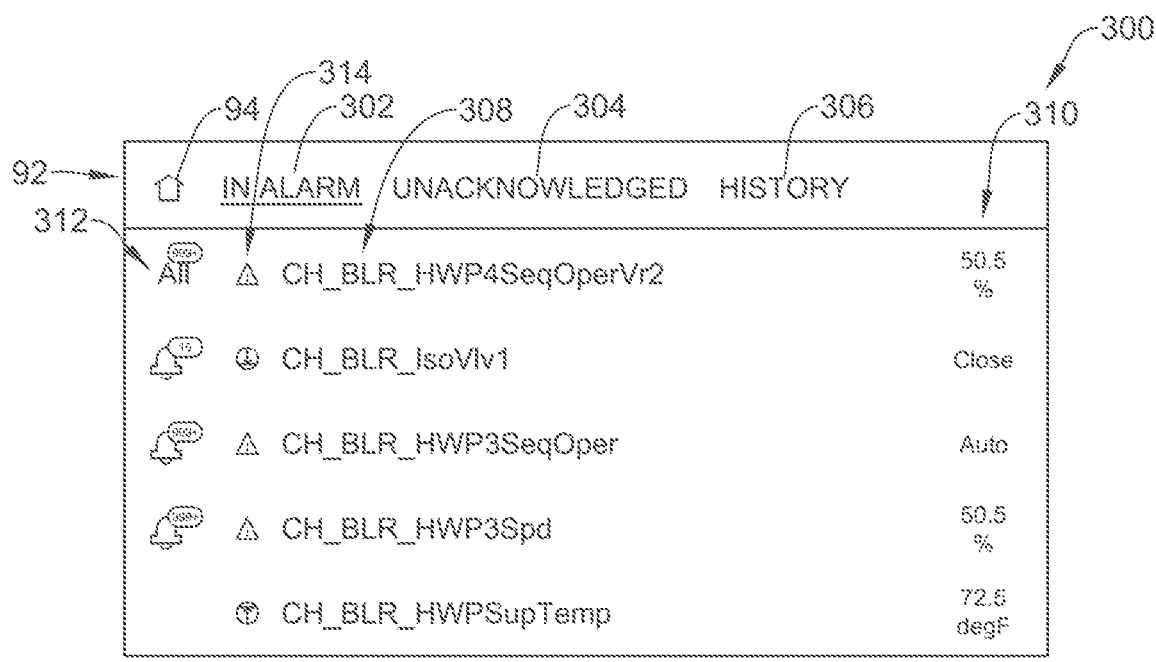
FIGS. 25 through 33 are screen shots of ALARM screens.

FIGS. 25 through 33 are screen shots of illustrative ALARM screens that may be displayed by the user interface device 20. Pressing the ALARMS icon 76 on the main menu screen (FIG. 5) will cause the user interface device 20 to display a screen 300, as shown in FIG. 25. The screen 300 includes a listing of all data points that are in alarm. It can be seen that the COMMAND bar 92 includes an IN ALARM icon 302, an UNACKNOWLEDGED icon 304 and a HISTORY icon 306. As can be seen, the IN ALARM icon 302 has been selected, and thus the screen 300 includes a list 308 of all current alarms. The screen 300 includes a list 310 of current values for the data points that are listed in the list 308, as well as a list 312 of alarm frequency and a list 314 of alarm seriousness for each of the data points that are listed in the list 308 as being in alarm.

Figure 26:
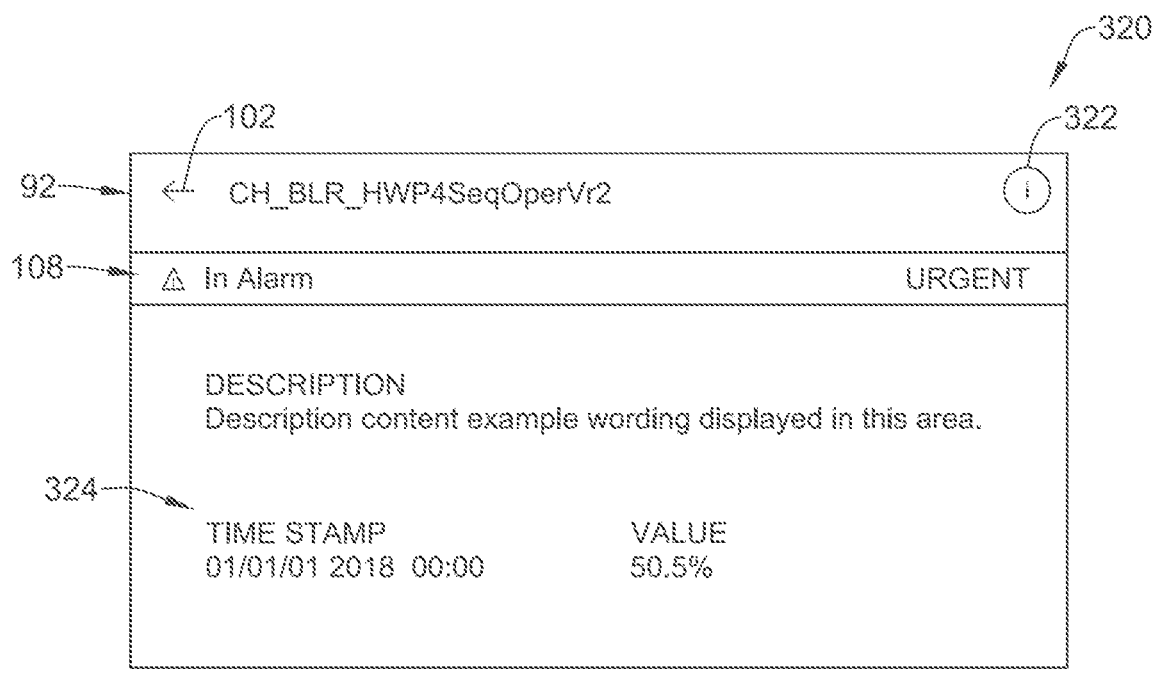

Selecting, for example, the first data point listed in the list 308 causes the user interface device 20 to display a screen 320, as shown in FIG. 26. As can be seen, the COMMAND bar 92 includes an INFORMATION button 322 that may be selected to provide additional information, for example, as well as the name of the selected data point. The ACTION bar 108 includes an indication that the data point is in alarm, as well as an indication that the alarm is URGENT. The screen 320 includes additional information 324 regarding the data point and the corresponding alarm.

Figure 27:
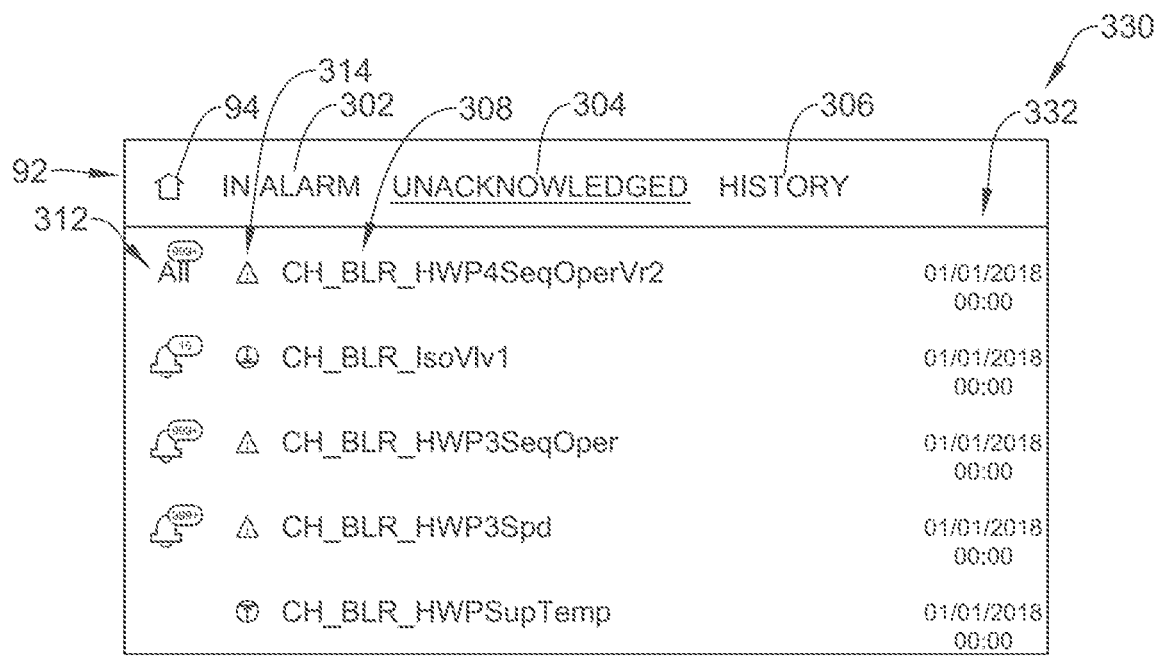
Figure 28:
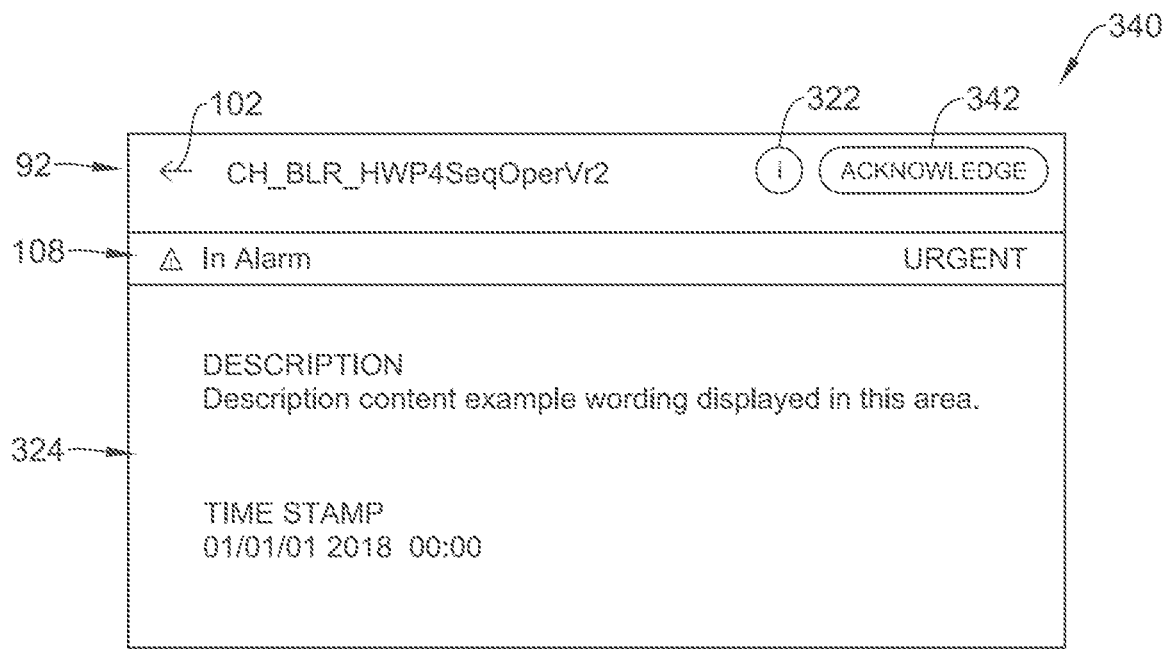

FIG. 27 shows a screen 330 that shows unacknowledged alarms. As can be seen, the UNACKNOWLEDGED icon 304 has been selected. It will be appreciated that the data point names shown in the Figures are illustrative only, and are not intended to be unique. The screen 330 includes a list 332 showing date and time for when each of the listed data points went into alarm. Selecting the first listed data point, for example, will cause the user interface device 20 to display a screen 340, as shown in FIG. 28. As can be seen, the COMMAND bar 92 includes the INFORMATION button 322, an ACKNOWLEDGE button 342 that may be used by the user to acknowledge a particular alarm as well as the name of the selected data point. The ACTION bar 108 includes an indication that the data point is in alarm, as well as an indication that the alarm is URGENT. The screen 340 includes additional information 324 regarding the data point and the corresponding alarm.

Figure 29:
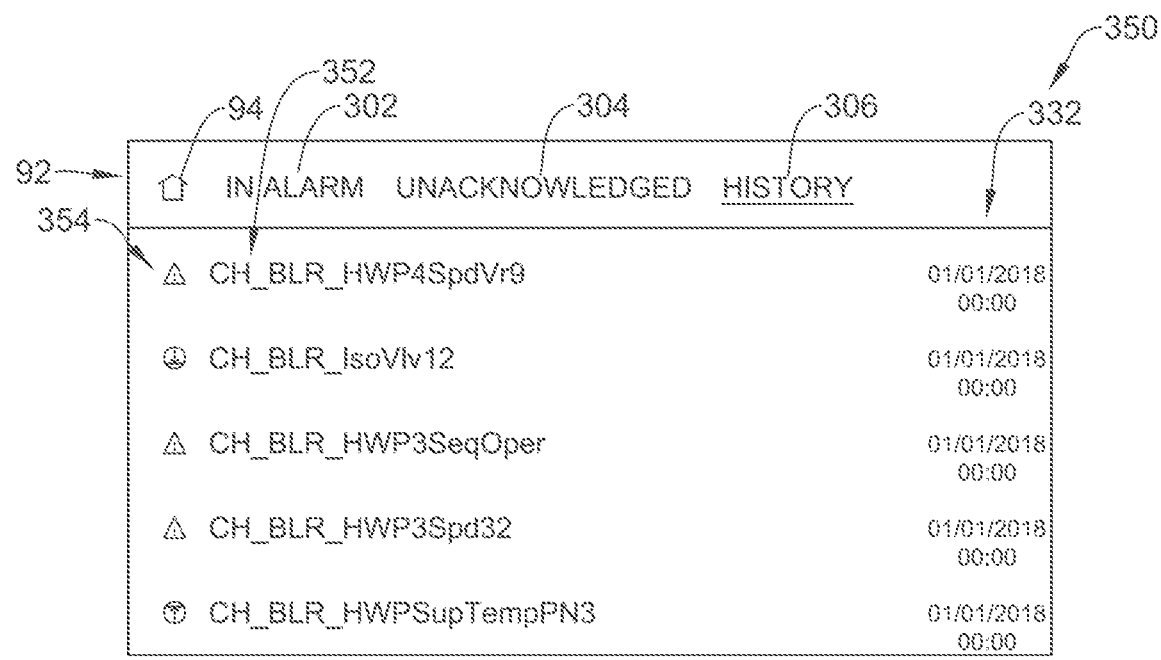
Figure 30:
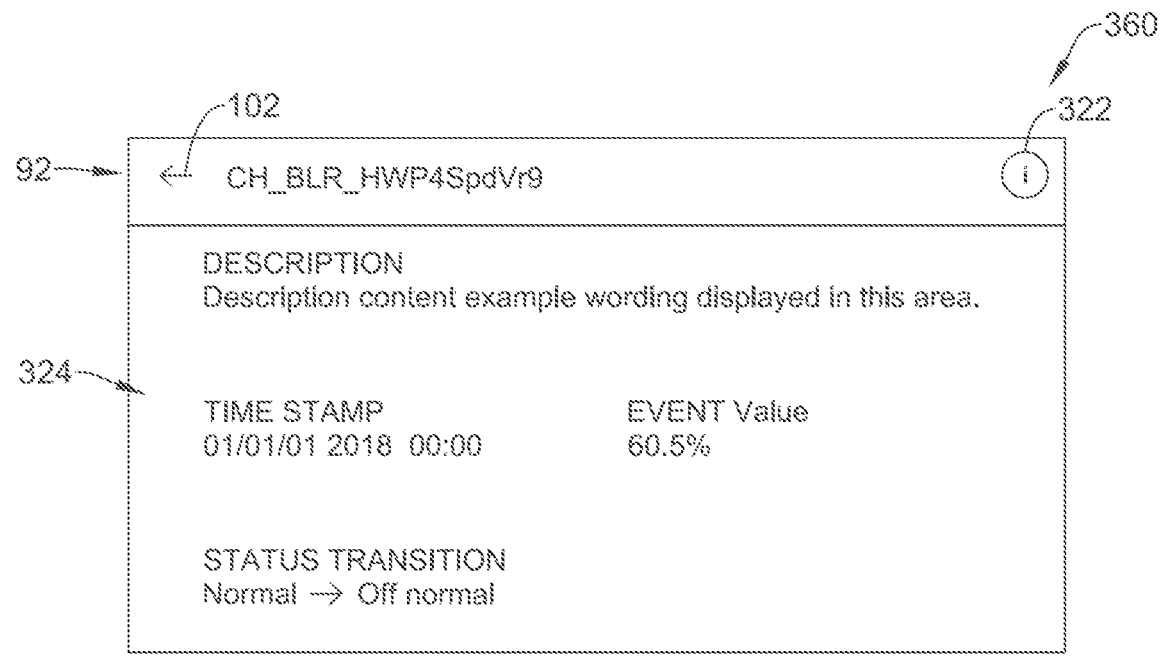

In FIG. 29, the user interface device 20 is displaying a screen 350 that lists alarm history, as indicated by the HISTORY icon 306 being selected. Again, it will be appreciated that the data point names shown in the Figures are illustrative only, and are not intended to be unique. The screen 350 includes a list 352 of data points that have previously been in alarm. A list 354 shows the severity of each alarm, and the list 332 showing date and time for when each of the listed data points went into alarm. Selecting the first listed data point, for example, will cause the user interface device 20 to display a screen 360, as shown in FIG. 30. As can be seen, the COMMAND bar 92 includes the INFORMATION button 322 and the name of the selected data point. The screen 360 includes additional information 324 regarding the data point and the corresponding alarm.

Figure 31:
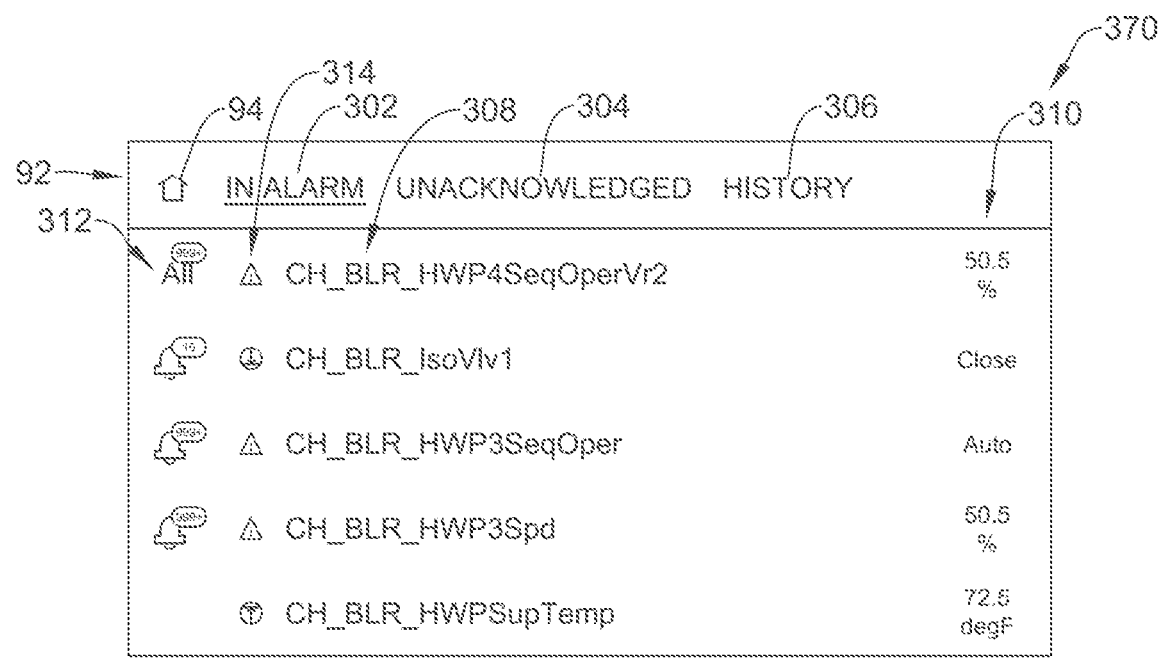
Figure 32:
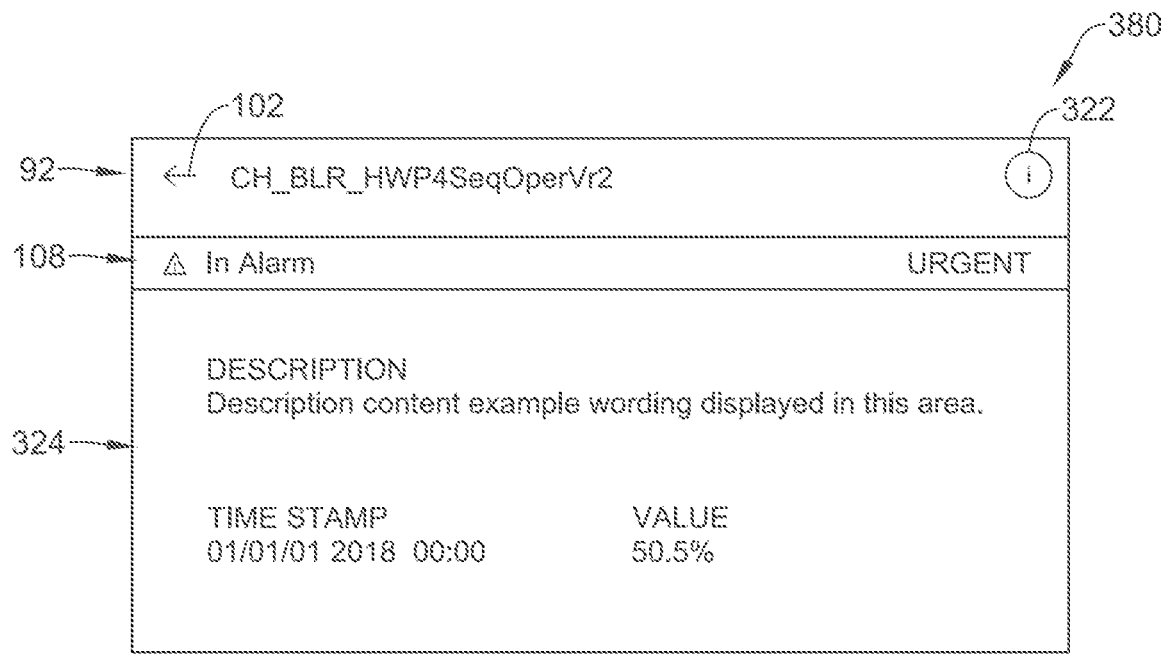
Figure 33:
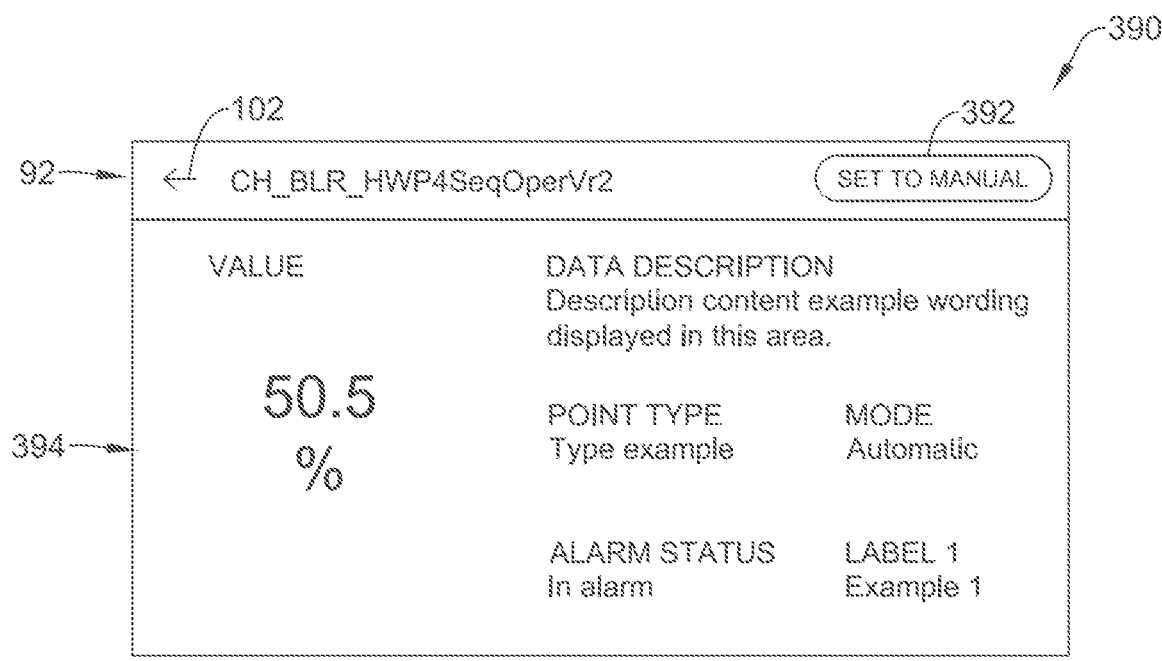

FIGS. 31 through 33 illustrate how to proceed from an alarm detail page to point detail. FIG. 31 shows a screen 370 that is similar to the screen 330 shown in FIG. 27. Selecting the first listed data point causes the user interface device 20 to display a screen 380, as shown in FIG. 32. As can be seen, the COMMAND bar 92 includes the INFORMATION button 322 and the name of the selected data point. The ACTION bar 108 includes an indication that the data point is in alarm, as well as an indication that the alarm is URGENT. The screen 340 includes additional information 324 regarding the data point and the corresponding alarm. Selecting the INFORMATION button 322 causes the user interface device 20 to display a screen 390, as shown in FIG. 33. The COMMAND bar 92 includes a SET TO MANUAL button 392 that may be used to manually adjust the particular data point that is in alarm.

Figure 34:
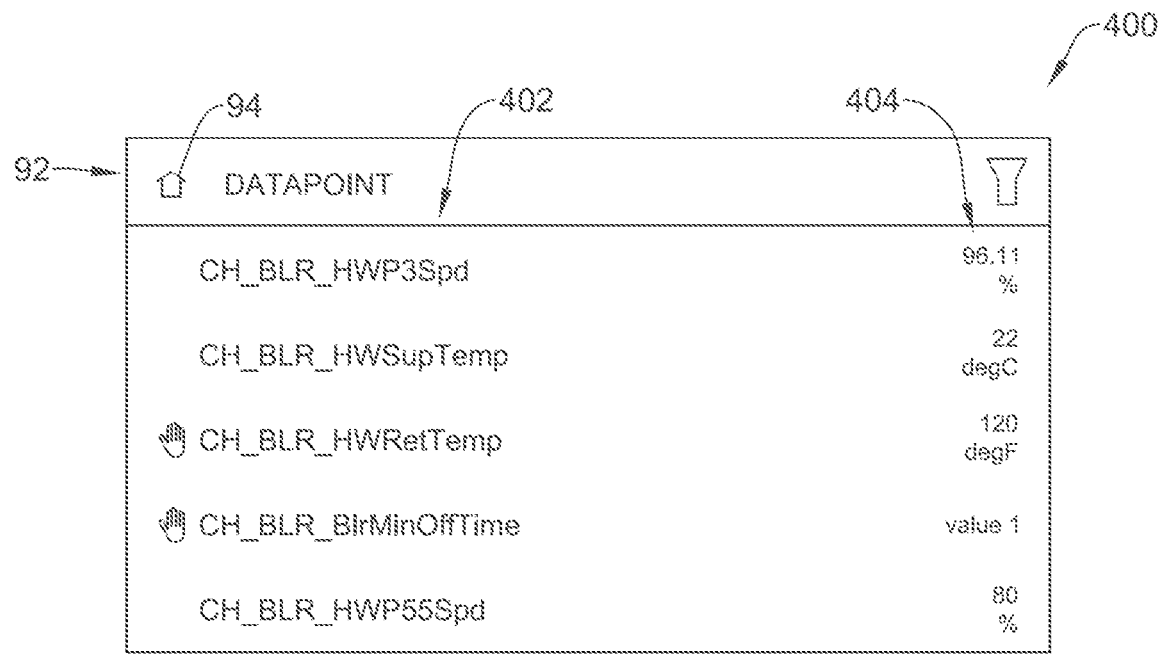
FIGS. 34 through 44 are screen shots of DATA POINT LIST screens.
Figure 35:
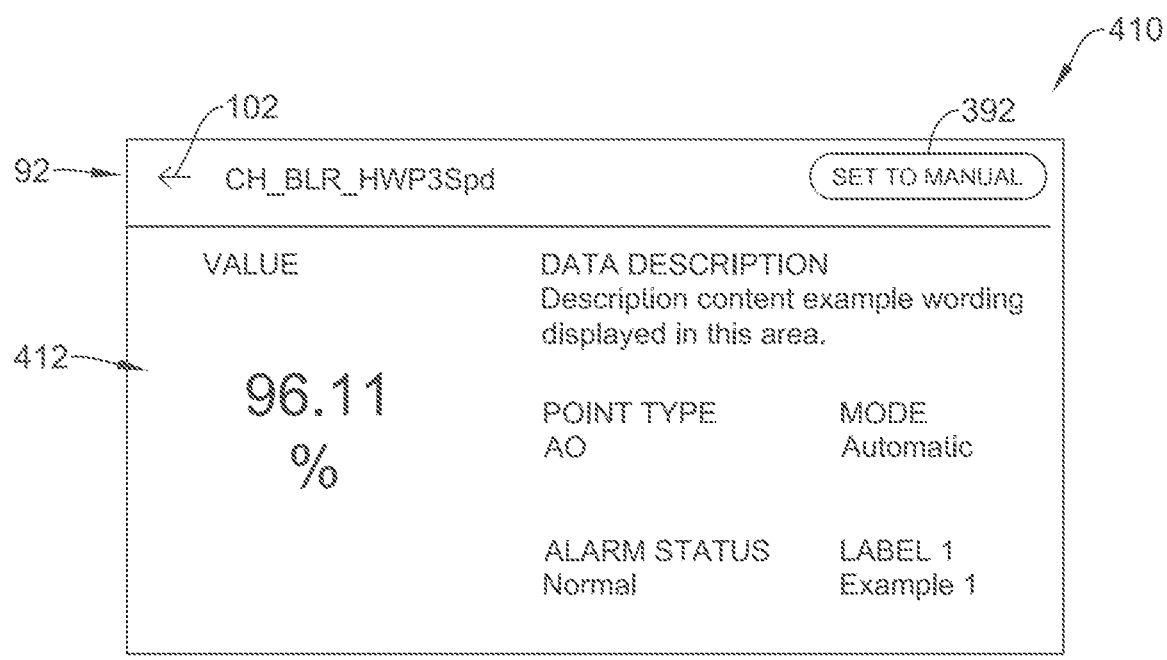
Figure 36:
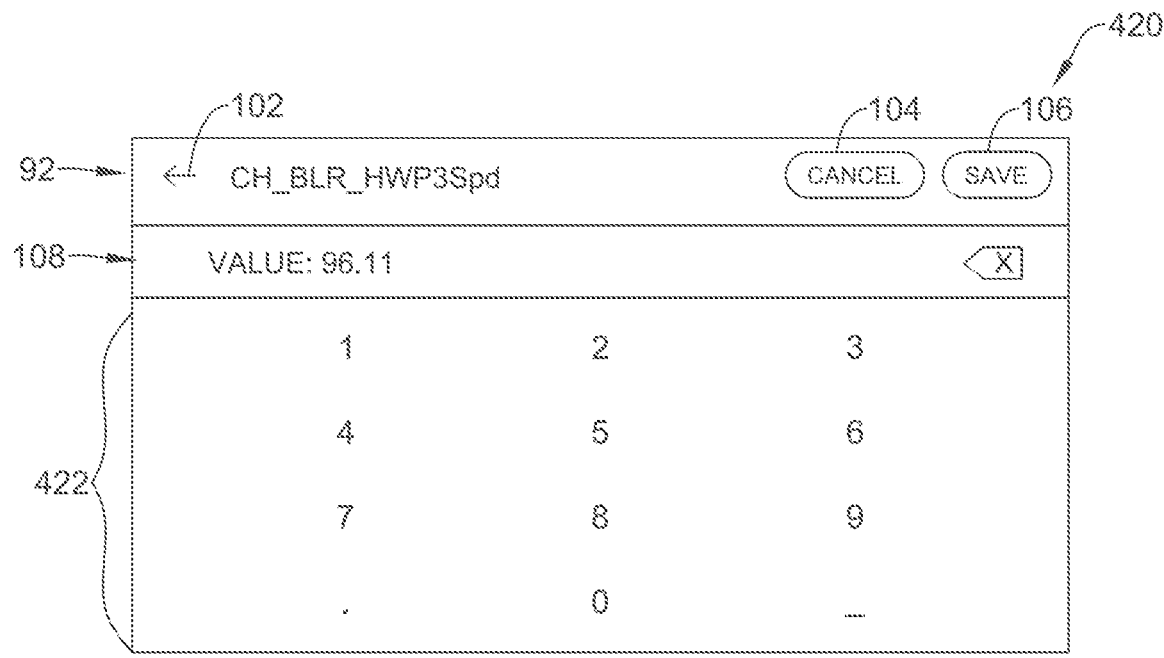
Figure 37:
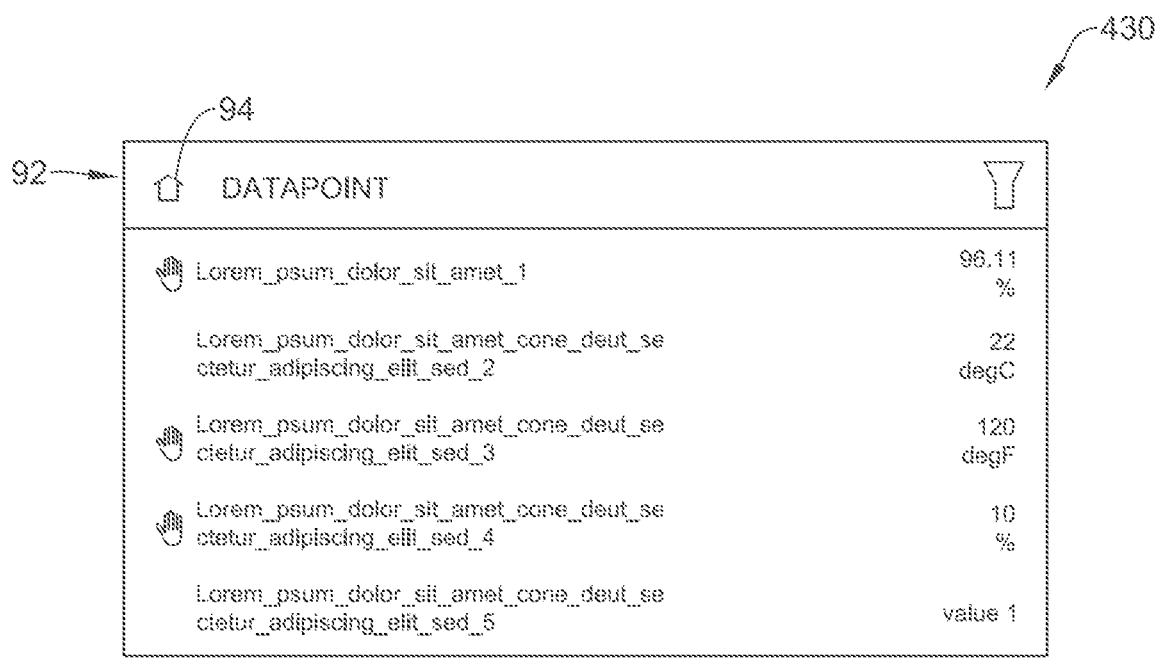

FIG. 34 shows a screen 400 that may be displayed by the user interface device 20 in response to selecting the DATA POINT icon 78 in FIG. 5. The screen 400 includes a list 402 of data points as well as a list 404 of the corresponding values of each of the data points. Selecting the first listed data point causes the user interface device 20 to display a screen 410, as shown in FIG. 35. The COMMAND bar 92 includes the SET TO MANUAL button 392 and the screen 410 includes additional information 412 pertaining to the selected data point. If the user selects the SET TO MANUAL button 392, the user interface device 20 displays a screen 420, as shown in FIG. 36. In FIG. 36, the ACTION bar 108 includes the current value for the data point. A numeric keypad 422 is displayed so that the user can change the value for the selected data point. Once they have adjusted the value, they can select the SAVE button 106 to save the new value. Alternatively, they can select the CANCEL button 104 if they do not wish to change the value of the selected data point. FIG. 37 shows a screen 430 that illustrates that the user interface device 20 is able to display up to two lines of alphanumeric text for each of the data points. It will be appreciated that the text shown is intended to be merely illustrative.

Figure 38:
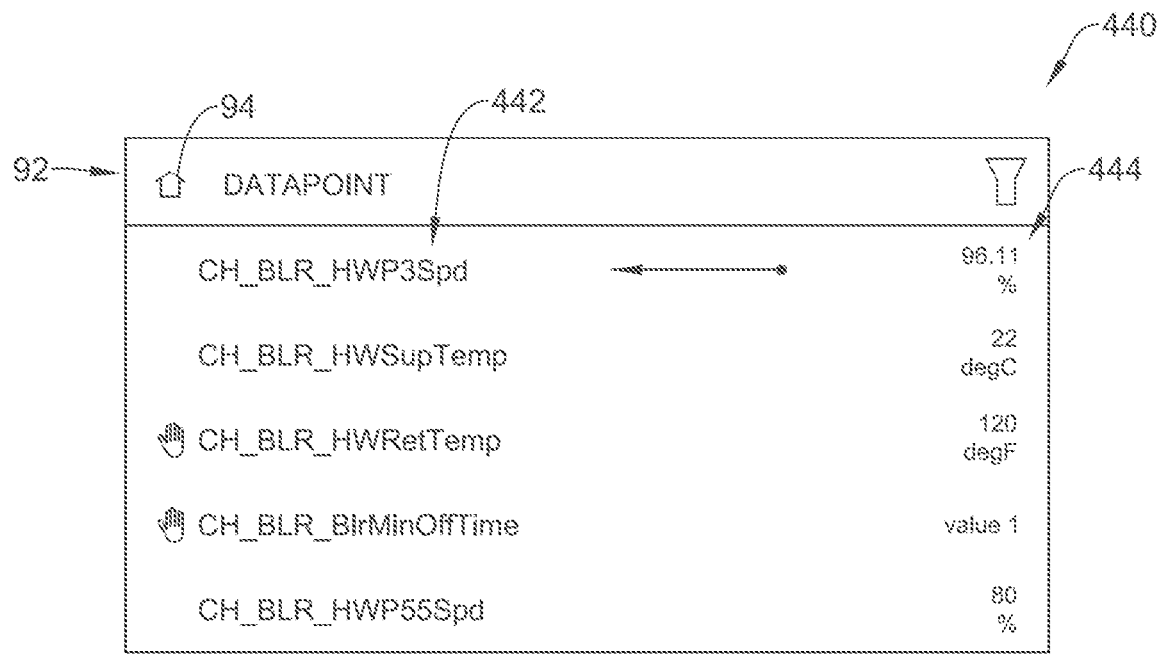
Figure 39:
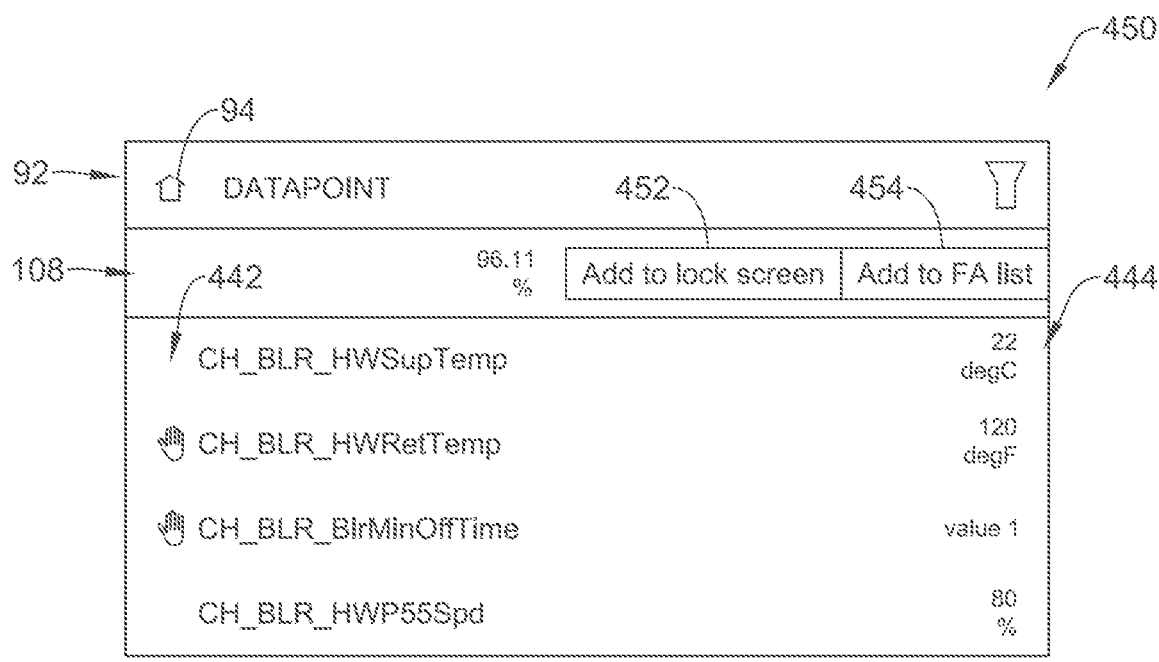

FIGS. 38 through 41 show screens pertaining to adding data points to the Fast Access list. FIG. 38 shows a screen 440 including a list 442 of data points and a list 444 of the corresponding values for each of the listed data points. A user may select one of the data points (as illustrated the user is selecting the top listed data point) by sliding left on the desired data point. In response, the user interface device 20 displays a screen 450. The ACTION bar 108 includes an indication of the current value of the selected data point. The ACTION bar 108 also includes an ADD TO LOCK SCREEN icon 452 and an ADD TO FA LIST icon 454. It will be appreciated that the ACTION bar 108 has been superimposed over or has otherwise replaced the selected data point within the list 442 and the list 444.

Figure 40:
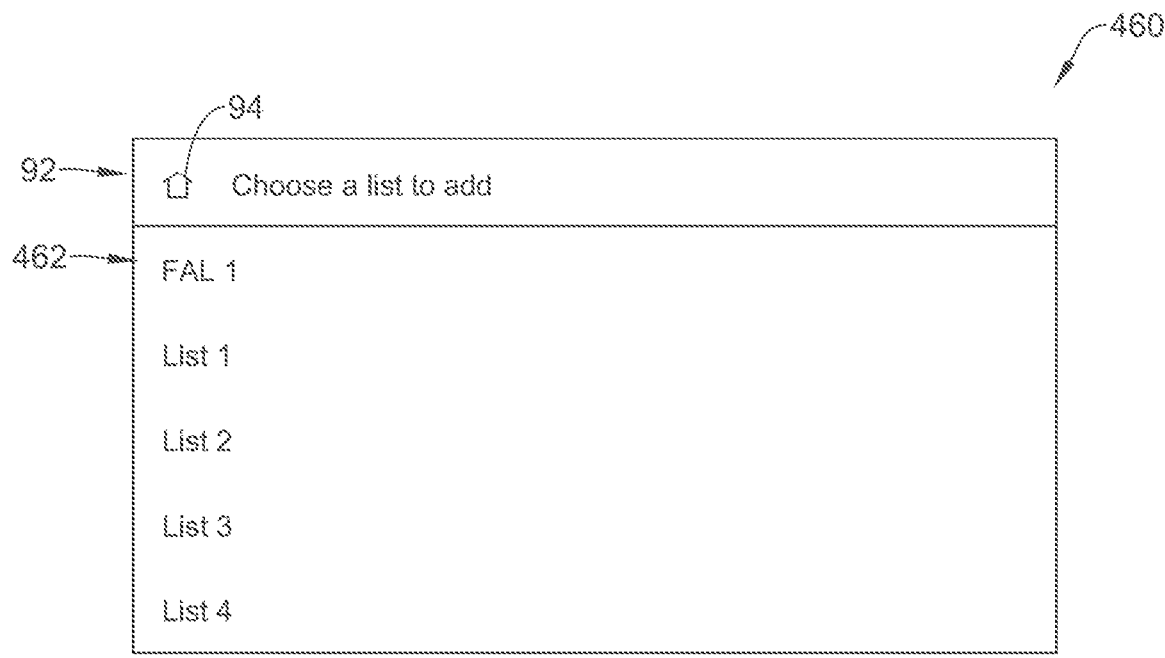
Figure 41:
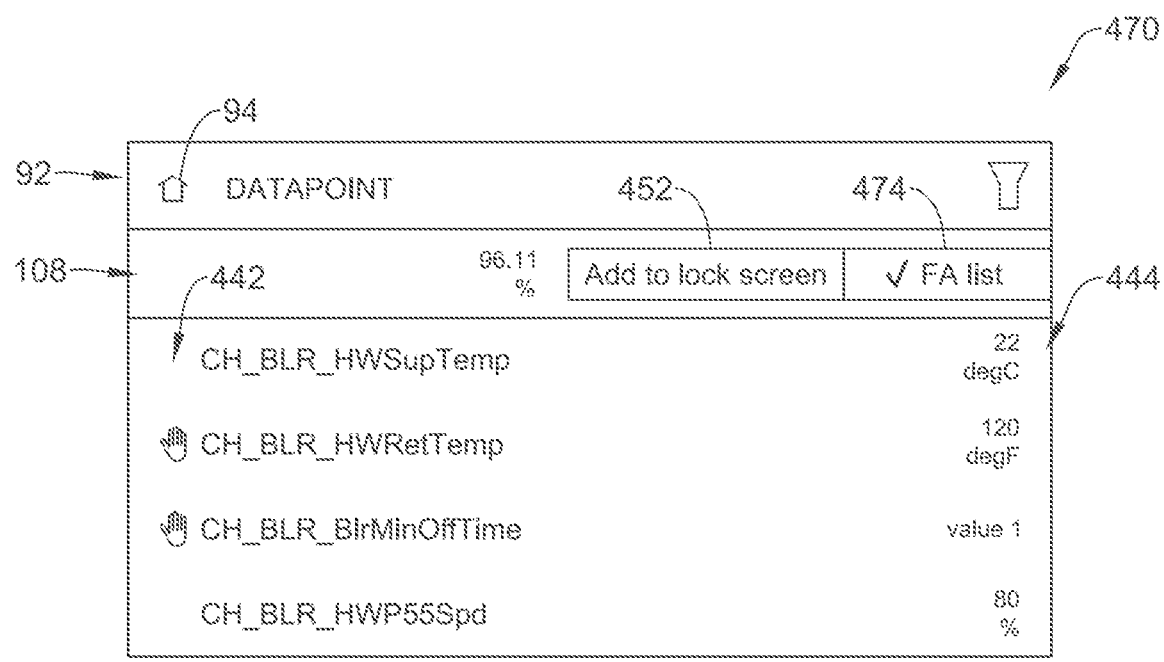

Selecting the ADD TO FA LIST icon 454 causes the user interface device 20 to display a screen 460, as shown in FIG. 40. The COMMAND bar 92 includes instructions that the user is to choose a list to add. The user can select one of the data points shown in a list 462, which causes the user interface device 20 to display a screen 470, as shown in FIG. 41. In FIG. 41, the ACTION bar 108 includes the ADD TO LOCK SCREEN icon 452 and includes an FA LIST icon 474 that includes a check mark to indicate that the data point was successfully added to the selected list.

Figure 42:
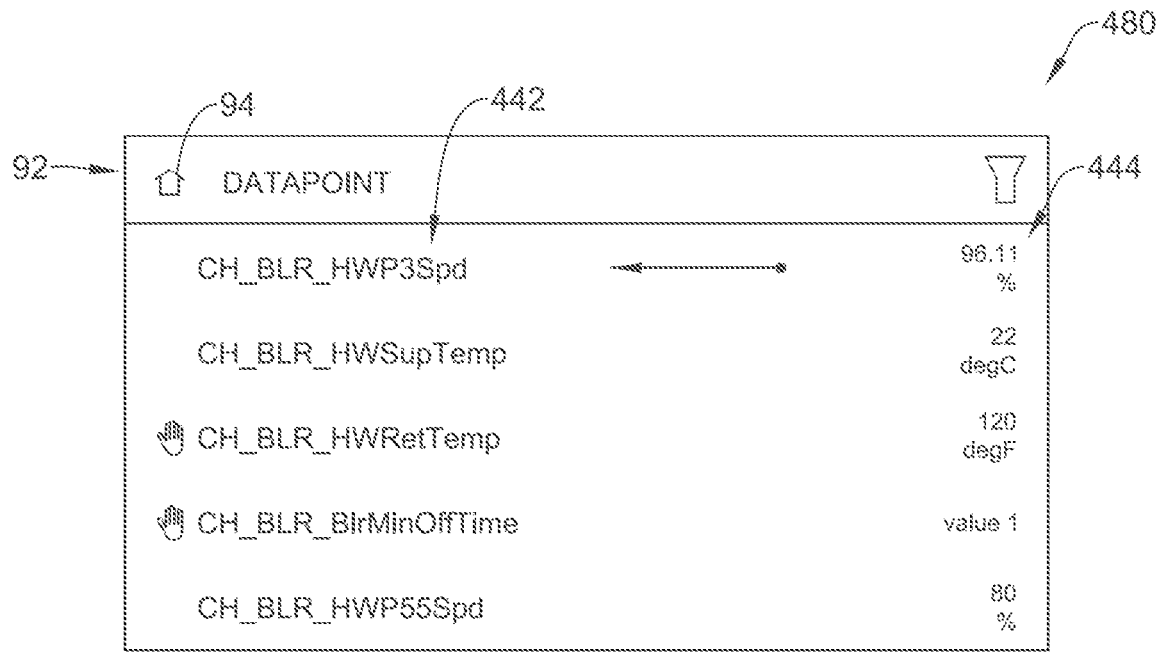
Figure 43:
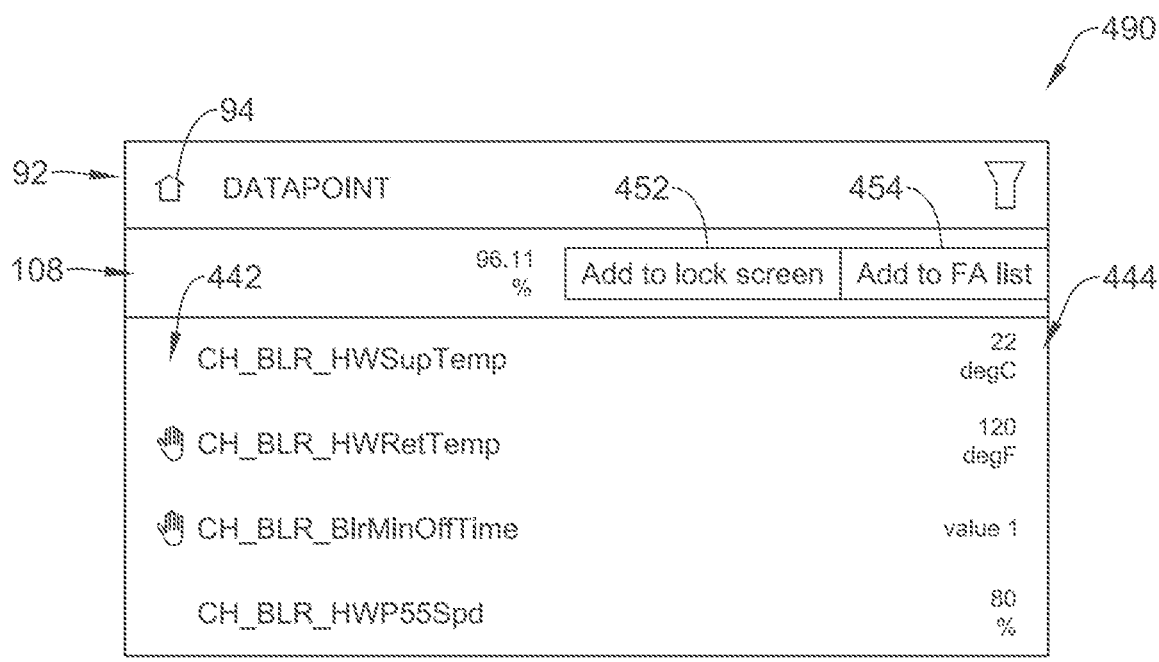
Figure 44:
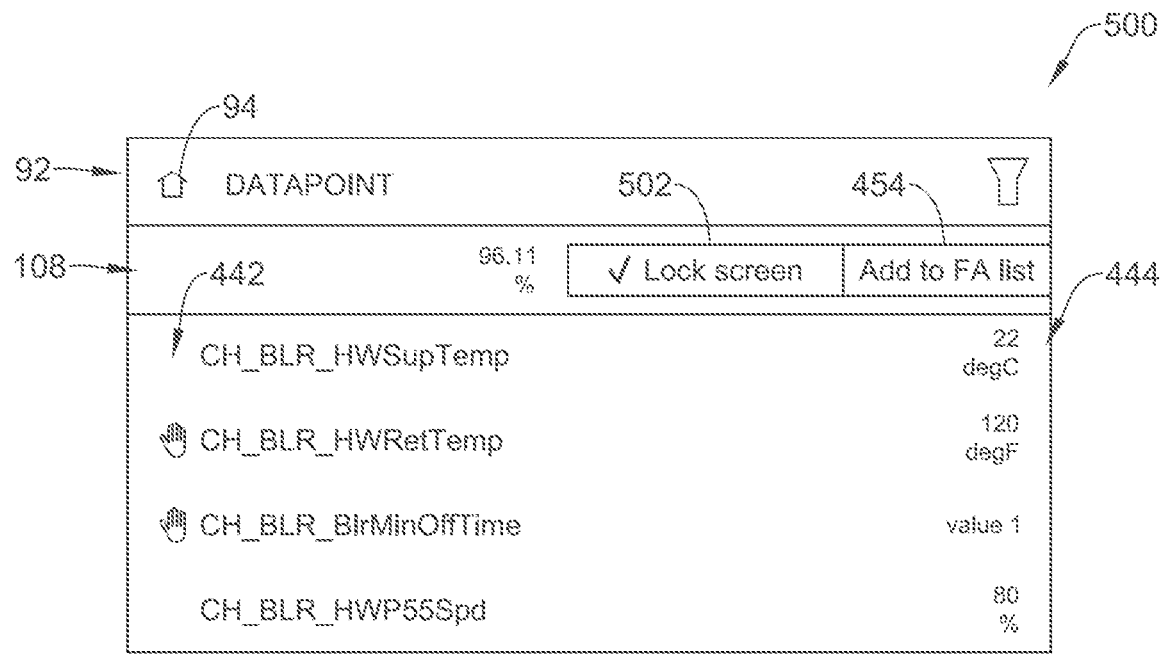

FIGS. 42-44 show screens pertaining to adding a data point to the LOCK SCREEN (the screen 60 as shown in FIG. 4). FIG. 42 shows a screen 480 that is similar to the screen 440 (FIG. 38). A data point may be selected by sliding left on the desired data point. As a result, the user interface device 20 displays a screen 490, as shown in FIG. 43. If the user selects the ADD TO LOCK SCREEN icon 452, the user interface device 20 will display a screen 500, as seen in FIG. 44. As can be seen, the ACTION bar 108 now includes a LOCK SCREEN icon 502 that includes a check mark indicating that the selected data point has been added to the lock screen. As noted with respect to FIG. 4, this means that the particular data point will be visible on the lock screen.

Figure 45:
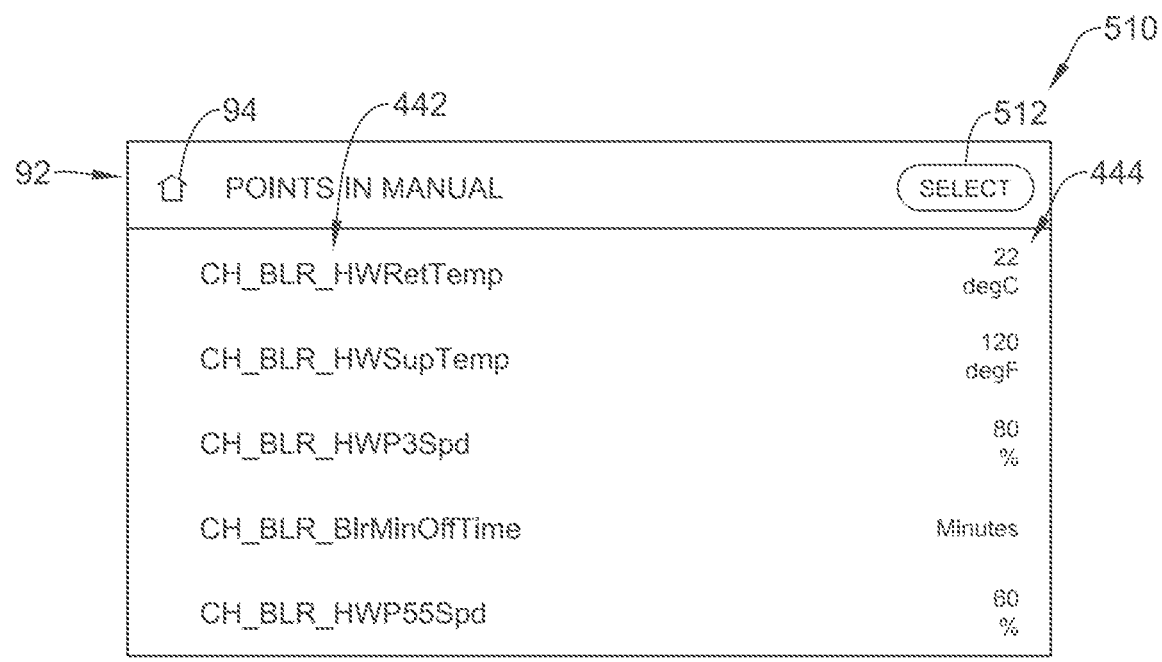
FIGS. 45 through 54 are screen shots of POINTS IN MANUAL screens.
Figure 46:
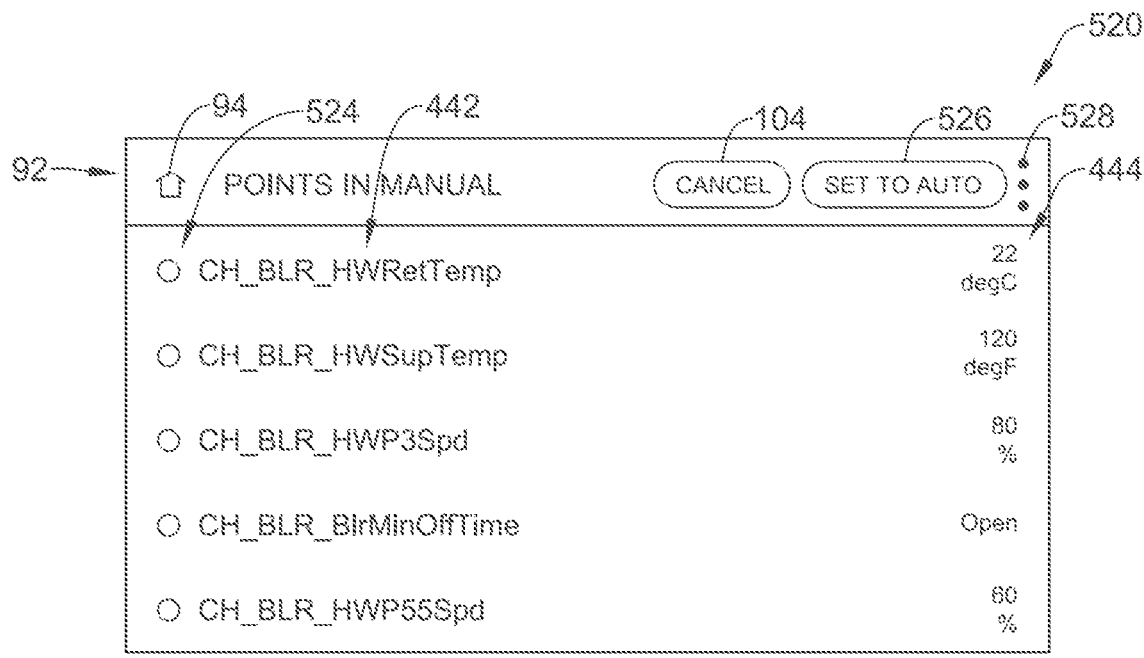
Figure 47:
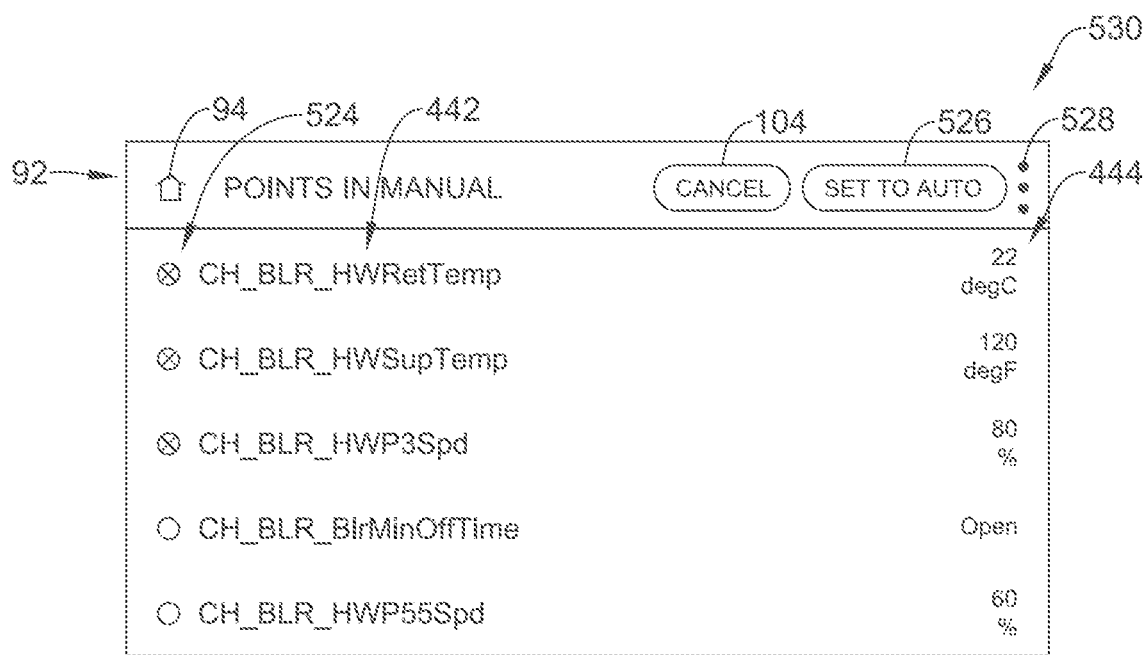

FIGS. 45-54 show screens pertaining to POINTS IN MANUAL. These screens may be reached, for example, by selecting the POINTS IN MANUAL icon 80 as shown in FIG. 5. Selection of the POINTS IN MANUAL icon 80 will cause the user interface device 20 to display a screen 510 (FIG. 45). On the screen 510, the COMMAND bar 92 includes a SELECT button 512. Selecting the SELECT button 512 will cause the user interface device 20 to display a screen 520, as shown in FIG. 46. The COMMAND bar 92 as seen in the screen 520 includes the CANCEL button 104, a SET TO AUTO button 526 and an indication of where the user is in the menu. The COMMAND bar 92 also includes a THREE DOTS icon 528 that may, as will be discussed, be used to automatically select all of the data points. A set of radio buttons 524 is displayed adjacent the list 442 of data points. A user may select one or more of the radio buttons 524, as shown in a screen 530 (FIG. 47). Pressing the SET TO AUTO button 526 will cause the selected data points to be switched from manual to auto control.

Figure 48:
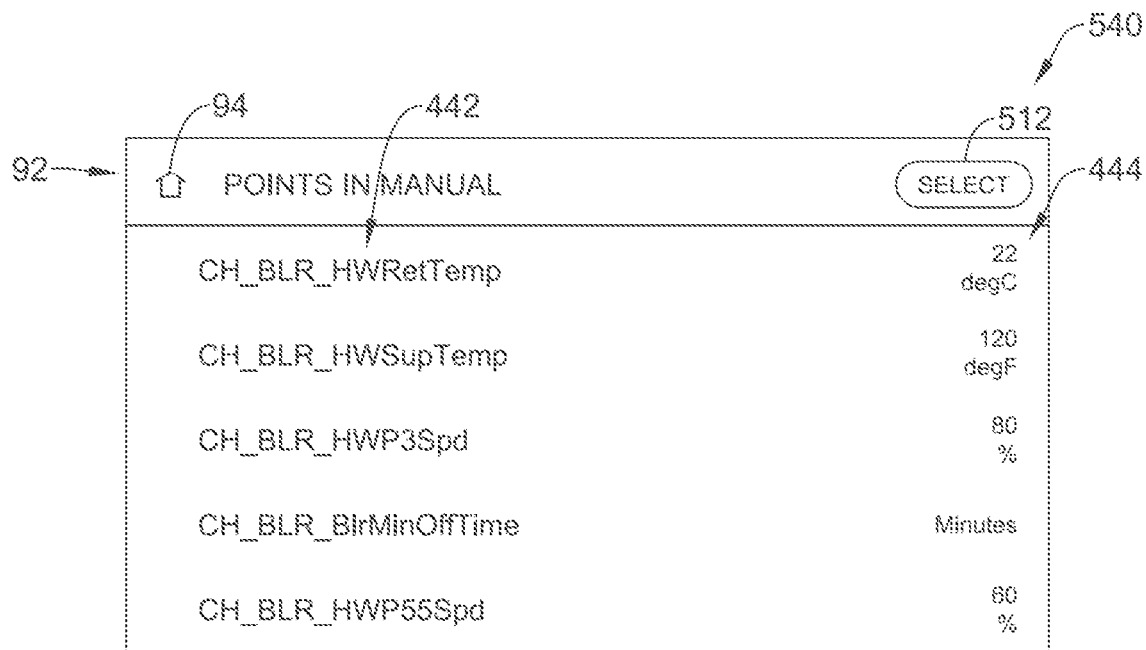
Figure 49:
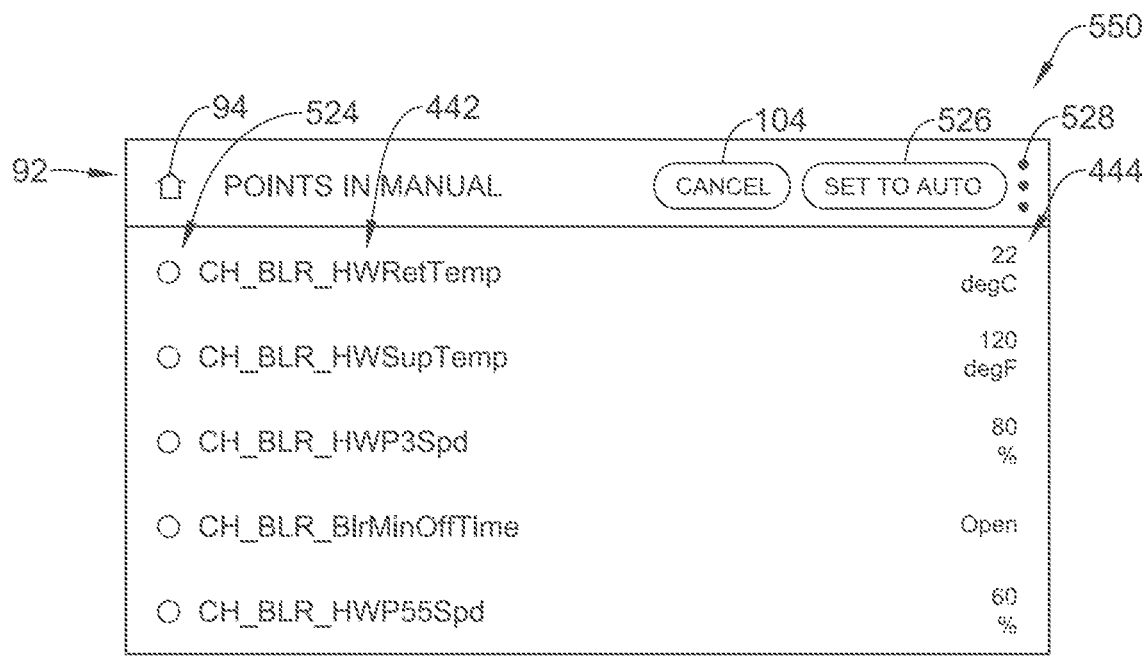
Figure 50:
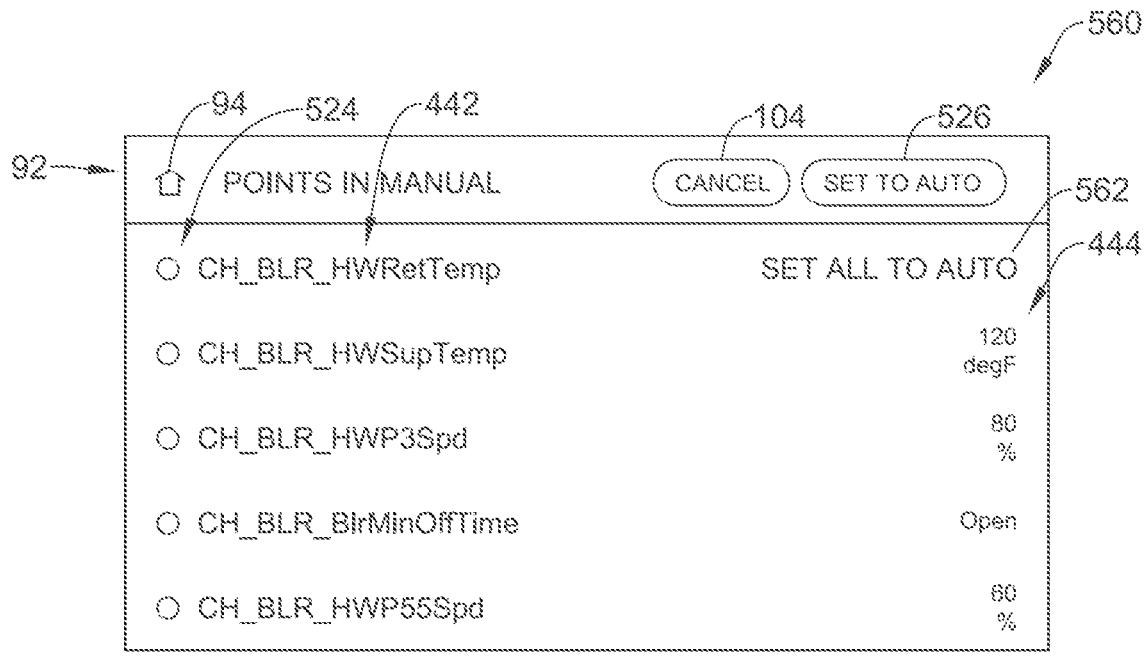

FIGS. 48-50 are similar, but illustrate a method of easily selecting all of the data points to be changed from manual to auto control. FIG. 48 shows a screen 540 that is similar to the screen 510 (FIG. 45). Selecting the SELECT button 512 will cause the user interface device 20 to display a screen 550. Selecting the THREE DOTS icon 528 will cause the user interface device 20 to automatically select all of the displayed data points and to display a screen 560 (FIG. 50) that includes a SET ALL TO AUTO button 526. Selecting the SET ALL TO AUTO button 526 will cause the user interface device 20 to do so.

Figure 51:
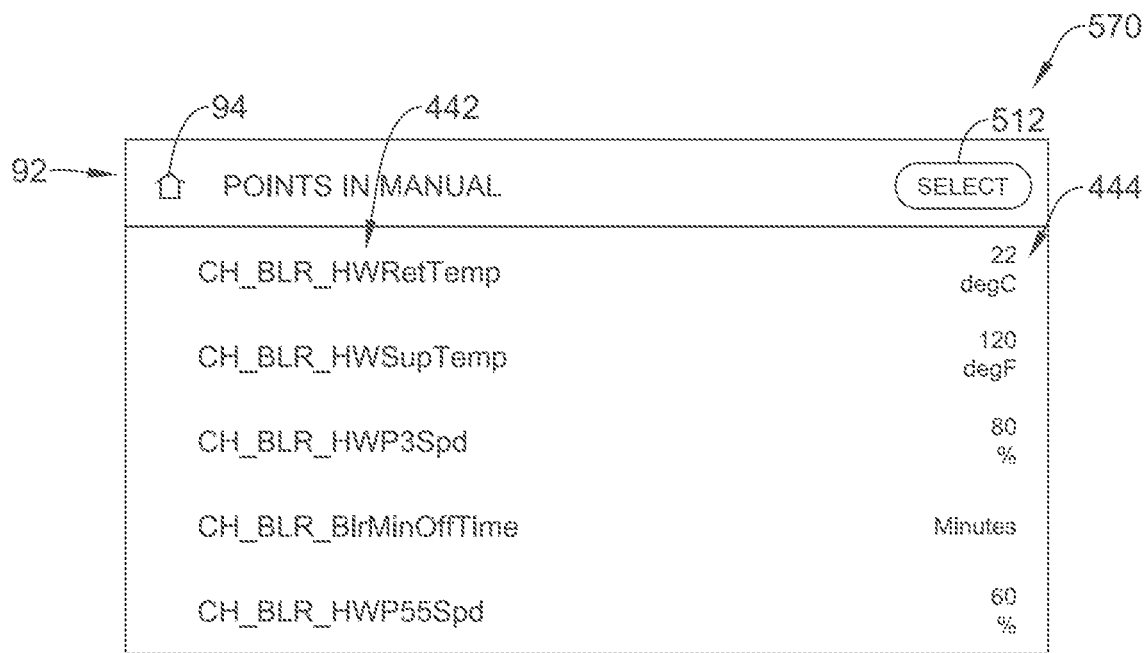
Figure 52:
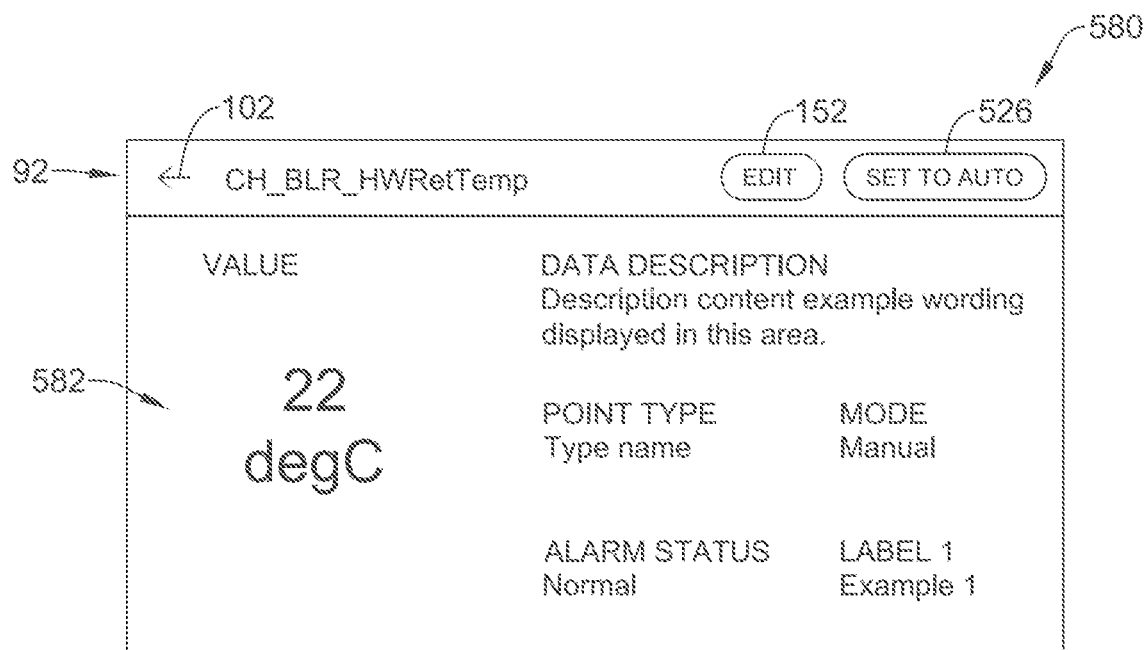

FIG. 51 shows a screen 570 that includes the list of data points 442 and accompanying list 444 of current values. Selecting one of the listed data points will cause the user interface device 20 to display a screen 580 in which the COMMAND bar 92 includes the name of the selected data point. The screen 580 includes additional information 582 regarding the selected data point. If the user desires, they can select the SET TO AUTO button 526 to change control of the selected data point from manual to auto.

Figure 53:
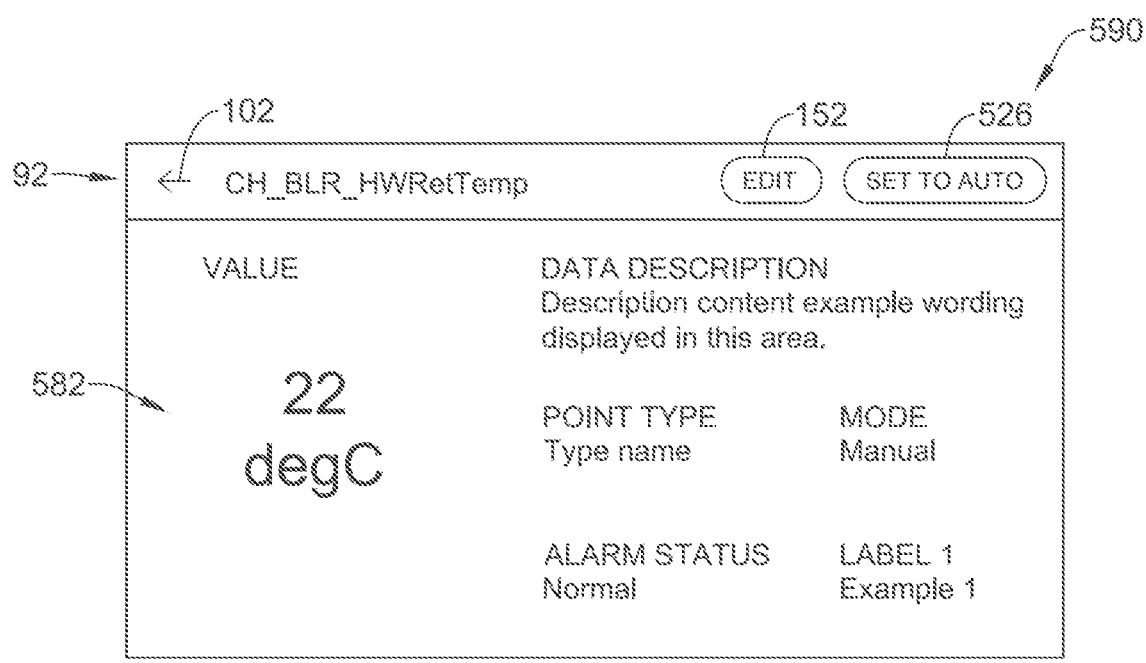
Figure 54:
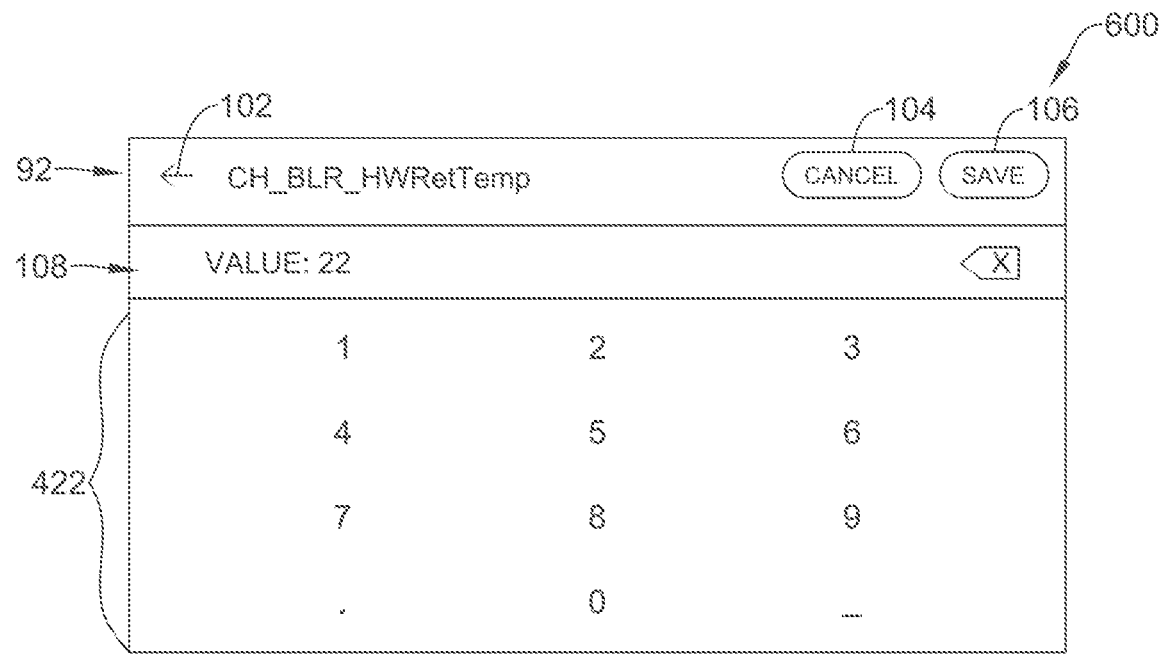

FIG. 53 shows a screen 590 in which the COMMAND bar 92 includes the name of the selected data point. The screen 590 includes additional information 582 regarding the selected data point. If the user desires, they can select the edit button 152 to edit the selected data point. Selecting the edit button 152 causes the user interface device 20 to display a screen 600, as shown in FIG. 54. The current value of the selected data point is shown in the ACTION bar 108. The screen 600 includes the numeric keypad 422 so that the user can edit the numeric value of the data point.

In some cases, it will be appreciated that in many of these illustrated screens, there may be considerably more data to display than can fit on a single screen. While the user interface device 20 may be built to be any desired size, in some cases the user interface device 20 itself or at least the display 54 (FIG. 3) may be relative small. For example, the display 54 may have a rectilinear shape having a width that ranges from about 2 or 3 inches to about 5 or 6 inches and a height (perpendicular to its width) that ranges from about 1 or 2 inches to about 3 or 4 inches. However, the building controller 12 may control hundreds of points that pertain to a number of plants. Accordingly, there needs to be a way to sequentially display this data. In some cases, a user may be able to scroll line by line up or down through displayed data. In some instances, however, the user interface device 20 may instead display data page by page, and let the user page through.

Figure 55:
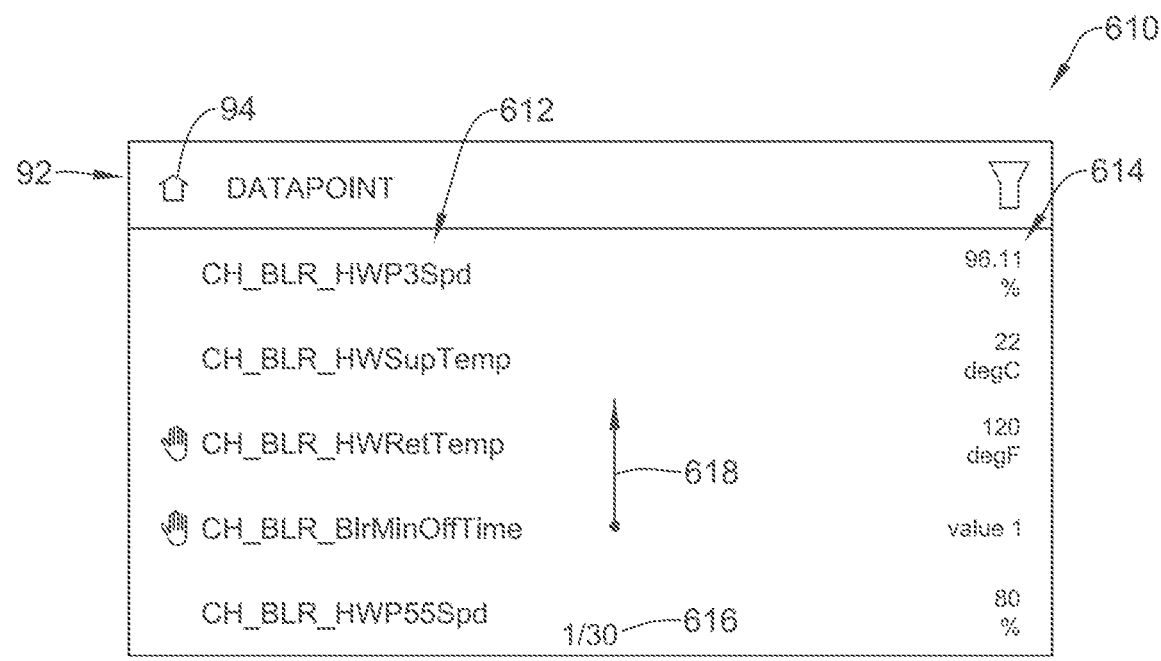
FIGS. 55 through 60 are screen shots illustrating screen pagination.
Figure 56:
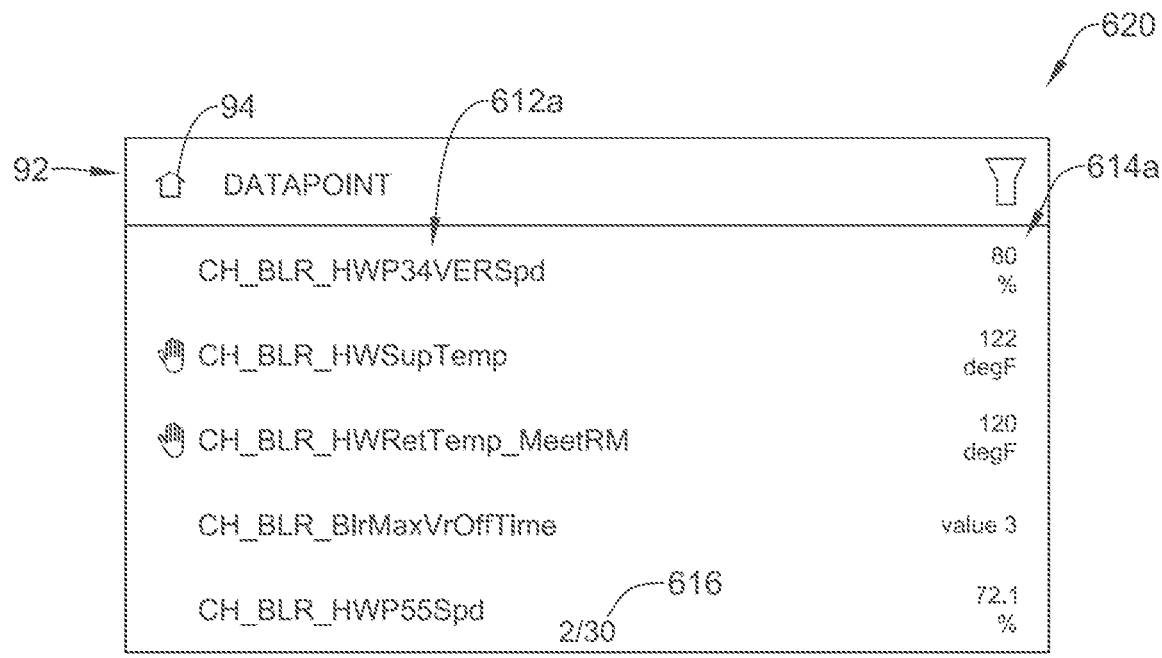
Figure 57:
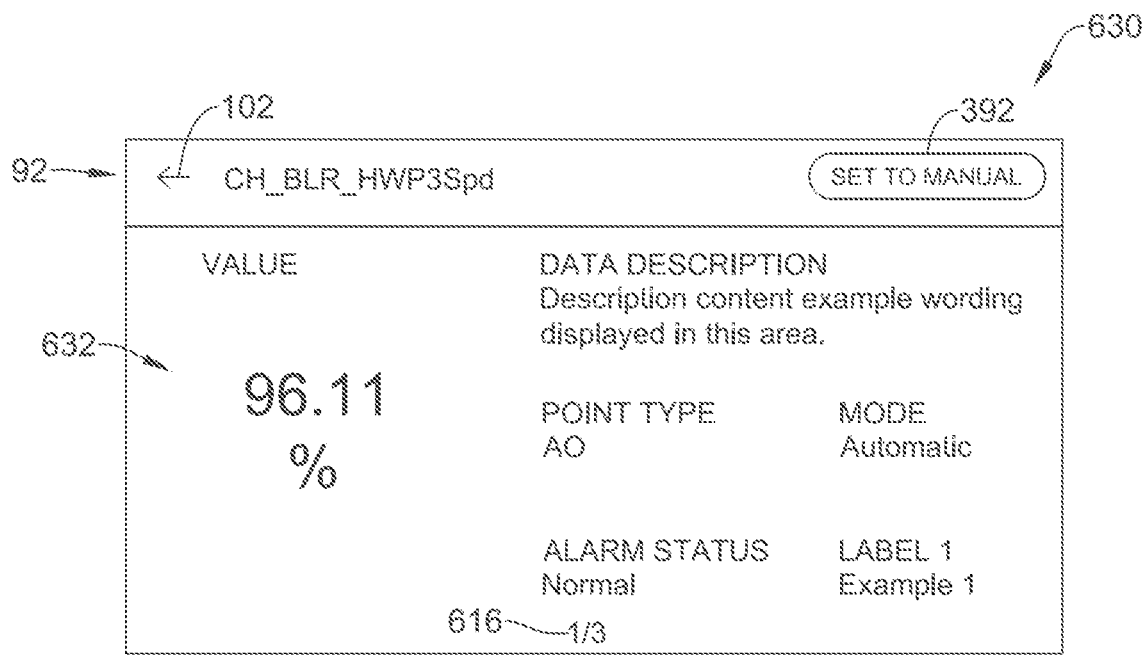
Figure 58:
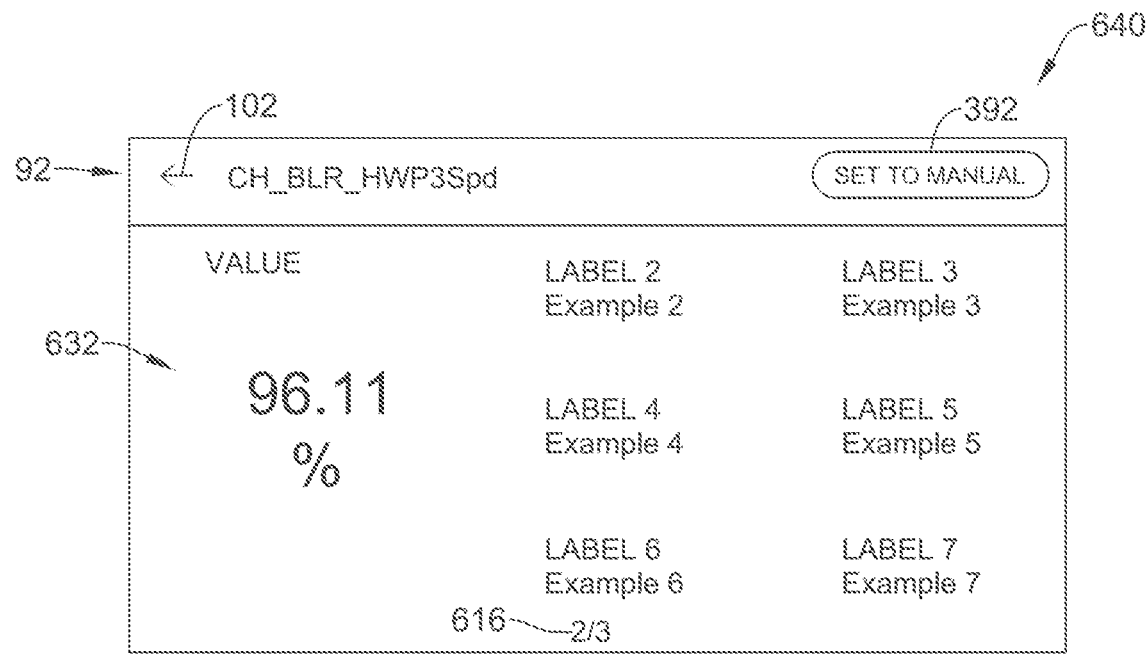

FIG. 55 shows a screen 610 that shows LIST pagination. The screen 610 includes a list 612 of data points along with a list 614 of the corresponding current values of the data points. The screen 610 includes a PAGE icon 616 that informs the user that the current screen includes more than one page. In some cases, the PAGE icon 616 is only displayed transiently. For example, the PAGE icon 616 may only be displayed for about 3 seconds or so. The user is able to page through by scrolling up, as schematically illustrated by the arrow 618. FIG. 56 shows a screen 620 that represents page 2 of the data initially displayed in FIG. 55. It can be seen that the PAGE icon 616 has been updated to indicate that the screen 620 shows page 2. FIG. 57 shows a screen 630 pertaining to data point detail pagination. The screen 630 includes additional details 632 regarding the particular data point (named within the COMMAND bar 92). FIG. 58 shows a screen 640 that results once the user has advanced to page 2, by scrolling vertically on the screen 630.

Figure 59:
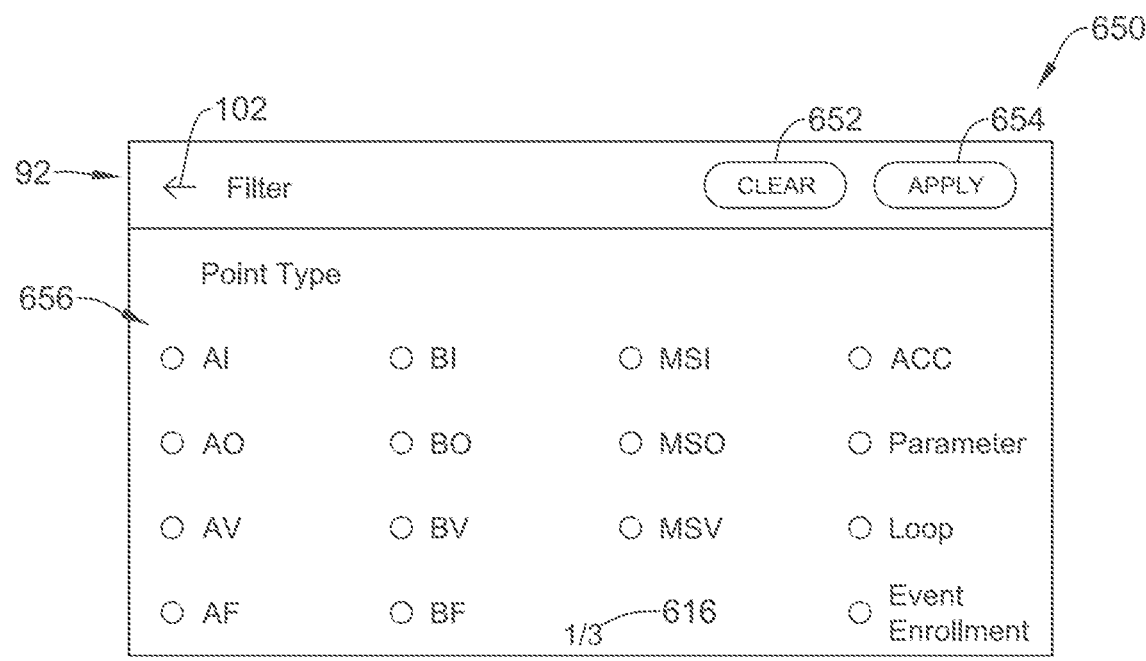
Figure 60:
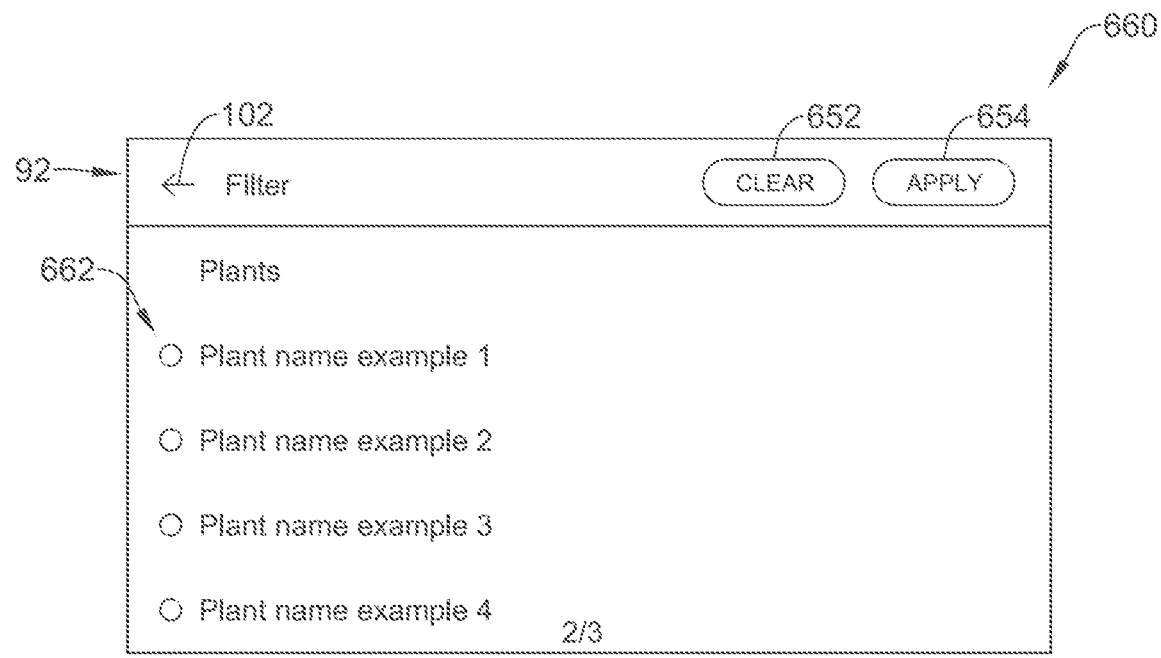

FIG. 59 shows a screen 650 that may be displayed by the user interface device 20 when paging through filter pages. The screen 650 includes a CLEAR button 652 and an APPLY button 654 in the COMMAND bar 92. The screen 650 includes a listing 656 of point types and corresponding radio buttons and of course includes the PAGE icon 616. FIG. 60 shows a screen 660 that includes a listing 662 of plant types, and of course includes the PAGE icon 616 so that the user knows to scroll vertically.

Figure 61:
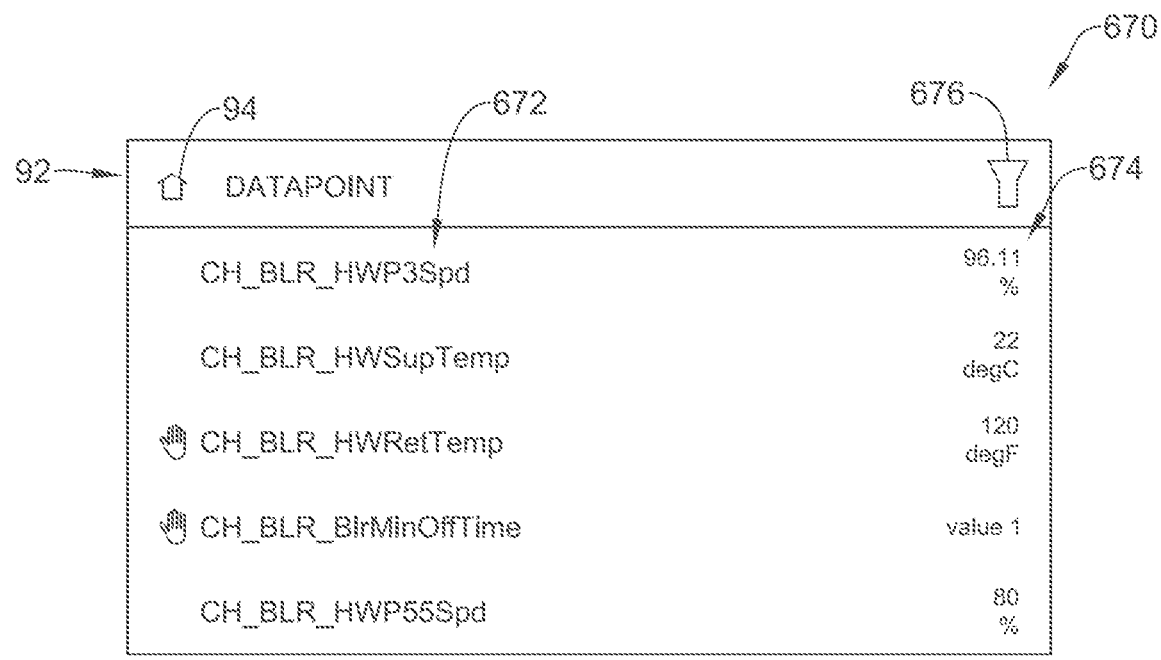
FIGS. 61 through 68 are screen shots of FILTER screens.
Figure 62:
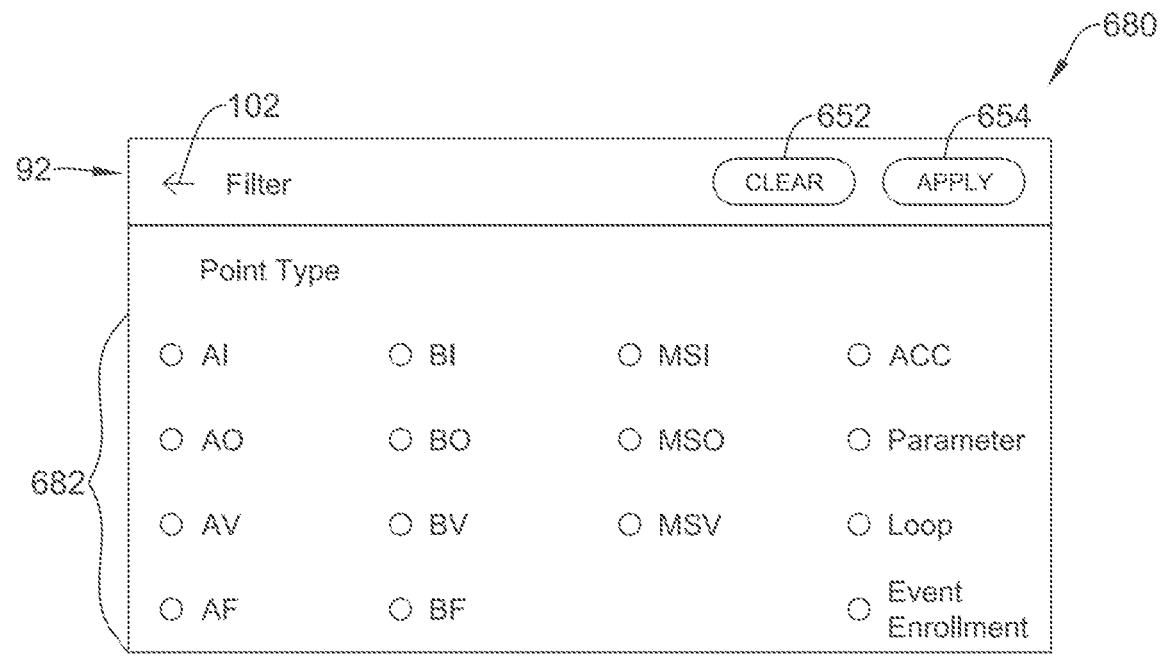
Figure 63:
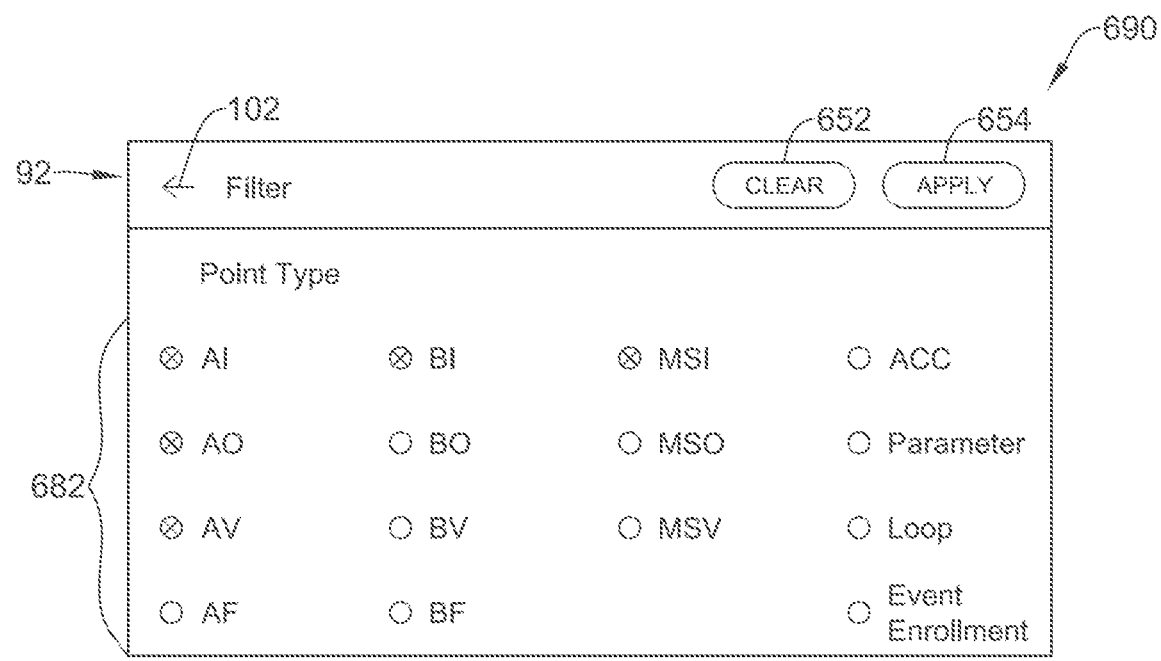
Figure 64:
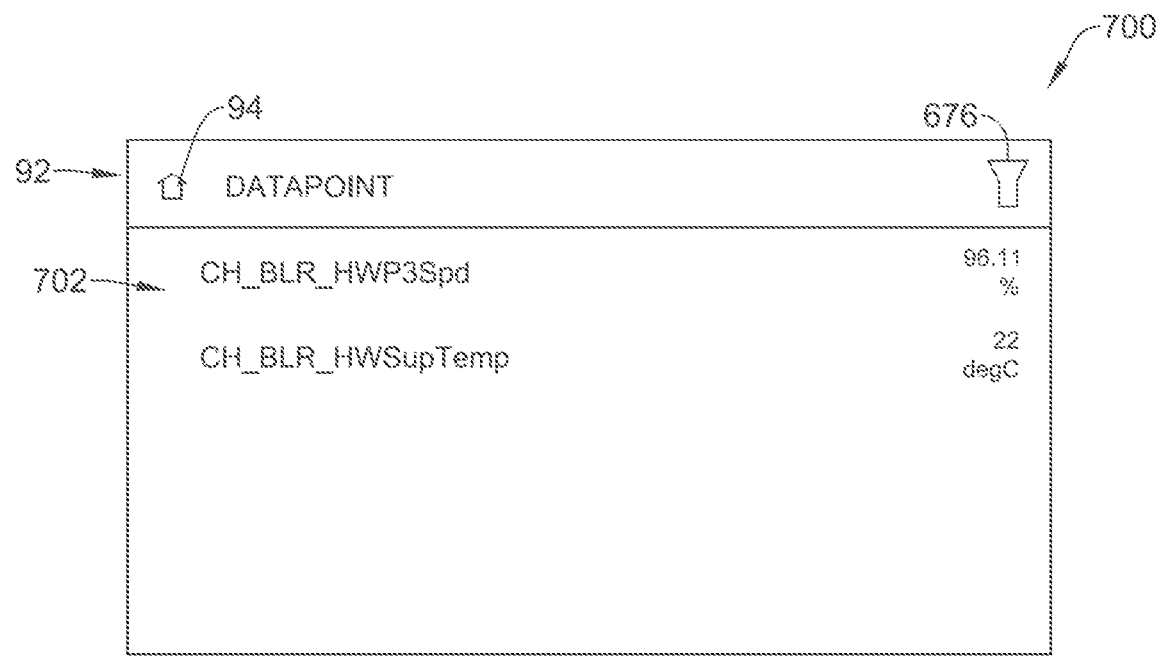

FIGS. 61 through 64 pertain to adding data point filtering while FIGS. 65 through 68 pertain to clearing data point filtering. FIG. 61 shows a screen 670 that includes in the COMMAND bar 92 a FILTER icon 676. The screen 670 includes a list 672 of data points and a list 674 of the corresponding values of each of the listed data points. Selecting the FILTER icon 676 causes the user interface device 20 to display a screen 680 (FIG. 62). The screen 680 includes a listing 682 of point types and accompanying radio buttons so that a user may select one or more of the point types. FIG. 63 shows a screen 690 in which several of the point types have been selected, as indicated by the filled in radio buttons. Selecting the APPLY button 654 causes the user interface device 20 to display a screen 700 (FIG. 64) that shows information 702, resulting from the previous filtering.

Figure 65:
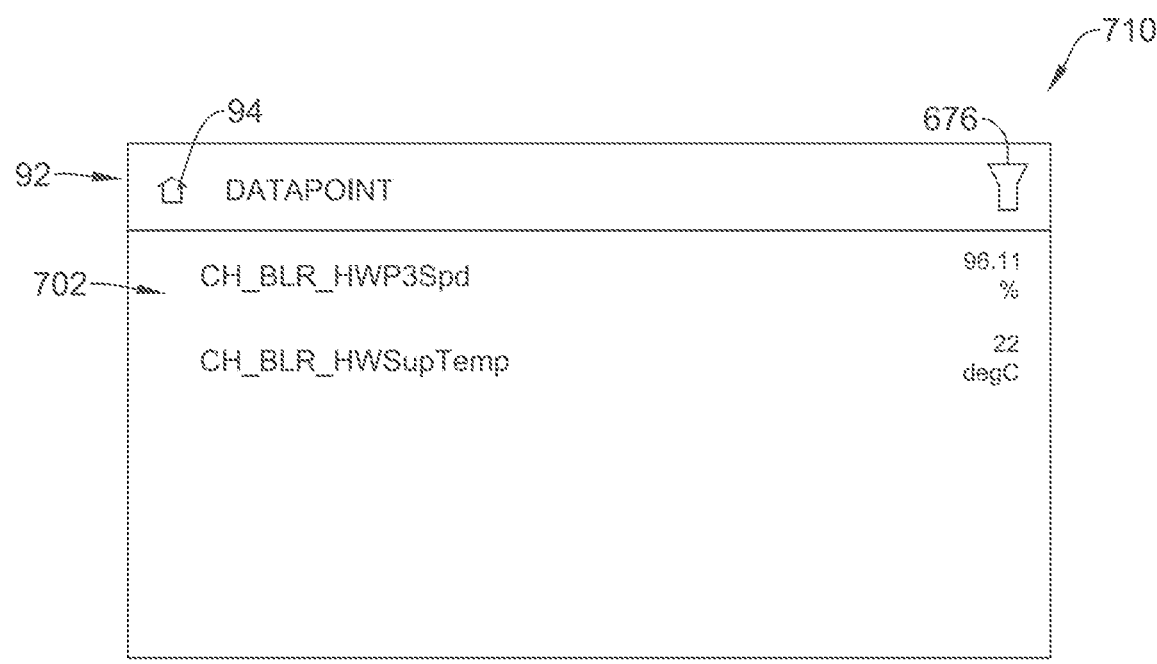
Figure 66:
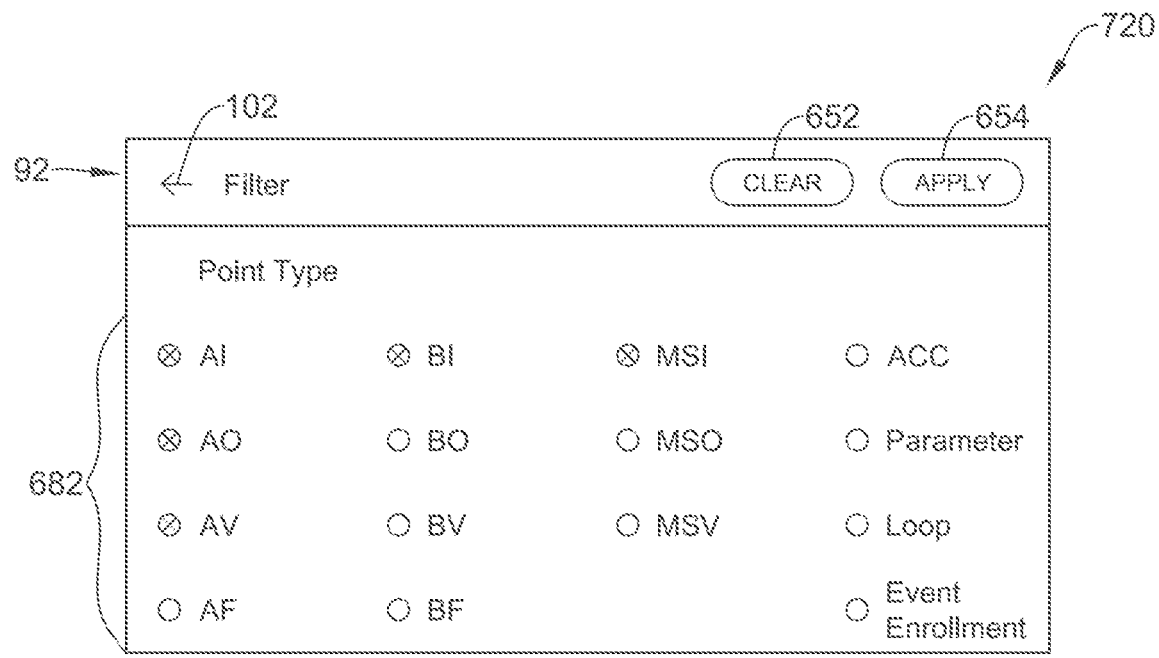
Figure 67:
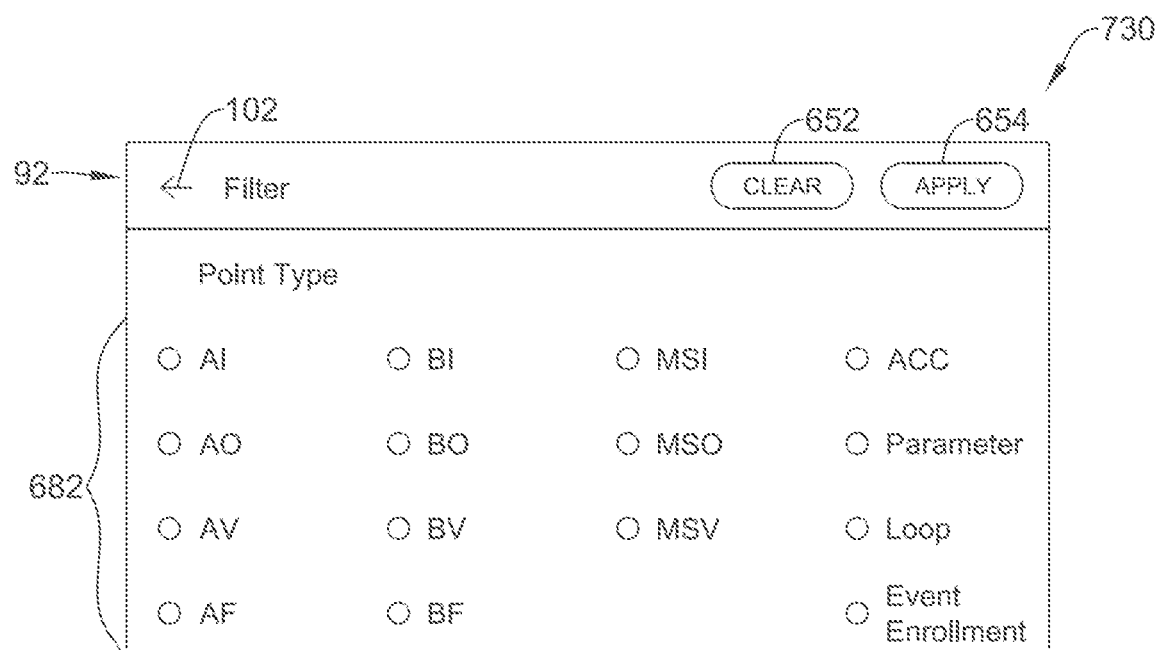
Figure 68:
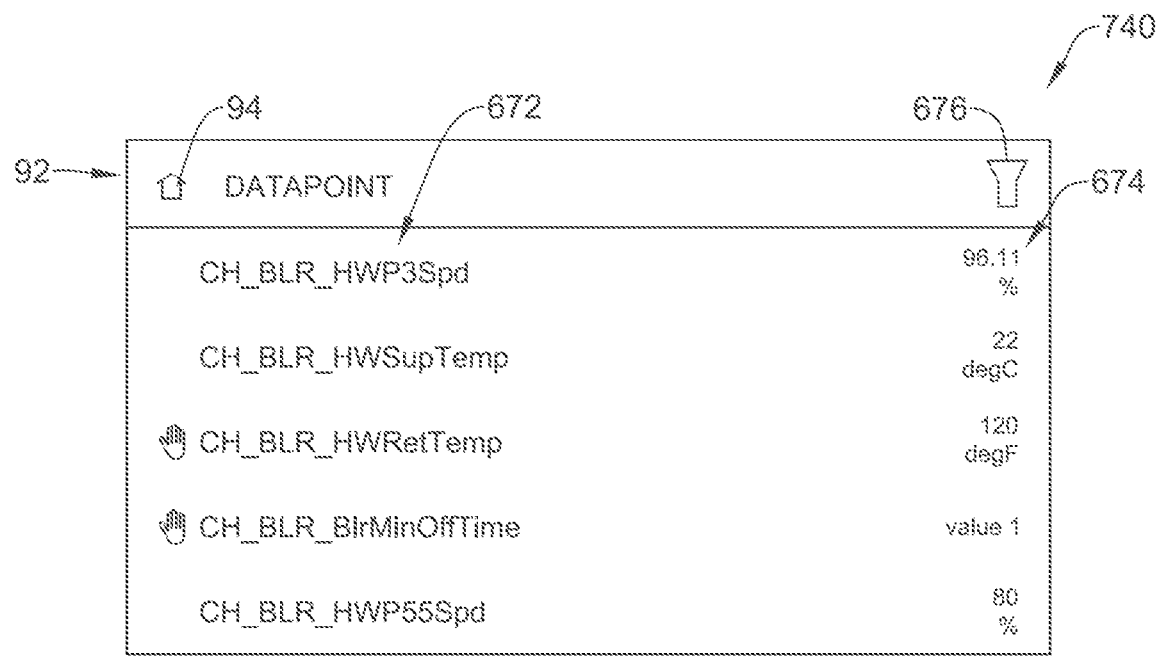

FIG. 65 shows a screen 710 that may be displayed by the user interface device 20. If the user selects the FILTER icon 676, the user interface device 20 will display a screen 720, as seen in FIG. 66. In the screen 720, it can be seen that several of the point types shown in the list 682 have been selected, as indicated by the filled in radio buttons. If the user selects the CLEAR button 652, the user interface device 20 displays a screen 730, as shown in FIG. 67, in which all of the radio buttons have been cleared. Subsequently selecting the APPLY button 654 will cause the user interface device 20 to display a screen 740, as shown in FIG. 68, in which the unfiltered data points are listed in the list 672, along with the corresponding values shown in the list 674.

Figure 69:
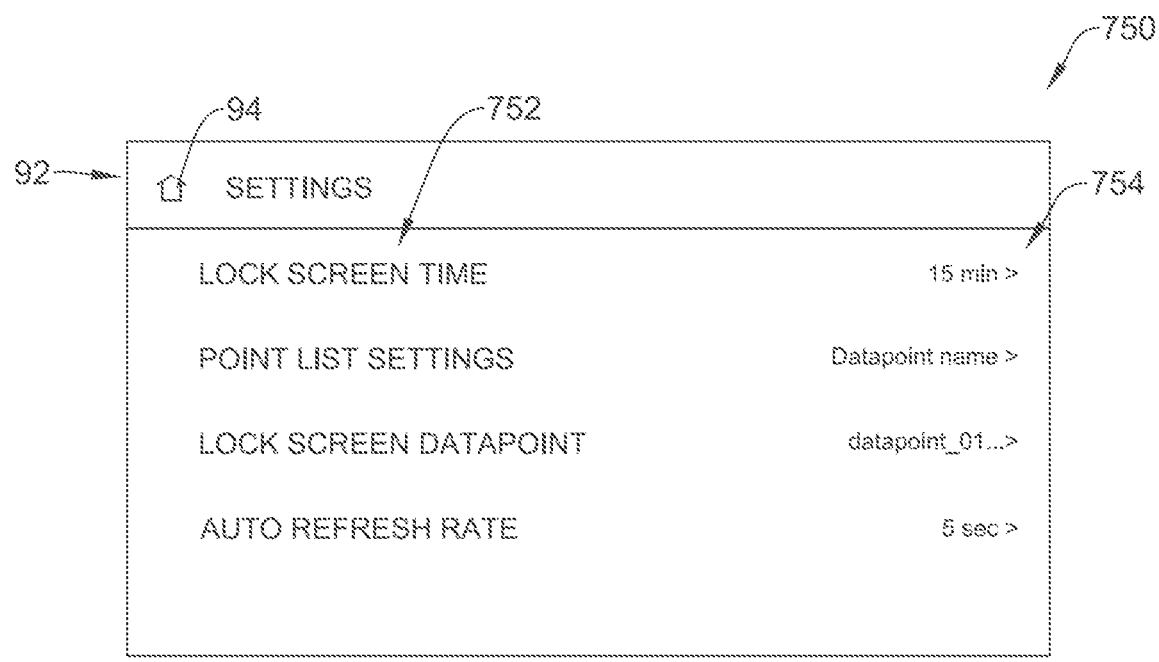
FIGS. 69 through 79 are SETTINGS screens.
Figure 70:
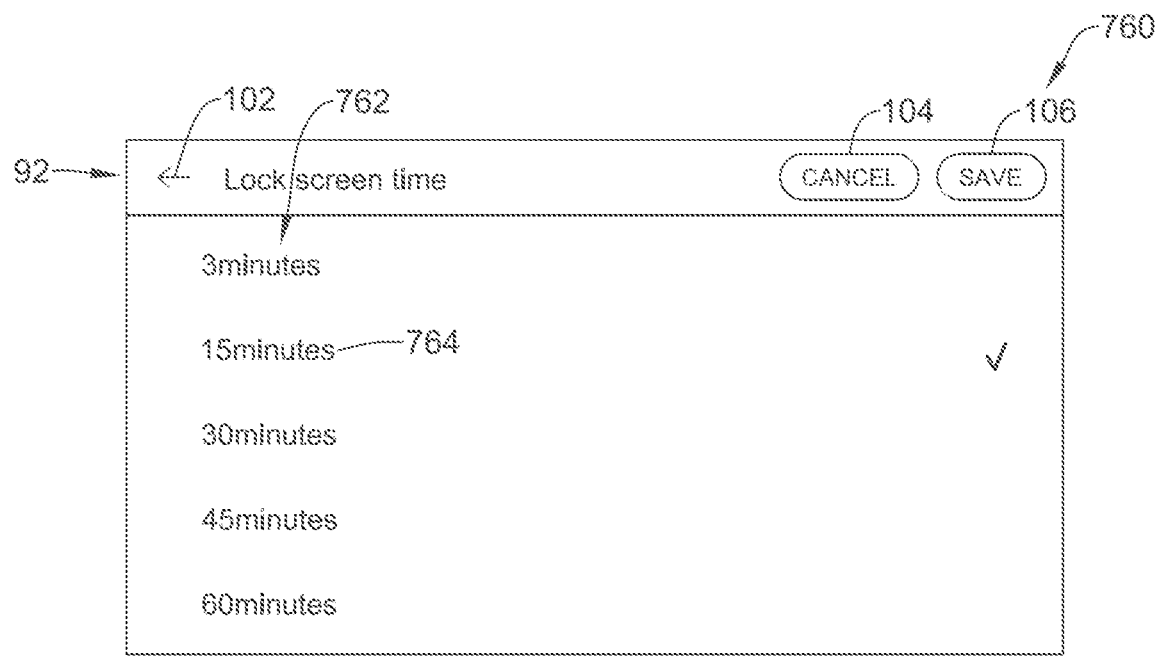

FIGS. 69 through 79 are examples of SETTINGS screens that may be displayed by the user interface device 20. FIG. 69 shows a screen 750 that may be reached by selecting the SETTINGS icon 84 (FIG. 5). The screen 750 includes a list 752 of individual settings along with a list 754 of their current settings. If a user selects the first setting listed, which is LOCK SCREEN TIME, the user interface device 20 will display a screen 760 as shown in FIG. 70. The screen 760 includes a listing 762 of available settings for the LOCK SCREEN TIME. The current setting, 15 minutes, is highlighted. If the user wishes to change this setting, they can simply select one of the other times, followed by selecting the SAVE button 106. If they decide not to change the time, they can cancel out by selecting the CANCEL button 104.

Figure 71:
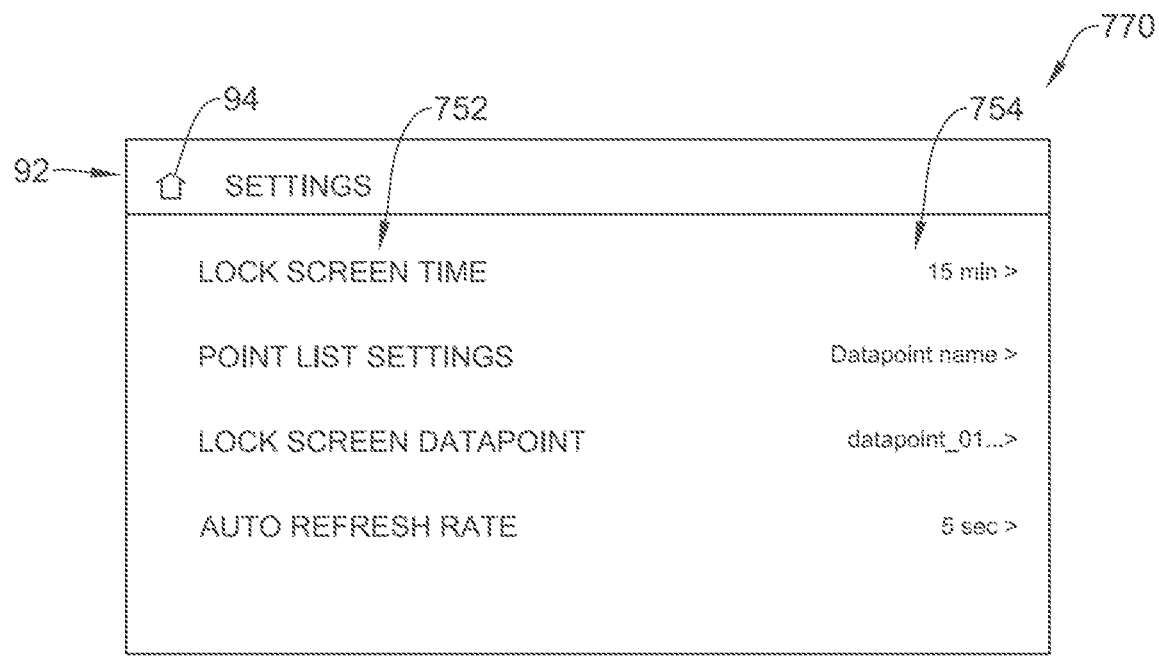
Figure 72:
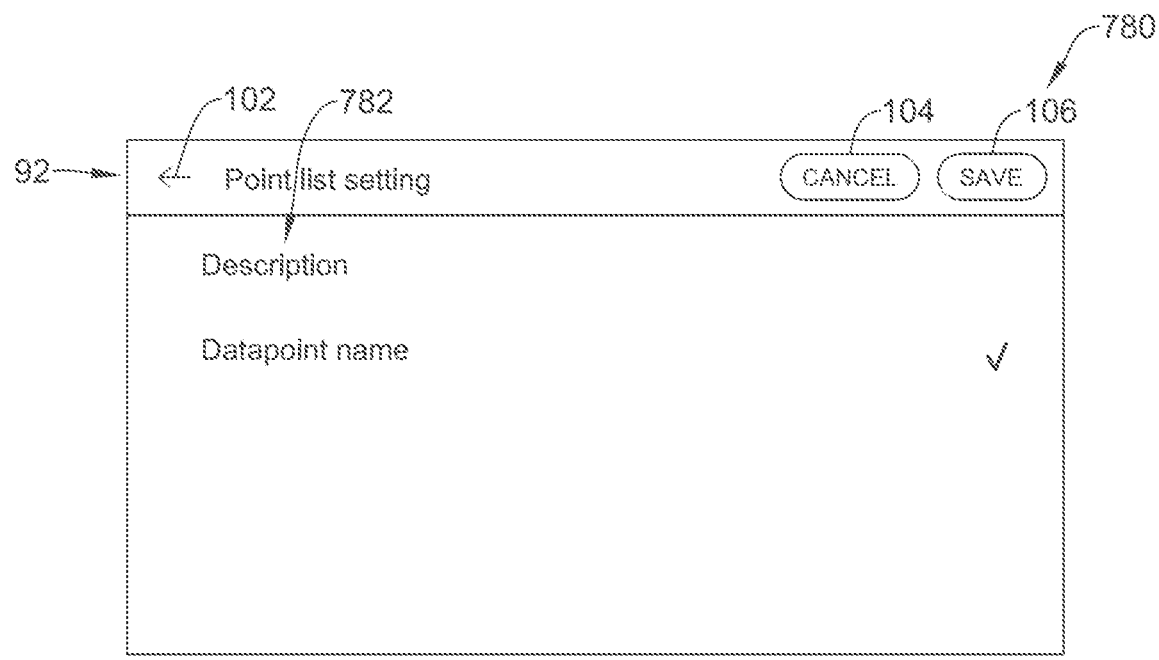

FIG. 71 shows a screen 770 that includes a list 752 of individual settings along with a list 754 of their current settings. If a user selects the second setting listed, which is POINT LIST SETTINGS, the user interface device 20 will display a screen 780 as shown in FIG. 72. The screen 780 includes a listing 782 of possible settings for the POINT LIST SETTINGS, with the current value highlighted. If the user wishes to change this setting, they can simply select one of the other times, followed by selecting the SAVE button 106. If they decide not to change the time, they can cancel out by selecting the CANCEL button 104.

Figure 73:
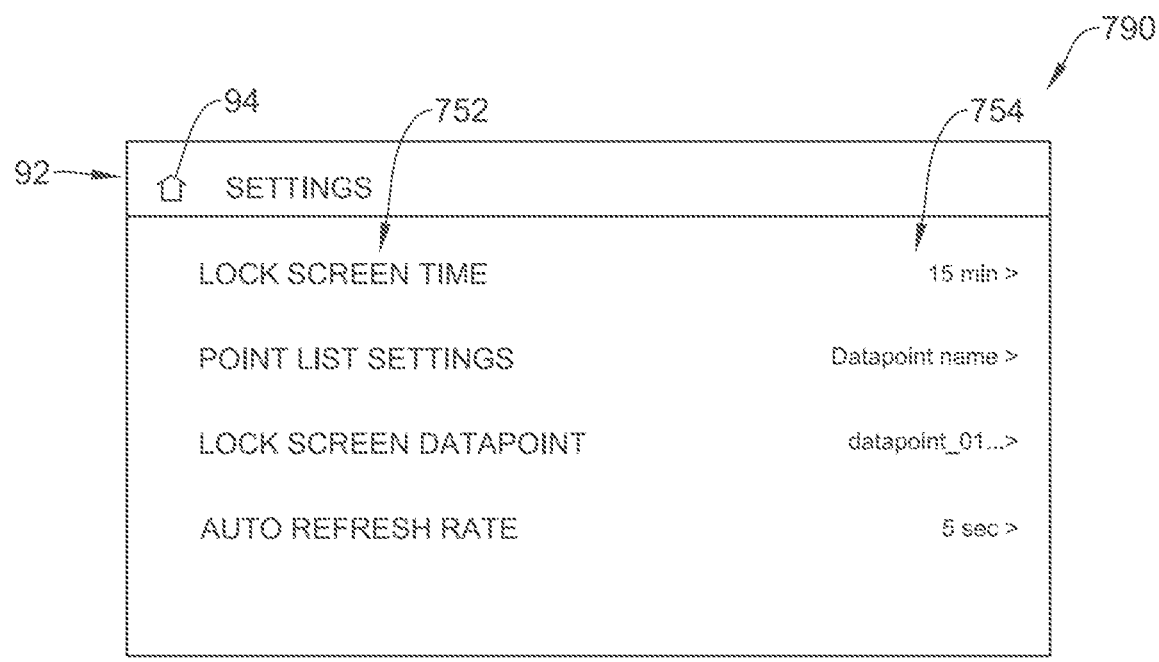
Figure 74:
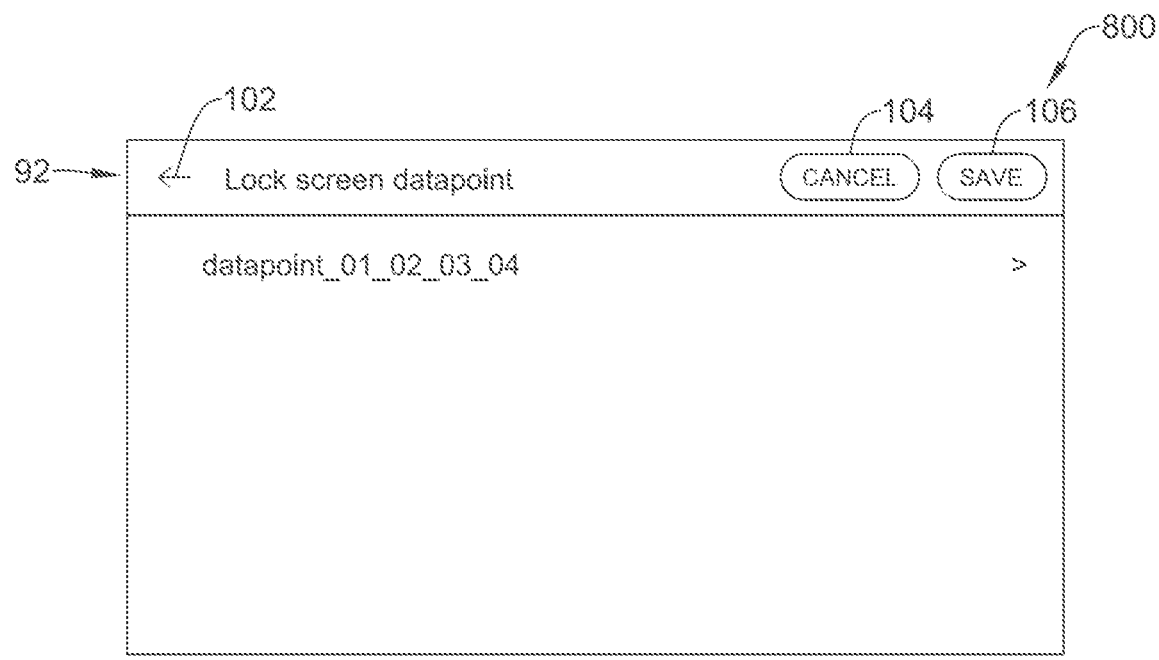
Figure 75:
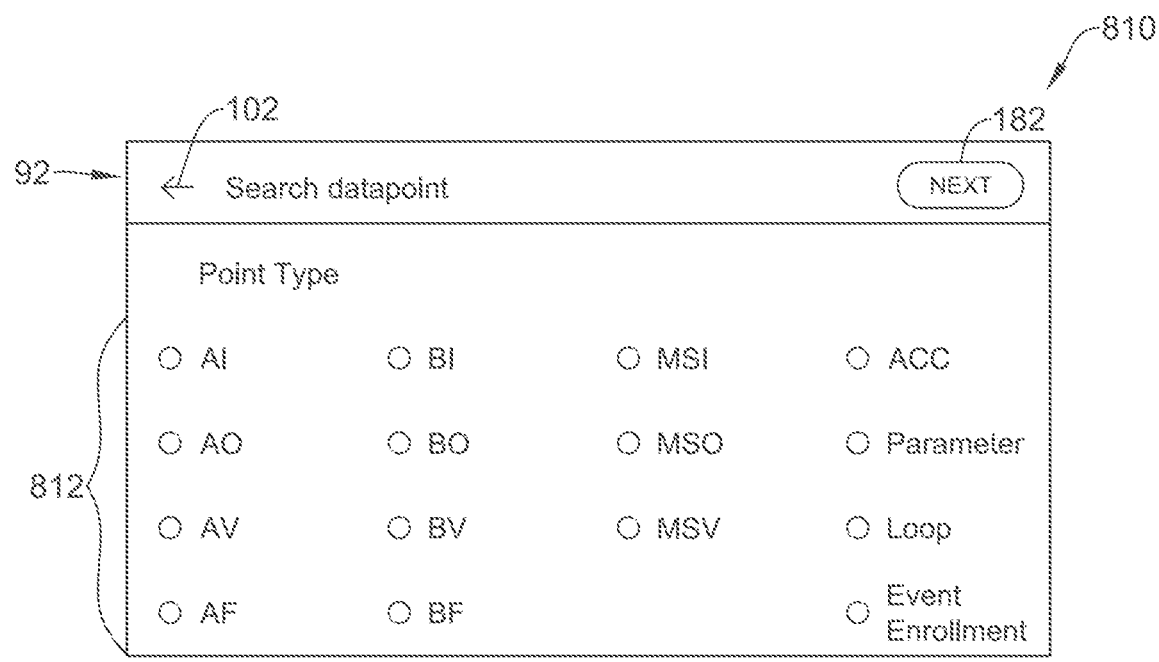
Figure 76:
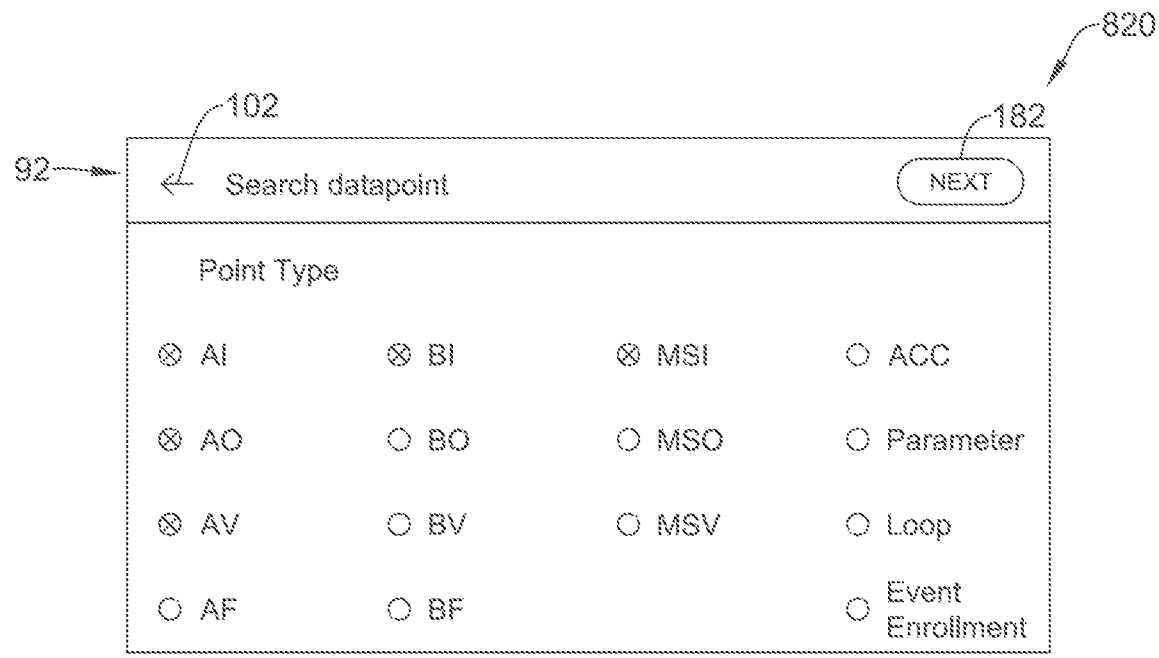
Figure 77:
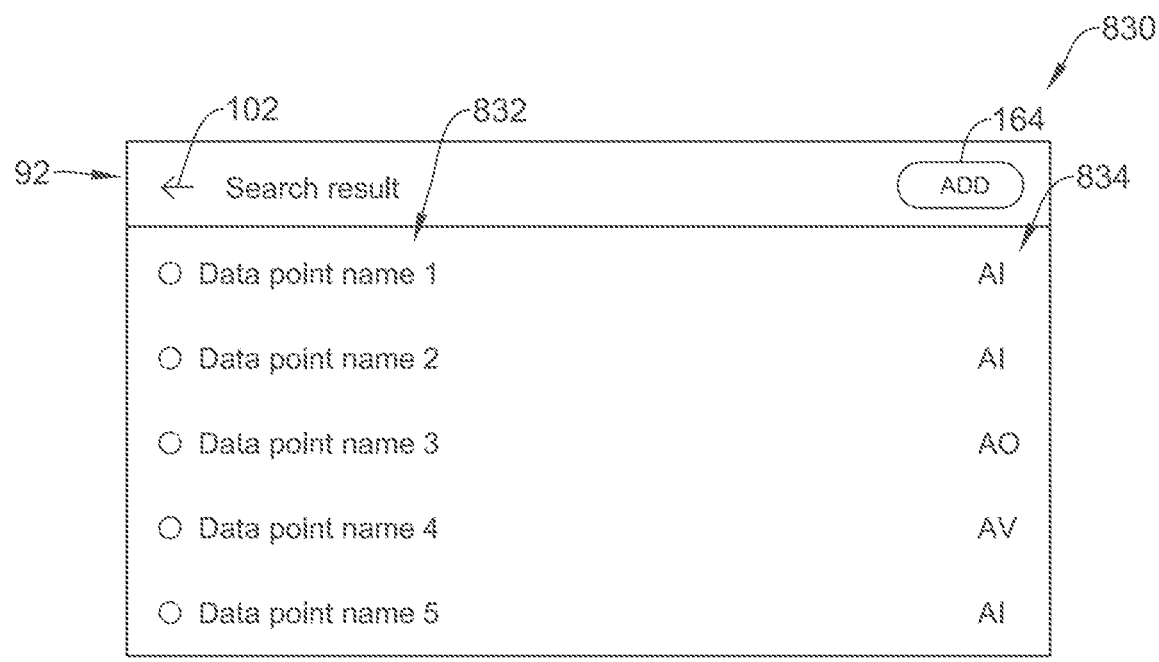

FIG. 73 shows a screen 790 that includes a list 752 of individual settings along with a list 754 of their current settings. If a user selects the third setting listed, which is LOCK SCREEN DATAPOINT, the user interface device 20 will display a screen 800 as shown in FIG. 74. FIG. 75 shows a screen 810 that may be displayed by the user interface device 20 for setting point types to search for. The point types are listed in a list 812. FIG. 76 shows a screen 820 that shows several of the point types selected. FIG. 77 shows a screen 830 that includes a list 832 of data point names and a list 834 of corresponding values.

Figure 78:
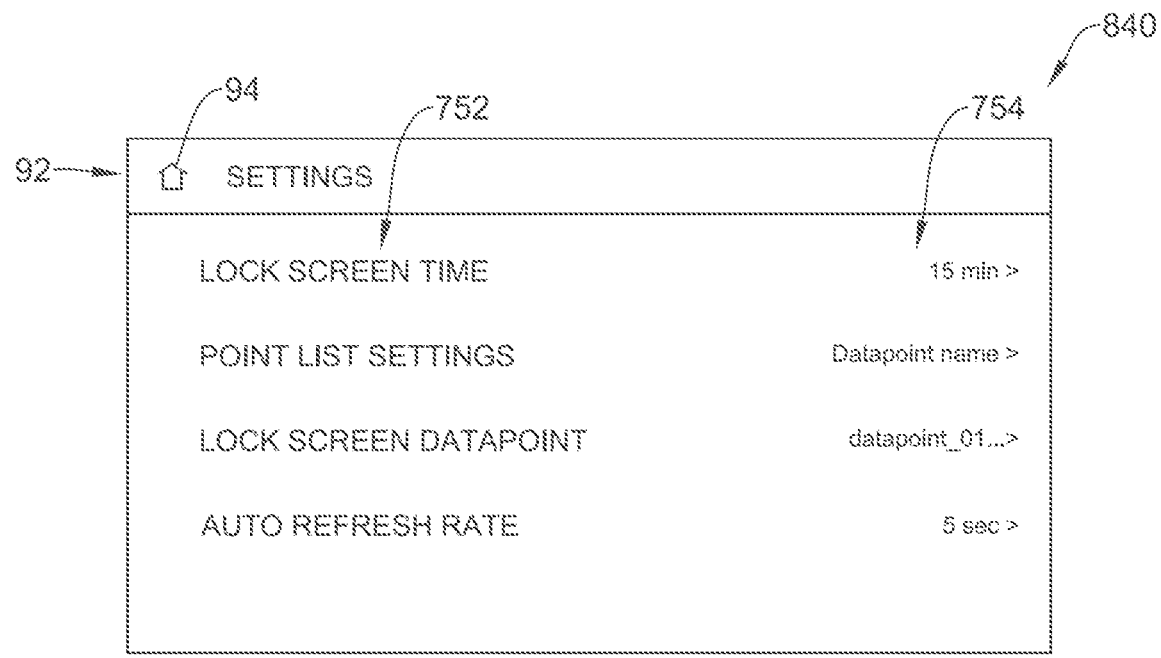

FIG. 78 shows a screen 840 that may be reached by selecting the SETTINGS icon 84 (FIG. 5). The screen 840 includes a list 752 of individual settings along with a list 754 of their current settings. If a user selects the fourth setting listed, which is AUTO REFRESH RATE, the user interface device 20 will display a screen 850 as shown in FIG. 790. The screen 790 includes a listing 852 of available settings for the AUTO REFRESH RATE. The current value, 5 seconds, is highlighted. If the user wishes to change this setting, they can simply select one of the other times, followed by selecting the SAVE button 106. If they decide not to change the time, they can cancel out by selecting the CANCEL button 104.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A building control system for controlling a Heating, Ventilation and Air Conditioning (HVAC) system of a building, the building control system comprising:

an elongated DIN rail;
a building controller mounted to the elongated DIN rail at a corresponding mounted location along the elongated DIN rail, the building controller communicating directly with one or more first building control components of the HVAC system via a plurality of wired ports of the building controller, wherein at least one of the first building control components include one or more of a fan, a blower, and an actuator;
an Input/Output (I/O) controller that is separate from but operatively coupled to the building controller via an I/O port, wherein the I/O controller communicates directly with one or more second building control components of the HVAC system via a plurality of wired ports of the I/O controller, wherein at least one of the second building control components include one or more of a fan, a blower, and an actuator;
wherein the building controller is configured to provide control signals in accordance with a control algorithm to control the one or more first building control components via the direct communication between the building controller and the one or more first building control components of the HVAC system, and the building controller is configured to provide control signals in accordance with the control algorithm to control the one or more second building control components via the I/O controller with the I/O controller communicating directly with the one or more second building control components of the HVAC system; and
a user interface device mounted to the elongated DIN rail, the user interface device is separate from the building controller and the I/O controller and is secured at a corresponding mounted location along the elongated DIN rail, wherein the mounted location of the user interface device is offset from the mounted location of the building controller, the user interface device is operatively coupled to the building controller and is configured to display on a display of the user interface device a plurality of menu screens that allow a user to locally interact with the building controller.

2. The building control system of claim 1, wherein the user interface device is configured to display on the display one or more screens that allow a user to view one or more points that are associated with one or more of the first building control components and one or more points that are associated with one or more of the second building control components.

3. The building control system of claim 2, wherein the user interface device is configured to display one or more screens that permit the user to filter the one or more points by a user selected filter criteria.

4. The building control system of claim 3, wherein each of the one or more points has a point type, and wherein the user selected filter criteria identifies those points of one or more selected point types.

5. The building control system of claim 3, wherein each of the one or more points is associated one of the one or more first and/or second building control components, and wherein the user selected filter criteria identifies those points that are associated with one or more selected building control components.

6. The building control system of claim 2, wherein the user interface device is configured to display on the display one or more screens that display a list of points controlled by the building controller.

7. The building control system of claim 6, wherein the user interface device is configured to display one or more screens providing additional information regarding a particular point in response to a user selecting the particular point from the list of points.

8. The building control system of claim 6, wherein the user interface device is configured to display one or more screens that permit the user to select a particular point and then manually adjust a programmable point control value of the particular point.

9. The building control system of claim 8, wherein the user interface device is configured to display one or more screens that permit the user to selectively choose points that have been manually adjusted to return to an auto mode.

10. The building control system of claim 2, wherein the user interface device is configured to display one or more screens that provide a list of points that have been manually adjusted.

11. The building control system of claim 2, wherein the user interface device is configured to display on the display one or more screens that allow a user to change a programmable control value associated with one or more of the points.

12. The building control system of claim 2, wherein the user interface device is configured to display on the display one or more screens that allow a user to view one or more alarms generated by the building controller for one or more of the points.

13. The building control system of claim 12, wherein the user interface device is configured to display on the display one or more screens that include a list of points that are currently in alarm.

14. The building control system of claim 13, wherein the one or more screens that display the list of points that are currently in alarm include:
   a user-defined name for each of the points in alarm;
   a status indicator for each of the points in alarm; and
   a current value and/or a setpoint for each of the points in alarm.

15. The building control system of claim 14, wherein the status indicator for each of the points in alarm comprise one of a high priority alarm indicator, a mid priority alarm indicator and a low priority alarm indicator.

16. The building control system of claim 13, wherein the user interface device is configured to display one or more screens providing additional information regarding a particular point that is currently in alarm in response to a user selecting the particular point from the list of points that are currently in alarm.

17. The building control system of claim 16, wherein the one or more screens providing additional information regarding the particular point that is currently in alarm allow the user to manually change a setpoint for the particular point in alarm.

18. A building control system for controlling a Heating, Ventilation and Air Conditioning (HVAC) system of a building, the building control system comprising:
   a building controller including a building controller housing, the building controller communicates directly with one or more first building control components of the HVAC system via a plurality of wired ports of the building controller, wherein at least one of the first building control components include one or more of a fan, a blower, and an actuator;
   an Input/Output (I/O) controller that is separate from but operatively coupled to the building controller, wherein the I/O controller communicates directly with one or more second building control components of the HVAC system via a plurality of wired ports of the I/O controller, wherein at least one of the second building control components include one or more of a fan, a blower, and an actuator;
   wherein the building controller is configured to provide control signals in accordance with a control algorithm to control the one or more first building control components via the direct communication between the building controller and the one or more first building control components of the HVAC system, and the building controller is configured to provide control signals in accordance with the control algorithm to control the one or more second building control components via the I/O controller with the I/O controller communicating directly with the one or more second building control components of the HVAC system; and
   a user interface device that is separate from the building controller and the I/O controller, the user interface device and the building controller mounted to a DIN rail with a mounted location of the user interface device offset from a mounted location of the building controller on the DIN rail, the user interface device including a user interface device housing that houses a display, the user interface device is operatively coupled to the building controller and is configured to display on the display of the user interface device a plurality of menu screens that allow a user to locally interact with the building controller to control the one or more of the first building control components and one or more of the second building control components.

19. The building control system of claim 18, wherein the user interface device is configured to display on the display one or more screens that allow a user to view one or more points that are associated with one or more of the first building control components and one or more of the second building control components.

20. A building control system for controlling a Heating, Ventilation and/or Air Conditioning (HVAC) system of a building, the building control system comprising:
   a building controller including a building controller housing, the building controller directly communicating with one or more building control components of the HVAC system via a plurality of wired ports of the building controller, wherein at least one of the building control components that the building controller directly communicating with via the plurality of wired ports include one or more of an HVAC fan, an HVAC blower, and an HVAC actuator;
   the building controller is configured to provide control signals in accordance with a control algorithm to control the one or more building control components via the direct communication between the building controller and the one or more building control components of the HVAC system; and
   a user interface device that is separate from the building controller, the user interface device and the building controller are mounted to a DIN rail with a mounted location of the user interface device offset from a mounted location of the building controller on the DIN rail, the user interface device including a user interface device housing that houses a display, the user interface device is operatively coupled to the building controller and is configured to display on the display of the user interface device a plurality of menu screens that allow a user to locally interact with the building controller to monitor and control the one or more building control components.

* * * * *